(12) United States Patent
Yang et al.

(10) Patent No.: US 10,996,444 B2
(45) Date of Patent: May 4, 2021

(54) PHOTOGRAPHING OPTICAL LENS ASSEMBLY, IMAGING APPARATUS AND ELECTRONIC DEVICE

(71) Applicant: LARGAN PRECISION CO., LTD., Taichung (TW)

(72) Inventors: Shu-Yun Yang, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 50 days.

(21) Appl. No.: 16/275,639

(22) Filed: Feb. 14, 2019

(65) Prior Publication Data
US 2019/0324232 A1 Oct. 24, 2019

(30) Foreign Application Priority Data
Apr. 18, 2018 (TW) .................................. 107113248

(51) Int. Cl.
| | | |
|---|---|---|
| *G02B 13/18* | (2006.01) | |
| *G02B 13/00* | (2006.01) | |
| *G02B 9/64* | (2006.01) | |
| G02B 13/06 | (2006.01) | |
| G02B 27/00 | (2006.01) | |
| G02B 13/04 | (2006.01) | |
| G02B 5/00 | (2006.01) | |

(52) U.S. Cl.
CPC ............ *G02B 13/0045* (2013.01); *G02B 9/64* (2013.01); *G02B 5/005* (2013.01); *G02B 13/04* (2013.01); *G02B 13/06* (2013.01); *G02B 13/18* (2013.01); *G02B 27/0025* (2013.01)

(58) Field of Classification Search
CPC .. G02B 13/0045; G02B 27/0025; G02B 9/64; G02B 13/18; G02B 5/005; G02B 13/04; G02B 13/06
USPC ................ 359/708, 713, 740, 751, 755, 770
See application file for complete search history.

(56) References Cited

U.S. PATENT DOCUMENTS

| | | | | |
|---|---|---|---|---|
| 3,645,605 A | * | 2/1972 | Nakagawa | ............ G02B 13/04 359/751 |
| 3,741,630 A | * | 6/1973 | Nakagawa | ............ G02B 13/04 359/751 |
| 4,025,170 A | * | 5/1977 | Kawamura | ............ G02B 13/04 359/750 |
| 4,867,546 A | | 9/1989 | Nishioka et al. | |

(Continued)

FOREIGN PATENT DOCUMENTS

| | | |
|---|---|---|
| CN | 105511053 A | 4/2016 |
| CN | 205353444 U | 6/2016 |

(Continued)

*Primary Examiner* — Evelyn A Lester
(74) *Attorney, Agent, or Firm* — McClure, Qualey & Rodack, LLP

(57) ABSTRACT

A photographing optical lens assembly includes seven lens elements, the seven lens elements being, in order from an object side to an image side, a first lens element, a second lens element, a third lens element, a fourth lens element, a fifth lens element, a sixth lens element and a seventh lens element. The first lens element has negative refractive power. The second lens element has negative refractive power. The third lens element has an object-side surface being concave in a paraxial region thereof. The fourth lens element has an image-side surface being convex in a paraxial region thereof.

30 Claims, 25 Drawing Sheets

(56) References Cited

U.S. PATENT DOCUMENTS

| | | | |
|---|---|---|---|
| 5,404,247 A | 4/1995 | Cobb et al. | |
| 5,477,389 A * | 12/1995 | Ito | G02B 13/04 359/708 |
| 6,185,050 B1 | 2/2001 | Ota et al. | |
| 6,853,495 B2 | 2/2005 | Kondo et al. | |
| 8,503,096 B2 * | 8/2013 | Imaoka | G02B 9/14 359/684 |
| 8,780,464 B2 | 7/2014 | Huang | |
| 9,465,192 B2 | 10/2016 | Nakayama | |
| 9,477,064 B1 | 10/2016 | Chen et al. | |
| 10,082,642 B2 | 9/2018 | Inoue | |
| 10,386,602 B2 | 8/2019 | Chen et al. | |
| 2005/0280900 A1 * | 12/2005 | Toyama | G02B 13/04 359/680 |
| 2009/0219631 A1 * | 9/2009 | Ning | G02B 13/18 359/716 |
| 2010/0277816 A1 * | 11/2010 | Kweon | G02B 13/06 359/755 |
| 2012/0056978 A1 | 3/2012 | Abe et al. | |
| 2013/0057972 A1 | 3/2013 | Lee | |
| 2013/0235467 A1 * | 9/2013 | Heu | G02B 13/18 359/684 |
| 2013/0321936 A1 | 12/2013 | Ohashi | |
| 2014/0078605 A1 | 3/2014 | Ohashi | |
| 2014/0184845 A1 * | 7/2014 | Nakayama | G02B 13/04 348/222.1 |
| 2015/0241666 A1 * | 8/2015 | Koida | G02B 13/04 359/713 |
| 2017/0227733 A1 | 8/2017 | Lin et al. | |
| 2017/0242220 A1 | 8/2017 | Lee | |
| 2017/0254987 A1 | 9/2017 | Lai et al. | |
| 2017/0285299 A1 | 10/2017 | Chen et al. | |
| 2018/0039049 A1 | 2/2018 | Lee et al. | |
| 2018/0095237 A1 | 4/2018 | Kanzaki | |
| 2018/0095245 A1 | 4/2018 | Kanzaki | |
| 2018/0203211 A1 | 7/2018 | Kim | |
| 2018/0284397 A1 | 10/2018 | Komiyama | |
| 2019/0187443 A1 | 6/2019 | Jia et al. | |
| 2019/0219795 A1 | 7/2019 | Chen et al. | |
| 2020/0081231 A1 | 3/2020 | Komiyama | |
| 2020/0209555 A1 | 7/2020 | Shimoeda | |

FOREIGN PATENT DOCUMENTS

| | | |
|---|---|---|
| CN | 106959499 A | 7/2017 |
| CN | 106990509 A | 7/2017 |
| CN | 106990510 A | 7/2017 |
| CN | 206470465 U | 9/2017 |
| CN | 206505216 U | 9/2017 |
| CN | 108107550 A | 6/2018 |
| CN | 108363162 A | 8/2018 |
| CN | 108363163 A | 8/2018 |
| JP | 04246606 A | 9/1992 |
| JP | 04267212 A | 9/1992 |
| JP | 07084184 A | 3/1995 |
| JP | 11119094 A | 4/1999 |
| JP | 11281888 A | 10/1999 |
| JP | 2000352665 A | 12/2000 |
| JP | 2003195162 A | 7/2003 |
| JP | 2004325498 A | 11/2004 |
| JP | 2008134494 A | 6/2008 |
| JP | 2008233610 A | 10/2008 |
| JP | 2014102291 A | 6/2014 |
| JP | 2014126844 A | 7/2014 |
| JP | 2016038548 A | 3/2016 |
| JP | 2016114693 A | 6/2016 |
| JP | 2017026801 A | 2/2017 |
| JP | 2017167339 A | 9/2017 |
| TW | 201723572 A | 7/2017 |
| WO | 2014087602 A1 | 6/2014 |
| WO | 2018010433 A1 | 1/2018 |
| WO | 2018218889 A1 | 12/2018 |
| WO | 2019054010 A | 3/2019 |

* cited by examiner

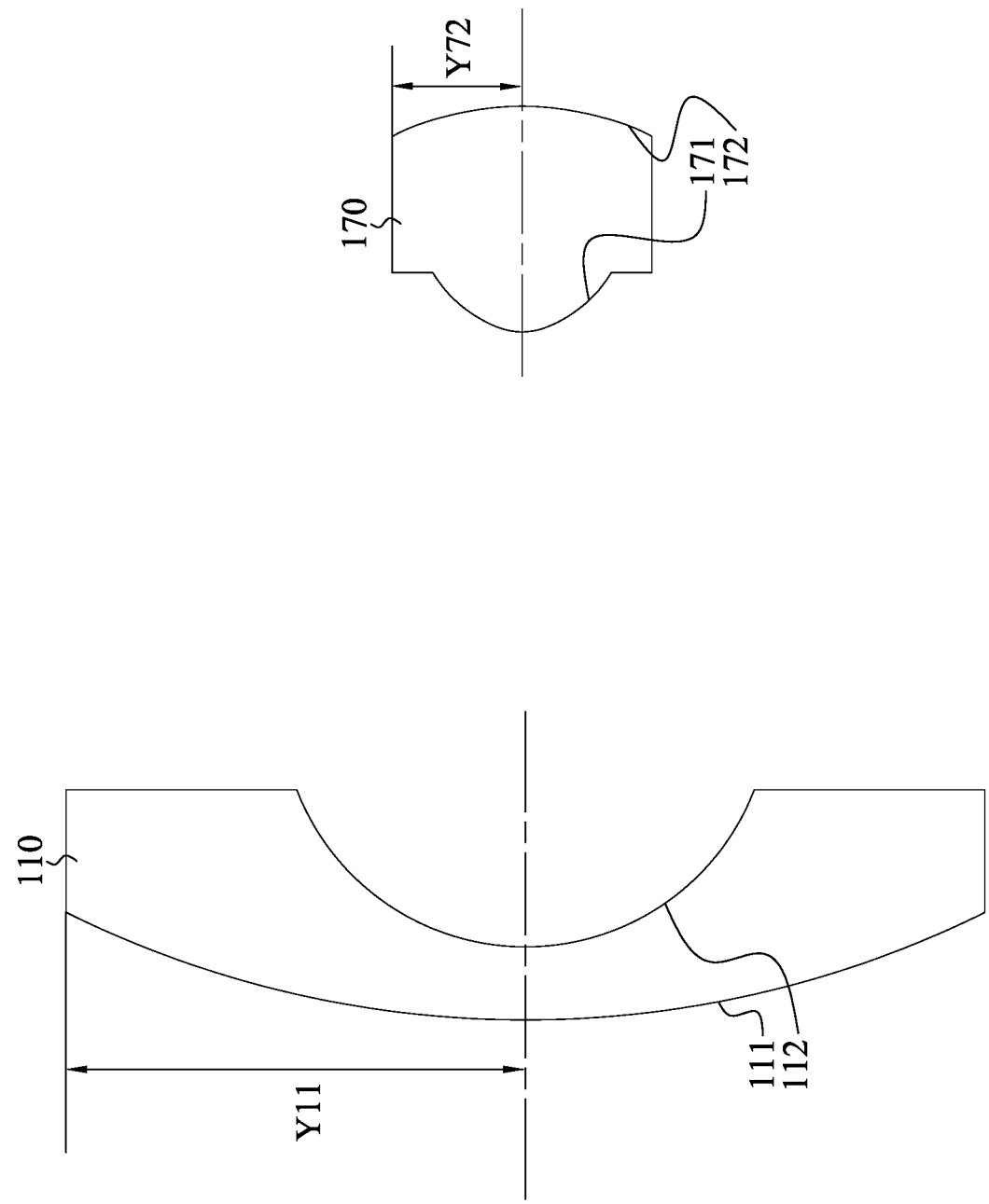

PHOTOGRAPHING OPTICAL LENS ASSEMBLY, IMAGING APPARATUS AND ELECTRONIC DEVICE

RELATED APPLICATIONS

This application claims priority to Taiwan Application Serial Number 107113248, filed Apr. 18, 2018, which is herein incorporated by reference.

BACKGROUND

Technical Field

The present disclosure relates to a photographing optical lens assembly, an imaging apparatus and an electronic device. More particularly, the present disclosure relates to a photographing optical lens assembly and an imaging apparatus applicable to electronic devices.

Description of Related Art

With the advanced semiconductor manufacturing technologies, the performances of image sensors are enhanced, and the pixel size is minified. Therefore, photographing optical lens assemblies with high image quality become indispensable.

Moreover, with the rapid scientific and technological progress, the application scope of electronic devices equipped with photographing optical lens assemblies becomes wider, and the requirements for photographing optical lens assemblies are more diverse. However, it is hard for balancing the requirements, such as image quality, sensitivity, aperture size, volume and field of view, in conventional photographing optical lens assemblies. Therefore, a photographing optical lens assembly is provided by the present disclosure to satisfy the desired requirement.

SUMMARY

According to one aspect of the present disclosure, a photographing optical lens assembly includes seven lens elements, the seven lens elements being, in order from an object side to an image side, a first lens element, a second lens element, a third lens element, a fourth lens element, a fifth lens element, a sixth lens element and a seventh lens element. The first lens element has negative refractive power. The second lens element has negative refractive power. The third lens element has an object-side surface being concave in a paraxial region thereof. The fourth lens element has an image-side surface being convex in a paraxial region thereof. When a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of an i-th lens element is fi, an entrance pupil diameter of the photographing optical lens assembly is EPD, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, and the following conditions are satisfied:

$2.35 < \Sigma |f/fi| < 10.0$, wherein $i=1,2,3,4,5,6,7$;

$1.0 < f/EPD < 2.60$;

$T34 < T12$;

$T45 < T12$;

$T56 < T12$;

$T67 < T12$;

$T34 < T23$;

$T45 < T23$;

$T56 < T23$; and $T67 < T23$.

According to another aspect of the present disclosure, an imaging apparatus includes the photographing optical lens assembly of the aforementioned aspect and an image sensor, wherein the image sensor is disposed on the image surface of the photographing optical lens assembly.

According to another aspect of the present disclosure, an electronic device includes the imaging apparatus of aforementioned aspect.

According to another aspect of the present disclosure, a photographing optical lens assembly includes seven lens elements, the seven lens elements being, in order from an object side to an image side, a first lens element, a second lens element, a third lens element, a fourth lens element, a fifth lens element, a sixth lens element and a seventh lens element. The first lens element has negative refractive power. The second lens element has negative refractive power. The third lens element has negative refractive power. When a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of an i-th lens element is fi, an entrance pupil diameter of the photographing optical lens assembly is EPD, a curvature radius of an image-side surface of the seventh lens element is R14, a maximum optical effective radius of an object-side surface of the first lens element is Y11, a maximum optical effective radius of the image-side surface of the seventh lens element is Y72, an axial distance between the fourth lens element and the fifth lens element is T45, and a central thickness of the fourth lens element is CT4, the following conditions are satisfied:

$2.35 < \Sigma |f/fi| < 10.0$, wherein $i=1,2,3,4,5,6,7$;

$1.0 < f/EPD < 2.80$;

$-3.20 < R14/f < 16.0$;

$0.10 < Y72/Y11 < 0.65$; and $T45 < CT4$.

According to another aspect of the present disclosure, a photographing optical lens assembly includes seven lens elements, the seven lens elements being, in order from an object side to an image side, a first lens element; a second lens element, a third lens element, a fourth lens element, a fifth lens element, a sixth lens element and a seventh lens element. The photographing optical lens assembly includes at least one cemented lens set, the cemented lens set is cemented by two adjacent lens elements of the seven lens elements, two cemented surfaces of the cemented lens set are both aspheric, the cemented lens set comprises a cemented layer connecting the cemented surfaces of the two adjacent lens elements. When a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of an i-th lens element is fi, an entrance pupil diameter of the photographing optical lens assembly is EPD, a displacement in parallel with an optical axis from an axial vertex on an image-side surface to a maximum optical effective radius position on the image-side surface of the lens element closer to the object side of the cemented lens set is SAGf, and a displacement in parallel with the optical axis from an axial vertex on an object-side surface to a maximum optical effective radius position on the object-side surface of the lens element closer to the image side of the cemented lens set is SAGr, the following conditions are satisfied:

$1.0 < \Sigma |f/fi| < 15.0$, wherein $i=1,2,3,4,5,6,7$;

$1.0 < f/EPD < 5.0$; and $0.03 \text{ mm} < |SAGf - SAGr| \times 100 < 20.0 \text{ mm}$.

According to another aspect of the present disclosure, an imaging apparatus includes the photographing optical lens assembly of the aforementioned aspect and an image sensor, wherein the image sensor is disposed on the image surface of the photographing optical lens assembly.

According to another aspect of the present disclosure, an electronic device includes the imaging apparatus of aforementioned aspect.

BRIEF DESCRIPTION OF THE DRAWINGS

FIG. 17B shows a parameter Y11 of the photographing optical lens assembly according to the 1st embodiment of the present disclosure of FIG. 1.

FIG. 17C shows a parameter Y72 of the photographing optical lens assembly according to the 1st embodiment of the present disclosure of FIG. 1.

DETAILED DESCRIPTION

Figure 1:
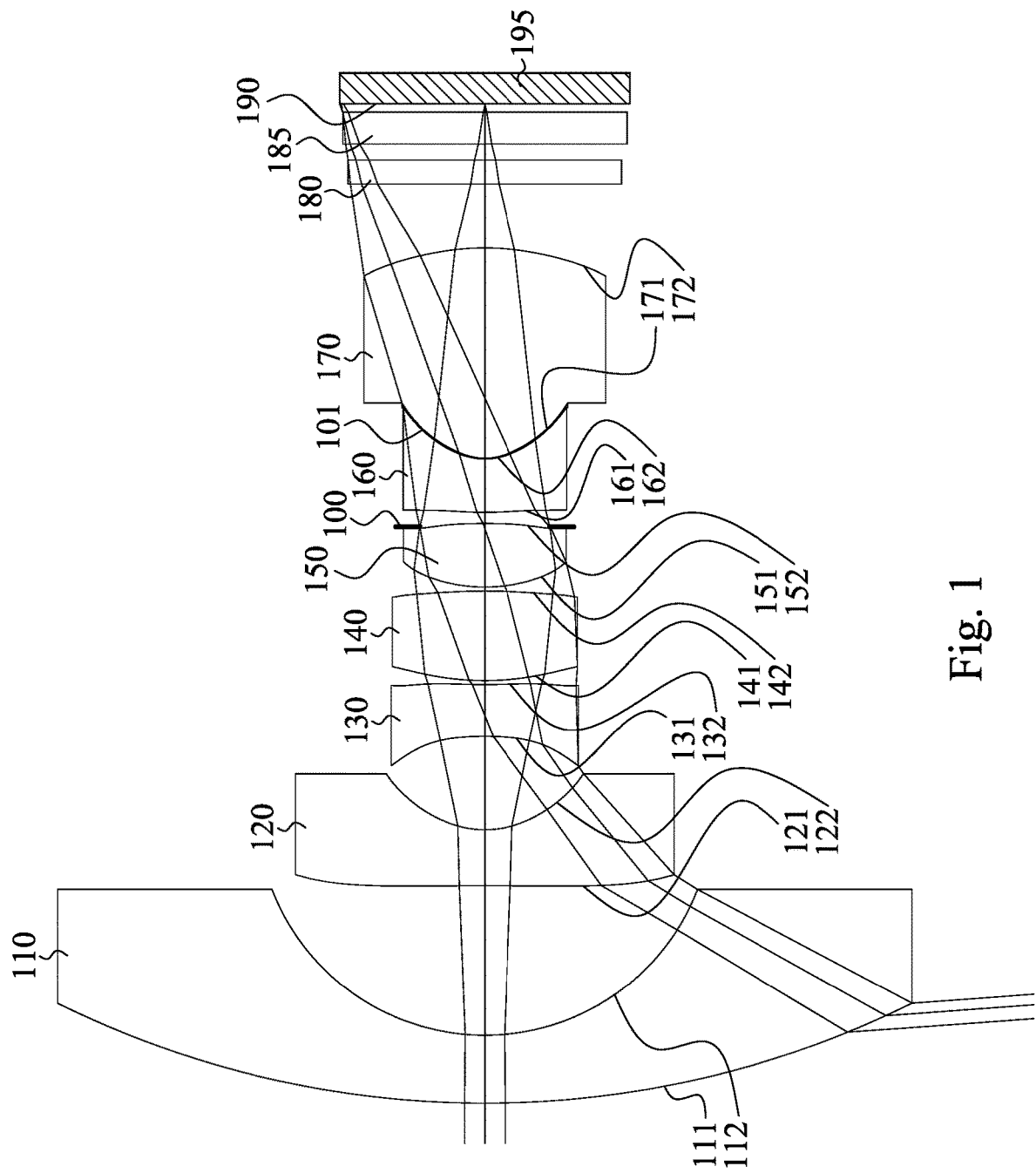
FIG. 1 is a schematic view of an imaging apparatus according to the 1st embodiment of the present disclosure.

A photographing optical lens assembly includes seven lens elements, the seven lens elements being, in order from an object side to an image side, a first lens element, a second lens element, a third lens element, a fourth lens element, a fifth lens element, a sixth lens element and a seventh lens element.

The first lens element can have negative refractive power which is favorable for providing a short focal length so as to retrieve light from a large field of view in the photographing optical lens assembly, thus the light receiving range can be enlarged for many different applications. The first lens element can have an image-side surface being concave in a paraxial region thereof, so that it is favorable for obtaining a larger photographing range by receiving light from a large field of view.

The second lens element can have negative refractive power, so that it is favorable for avoiding excessive curvature of the first lens element and reducing aberrations by balancing with the refractive power of the first lens element. The second lens element can have an image-side surface being concave in a paraxial region thereof, so that it is favorable for correcting coma aberration by providing the proper shape of the image-side surface of the second lens element so as to improve the image quality.

The third lens element can have negative refractive power, so that it is favorable for balancing the distribution of the refractive power on the object side of the photographing optical lens assembly so as to obtain the characteristic of a wide view angle and further to be utilized in ultra-wide angle applications. The third lens element can have an object-side surface being concave in a paraxial region thereof, so that it is favorable for moderating the incident light from a large field of view and reducing spherical aberration of the photographing optical lens assembly by controlling the shape of the object-side surface of the third lens element. The third lens element can have an image-side surface including at least one inflection point. Therefore, it is favorable for correcting off-axis aberrations and reducing the total track length of the photographing optical lens assembly so as to satisfy various applications.

The fourth lens element can have positive refractive power, so that it is favorable for balancing aberrations generated between the first lens element and the third lens element. The fourth lens element can have an image-side surface being convex in a paraxial region thereof, so that it is favorable for enhancing the light converging ability of the fourth lens element so as to optimize the photographing optical lens assembly by avoiding the excessive total track length thereof.

At least one of object-side surfaces and image-side surfaces of at least one lens element of the first lens element, the second lens element, the third lens element, the fourth lens element, the fifth lens element, the sixth lens element and the seventh lens element can include at least one inflection point. Therefore, it is favorable for enhancing the brightness on the peripheral region of the image by correcting the field curvature and reducing the angle of the incident light on the image surface effectively.

At least four of the first lens element, the second lens element, the third lens element, the fourth lens element, the fifth lens element, the sixth lens element and the seventh lens element are made of plastic materials and have an object-side surface and an image-side surface thereof being both aspheric. Therefore, the manufacturing efficiency of the lens element can be enhanced and corrections of the off-axis aberrations of the lens element can also be improved, so that it is favorable for reducing the manufacturing costs and obtaining higher image quality.

The photographing optical lens assembly can include at least one cemented lens set, the cemented lens set is cemented by two adjacent lens elements of the seven lens elements, two cemented surfaces of the cemented lens set are both aspheric, the cemented lens set includes a cemented layer connecting the cemented surfaces of the two adjacent lens elements. Therefore, the corrections of off-axis aberrations can be enhanced by the cemented layer.

When a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, and a focal length of an i-th lens element is fi, the following condition is satisfied: $1.0 < \Sigma |f/fi| < 15.0$, wherein i=1, 2, 3, 4, 5, 6, 7. Therefore, it is favorable for controlling the light path and the total track length of the photographing optical lens assembly by providing sufficient refractive power thereto. Preferably, the following condition can be satisfied: $2.35 < \Sigma |f/fi| < 10.0$, wherein i=1, 2, 3, 4, 5, 6, 7. More preferably, the following condition can be satisfied: $2.50 < \Sigma |f/fi| < 5.0$, wherein i=1, 2, 3, 4, 5, 6, 7.

When the focal length of the photographing optical lens assembly is f, an entrance pupil diameter of the photographing optical lens assembly is EPD, the following condition is satisfied: $1.0 < f/EPD < 5.0$. Therefore, the amount of incident light can be controlled so as to enhance the illumination of the image surface, and it is favorable for obtaining sufficient image information in situations with insufficient light (i.e. nighttime), or short exposure time (dynamic photographing) etc., so that the electronic device equipped with the imaging apparatus can provide satisfactory image quality supported by image post processing while increasing viable applications thereof. Preferably, the following condition can be satisfied: $1.0 < f/EPD < 2.80$. More preferably, the following condition can be satisfied: $1.0 < f/EPD < 2.60$. Further, the following condition can be satisfied: $1.0 < f/EPD \leq 2.40$. Moreover, the following condition can be satisfied: $1.20 < f/EPD \leq 2.20$.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and an axial distance between the sixth lens element and the seventh lens element is T67, the following conditions are satisfied: T34<T12; T45<T12; T56<T12; T67<T12; T34<T23; T45<T23; T56<T23; and T67<T23. Therefore, it is favorable for adjusting the light path from the large field of view on the object side of the photographing optical lens assembly and correcting aberrations on the image side thereof by balancing the space arrangement thereof.

When the focal length of the photographing optical lens assembly is f, and a curvature radius of the image-side surface of the seventh lens element is R14, the following condition is satisfied: $-3.20 < R14/f < 16.0$. Therefore, it is favorable for enhancing the image correcting ability by adjusting the shape of the lens element close to the image side and moderating the curvature of the surface of the lens element so as to enhance the image quality. Preferably, the following condition can be satisfied: $-3.0 < R14/f < 12.0$.

When a maximum optical effective radius of the object-side surface of the first lens element is Y11, and a maximum optical effective radius of the image-side surface of the seventh lens element is Y72, the following condition is satisfied: $0.10 < Y72/Y11 < 0.65$. Therefore, it is favorable for obtaining a wide field of view lens structure in a compact lens system by controlling the ratio of the optical effective radii on the object side and on the image side of the photographing optical lens assembly so as to be utilized in various applications. Preferably, the following condition can be satisfied: $0.10 < Y72/Y11 < 0.50$.

When the axial distance between the fourth lens element and the fifth lens element is T45, and a central thickness of the fourth lens element is CT4, the following condition is satisfied: T45<CT4. Therefore, it is favorable for controlling the total track length of the photographing optical lens assembly by adjusting the distance between the fourth lens element and the fifth lens element effectively.

When a displacement in parallel with an optical axis from an axial vertex on an image-side surface to a maximum optical effective radius position on the image-side surface of the lens element closer to the object side of the cemented lens set is SAGf, and a displacement in parallel with the optical axis from an axial vertex on an object-side surface to a maximum optical effective radius position on the object-side surface of the lens element closer to the image side of the cemented lens set is SAGr, the following condition is satisfied: 0.03 mm<|SAGf−SAGr|×100<20.0 mm. Therefore, it is favorable for improving the adhesion and flow of the cementing material without lowering the image quality by obtaining the sufficient and not excessive differences between the surface shapes of the lens elements in the cemented lens set. Preferably, the following condition can be satisfied: 0.05 mm<|SAGf−SAGr|×100<9.0 mm. More preferably, the following condition can be satisfied: 0.20 mm<|SAGf−SAGr|×100<6.0 mm.

When the focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of an i-th lens element is fi, and a maximum of |f/fi| is |f/fi|max, the following condition is satisfied: 0.60<|f/fi|max<2.0, wherein i=1, 2, 3, 4, 5, 6, 7. Therefore, it is favorable for controlling the size of the photographing optical lens assembly by obtaining sufficient refractive power while having a large field of view so as to satisfy product specification for various applications.

When a curvature radius of the object-side surface of the seventh lens element is R13, and the curvature radius of the image-side surface of the seventh lens element is R14, the following condition is satisfied: −6.0<(R13+R14)/(R13−R14)<0. Therefore, it is favorable for providing moderate surface curvature of the seventh lens element near the image surface so as to obtain better image quality.

When an Abbe number of the fourth lens element is V4, an Abbe number of the sixth lens element is V6, and an Abbe number of the seventh lens element is V7, the following condition is satisfied: 30.0<(V4+V6+V7)<125.0. Therefore, it is favorable for arranging the materials of the lens elements so as to correct aberrations effectively and to improve image quality for a higher specification.

When a curvature radius of the object-side surface of the third lens element is R5, and a curvature radius of the image-side surface of the third lens element is R6, the following condition is satisfied: (R5+R6)/(R5−R6)<0.80. Therefore, it is favorable for moderating aberrations generated from the incident light of a large field of view and reducing the photosensitivity of the photographing optical lens assembly by adjusting the shape of the third lens element. Preferably, the following condition can be satisfied: −4.0<(R5+R6)/(R5−R6)<0.10.

When a maximum of central thicknesses of the seven lens elements of the photographing optical lens assembly is CTmax, and a minimum of the central thicknesses of the seven lens elements of the photographing optical lens assembly is CTmin, the following condition is satisfied: 1.0<CTmax/CTmin<5.50. Therefore, it is favorable for avoiding deformation and warping of the lens elements during lens molding by balancing the ratio of the thicknesses of the lens elements. Preferably, the following condition can be satisfied: 1.50<CTmax/CTmin<4.80.

When the Abbe number of the fourth lens element is V4, the following condition is satisfied: 10.0<V4<35.0. Therefore, it is favorable for correcting chromatic aberration by adjusting the material of the fourth lens element so as to avoid the image overlap and enhance the image quality.

When an axial distance between the object-side surface of the first lens element and the image surface is TL, and a maximum image height of the photographing optical lens assembly is ImgH, the following condition is satisfied: 1.0<TL/ImgH<8.0. Therefore, it is favorable for reducing the size of the photographing optical lens assembly by properly controlling the ratio between the total track length and the image height thereof while enlarging the image area for more light. Preferably, the following condition can be satisfied: 3.0<TL/ImgH<7.20.

When a half of a maximum field of view of the photographing optical lens assembly is HFOV, the following condition is satisfied: 1/|tan(HFOV)|<0.55. Therefore, it is favorable for obtaining a larger angle of view so as to increase the applicable products. Preferably, the following condition can be satisfied: 1/|tan(HFOV)|<0.30.

The photographing optical lens assembly can further include an aperture stop located on an image side of the fourth lens element. Therefore, it is favorable for enlarging the field of view of the photographing optical lens assembly and maintaining the imaging efficiency of the image sensor by adjusting the position of the aperture stop.

In the cemented lens set, when a central thickness of the cemented layer is D, the following condition is satisfied: 0.01 mm≤D<0.06 mm. Therefore, it is favorable for arranging proper distance between the two adjacent lens elements of the cemented lens set so as to improve the flow of the cementing material and avoid poor image quality due to the cemented layer being too thick. Preferably, the following condition can be satisfied: 0.01 mm≤D<0.04 mm.

When the focal length of the second lens element is f2, and the focal length of the third lens element is f3, the following condition is satisfied: f2/f3<0.95. Therefore, it is favorable for forming a wide-angle lens structure by adjusting the ratio of the refractive power between the second lens element and the third lens element so as to retrieve light from a large field of view and correct aberrations.

When the axial distance between the fourth lens element and the fifth lens element is T45, and a central thickness of the fifth lens element is CT5, the following condition is satisfied: T45<CT5. Therefore, it is favorable for effectively controlling the distance between the fourth lens element and the fifth lens element so as to control the total track length of the photographing optical lens assembly and arrange the fifth lens element with sufficient thickness for molding.

The cemented layer of the cemented lens set has an object-side surface and an image-side surface, wherein the object-side surface of the cemented layer is cemented to the image-side surface of the lens element closer to the object side, the image-side surface of the cemented layer is cemented to the object-side surface of the lens element closer to the image side. The cemented layer can be a cementing adhesive, which can be deemed as Pseudo-lens in the photographing optical lens assembly. The shape and the thickness of the cemented layer is more flexible than the plastic lens element or the glass lens element, so that it is favorable for obtaining compact size of the photographing optical lens assembly and better imaging ability than the non-cemented lens elements.

An absolute value of a curvature radius of the object-side surface of the cemented layer and an absolute value of a curvature radius of the image-side surface of the cemented layer are minimum absolute values of curvature radii of object-side surfaces and image-side surfaces of the lens elements of the photographing optical lens assembly. Therefore, it is favorable for balancing aberrations of the cemented lens set so as to enhance the complementary performance of the two lens elements.

When a refractive index of the lens element closer to the object side of the cemented lens set is Nf, and a refractive index of the lens element closer to the image side of the cemented lens set is Nr, the following condition is satisfied: 3.0<Nf+Nr<3.30. Therefore, it is favorable for controlling the material of the cemented lens set so as to correct aberrations in different fields respectively and reduce image curvature and distortion.

When the focal length of the photographing optical lens assembly is f, a focal length of the lens element closer to the object side of the cemented lens set is ff, and a focal length of the lens element closer to the image side of the cemented lens set is fr, the following condition is satisfied: 1.0<|f/ff|+|f/fr|<7.0. Therefore, it is favorable for providing the cemented lens set with sufficient refractive power so as to correct aberrations of the photographing optical lens assembly. Preferably, the following condition can be satisfied: 1.30<|f/ff|+|f/fr|<3.50.

When a maximum optical effective radius of the image-side surface of the lens element closer to the object side of the cemented lens set is Yf, a maximum optical effective radius of the object-side surface of the lens element closer to the image side of the cemented lens set is Yr, the displacement in parallel with the optical axis from the axial vertex on the image-side surface to the maximum optical effective radius position on the image-side surface of the lens element closer to the object side of the cemented lens set is SAGf, and the displacement in parallel with the optical axis from the axial vertex on the object-side surface to the maximum optical effective radius position on the object-side surface of the lens element closer to the image side of the cemented lens set is SAGr, the following condition is satisfied: 0.50<|Yf/SAGf|+|Yr/SAGr|<3.50. Therefore, it is favorable for correcting aberrations by improving the functionality of the cemented lens set so as to enhance the image quality. Preferably, the following condition can be satisfied: 0.80<|Yf/SAGf|+|Yr/SAGr|<2.70.

When a curvature radius of the image-side surface of the lens element closer to the object side of the cemented lens set is Rf, a curvature radius of the object-side surface of the lens element closer to the image side of the cemented lens set is Rr, the displacement in parallel with the optical axis from the axial vertex on the image-side surface to the maximum optical effective radius position on the image-side surface of the lens element closer to the object side of the cemented lens set is SAGf, and the displacement in parallel with the optical axis from the axial vertex on the object-side surface to the maximum optical effective radius position on the object-side surface of the lens element closer to the image side of the cemented lens set is SAGr, the following condition is satisfied: 1.50<|SAGf/Rf|+|SAGr/Rr|<8.0. Therefore, it is favorable for correcting axial chromatic aberration by enhancing the adjusting ability of light path on the axis of the cemented lens set. Preferably, the following condition can be satisfied: 2.0<|SAGf/Rf|+|SAGr/Rr|<5.0.

Each of the aforementioned features of the photographing optical lens assembly can be utilized in various combinations for achieving the corresponding effects.

According to the photographing optical lens assembly of the present disclosure, the lens elements thereof can be made of glass or plastic materials. When the lens elements are made of glass materials, the distribution of the refractive power of the photographing optical lens assembly may be more flexible to design. The glass lens element can either be made by grinding or molding. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the photographing optical lens assembly. Therefore, the total track length of the photographing optical lens assembly can also be reduced.

According to the photographing optical lens assembly of the present disclosure, when a surface of a lens element is aspheric, it indicates that the complete optical effective area or a partial of the optical effective area of the surface of the lens element can be aspheric.

According to the photographing optical lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the photographing optical lens assembly of the present disclosure, the refractive power or the focal length of a lens element being positive or negative may refer to the refractive power or the focal length in a paraxial region of the lens element.

According to the photographing optical lens assembly of the present disclosure, an inflection point is a point on a curve of a lens surface ranging from a paraxial region to an off-axis region of the lens surface where the center of curvature of the curve changes from the object side to the image side (or from the image side to the object side).

According to the photographing optical lens assembly of the present disclosure, the image surface of the photographing optical lens assembly, based on the corresponding image sensor, can be flat or curved. In particular, the image surface can be a concave curved surface facing towards the object side. According to the photographing optical lens assembly of the present disclosure, at least one image correcting element (such as a field flattener) can be selectively disposed between the lens element closest to the image side of the photographing optical lens assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. A front stop disposed between an object and the first lens element can provide a longer distance between an exit pupil of the photographing optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the photographing optical lens assembly and thereby provides a wider field of view for the same.

According to the photographing optical lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the photographing optical lens assembly according to the present disclosure, so as to moderate the image quality by changing f-number such as changing the depth of field or the exposure speed.

According to the photographing optical lens assembly of the present disclosure, the photographing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic products.

According to the present disclosure, an imaging apparatus is provided. The imaging apparatus includes the aforementioned photographing optical lens assembly and an image sensor, wherein the image sensor is disposed on the image side of the aforementioned photographing optical lens assembly, that is, the image sensor can be disposed on or near the image surface of the aforementioned photographing optical lens assembly. Therefore, it is favorable for obtaining sufficient refractive power by the arrangement of the first lens element with negative refractive power and the second lens element with negative power of the photographing optical lens assembly, so as to control the light path and obtain the compactness of the photographing optical lens assembly. Preferably, the imaging apparatus can further include a barrel member, a holder member or a combination thereof.

According to the present disclosure, an electronic device is provided, which includes the aforementioned imaging apparatus. The imaging apparatus includes the photographing optical lens assembly and an image sensor, wherein the image sensor is disposed on the image surface of the photographing optical lens assembly. Preferably, the electronic device can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2:
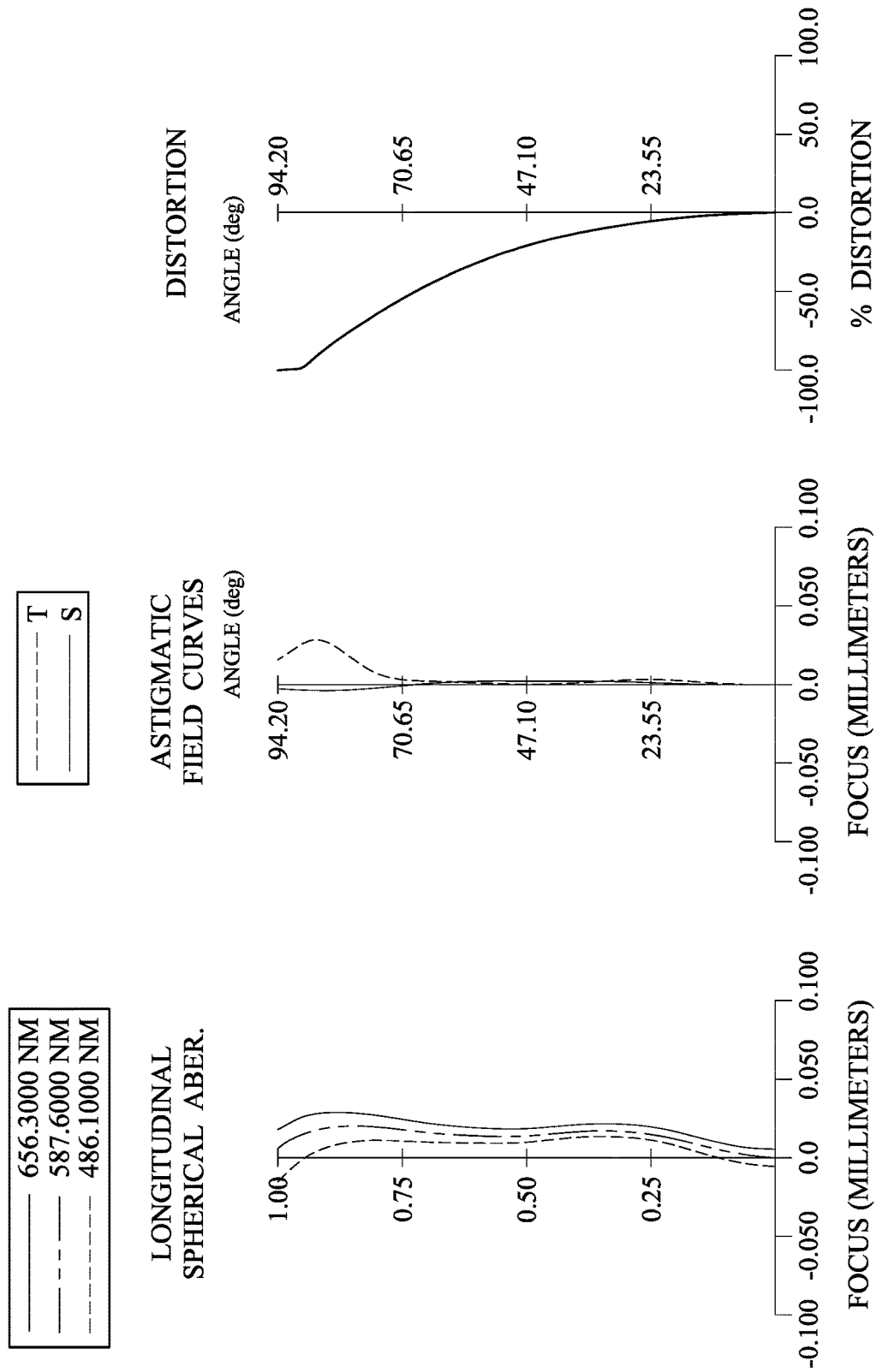
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes a photographing optical lens assembly (its reference numeral is omitted) and an image sensor 195. The photographing optical lens assembly includes, in order from an object side to an image side, a first lens element 110, a second lens element 120, a third lens element 130, a fourth lens element 140, a fifth lens element 150, an aperture stop 100, a sixth lens element 160, a seventh lens element 170, a filter 180, a cover glass 185, and an image surface 190, wherein the image sensor 195 is disposed on the image surface 190 of the photographing optical lens assembly. The photographing optical lens assembly includes seventh lens elements (110, 120, 130, 140, 150, 160, 170) without additional one or more lens elements inserted between the first lens element 110 and the seventh lens element 170.

The first lens element 110 with negative refractive power has an object-side surface 111 being convex in a paraxial region thereof and an image-side surface 112 being concave in a paraxial region thereof. The first lens element 110 is made of a glass material, and has the object-side surface 111 and the image-side surface 112 being both spherical.

The second lens element 120 with negative refractive power has an object-side surface 121 being concave in a paraxial region thereof and an image-side surface 122 being concave in a paraxial region thereof. The second lens element 120 is made of a plastic material, and has the object-side surface 121 and the image-side surface 122 being both aspheric. Furthermore, the object-side surface 121 of the second lens element 120 includes at least one inflection point IP21 (as labeled in FIG. 17A).

The third lens element 130 with negative refractive power has an object-side surface 131 being concave in a paraxial region thereof and an image-side surface 132 being concave in a paraxial region thereof. The third lens element 130 is made of a plastic material, and has the object-side surface 131 and the image-side surface 132 being both aspheric. Furthermore, each of the object-side surface 131 and the image-side surface 132 of the third lens element 130 includes at least one inflection point IP31, IP32 (as labeled in FIG. 17A).

The fourth lens element 140 with positive refractive power has an object-side surface 141 being convex in a paraxial region thereof and an image-side surface 142 being convex in a paraxial region thereof. The fourth lens element 140 is made of a plastic material, and has the object-side surface 141 and the image-side surface 142 being both aspheric. Furthermore, the object-side surface 141 of the fourth lens element 140 includes at least one inflection point IP41 (as labeled in FIG. 17A).

The fifth lens element 150 with positive refractive power has an object-side surface 151 being convex in a paraxial region thereof and an image-side surface 152 being convex in a paraxial region thereof. The fifth lens element 150 is made of a plastic material, and has the object-side surface 151 and the image-side surface 152 being both aspheric.

Figure 17A:
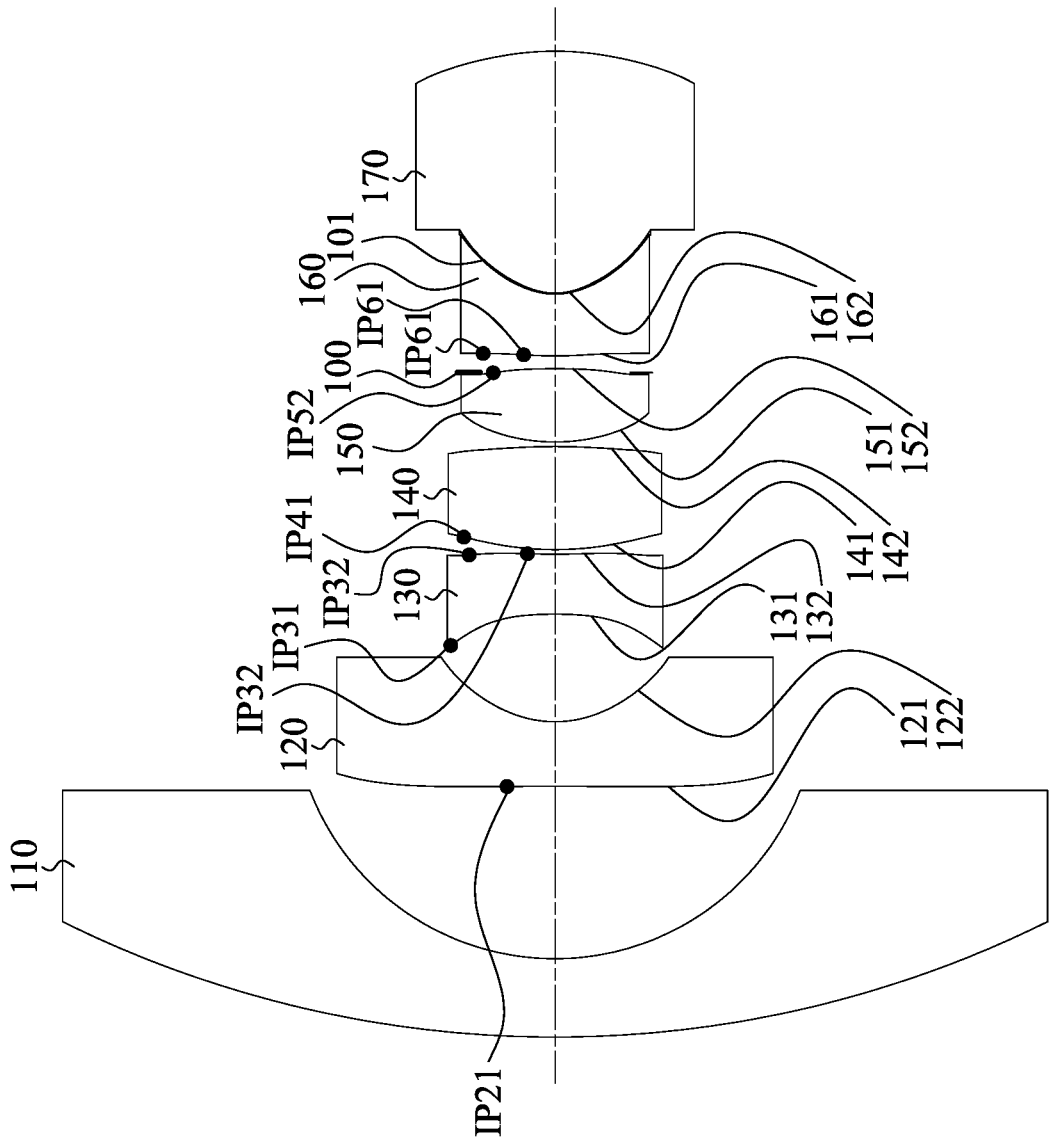
FIG. 17A shows a schematic view of inflection points on the lens surface of the photographing optical lens assembly according to the 1st embodiment of the present disclosure of FIG. 1.

Furthermore, the image-side surface 152 of the fifth lens element 150 includes at least one inflection point IP52 (as labeled in FIG. 17A).

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the object-side surface 161 of the sixth lens element 160 includes at least one inflection point IP61 (as labeled in FIG. 17A).

The seventh lens element 170 with positive refractive power has an object-side surface 171 being convex in a paraxial region thereof and an image-side surface 172 being convex in a paraxial region thereof. The seventh lens element 170 is made of a plastic material, and has the object-side surface 171 and the image-side surface 172 being both aspheric.

The filter 180 is made of a glass material, wherein the filter 180 and the cover glass 185 are located between the seventh lens element 170 and the image surface 190 in order, and will not affect the focal length of the photographing optical lens assembly.

According to the 1st embodiment, the photographing optical lens assembly includes at least one cemented lens set (its reference numeral is omitted), which is cemented by the sixth lens element 160 and the seventh lens element 170. Two cemented surfaces (its reference numeral is omitted) of the cemented lens set are the image-side surface 162 of the sixth lens element 160 and the object-side surface 171 of the seventh lens element 170, and are connected by a cemented layer 101. In detail, the cemented lens set includes, in order from an object side to an image side, the sixth lens element 160, the cemented layer 101 and the seventh lens element 170. The cemented layer 101 has an object-side surface (its reference numeral is omitted) thereof and an image-side surface (its reference numeral is omitted) thereof, wherein the object-side surface of the cemented layer 101 is cemented to the image-side surface 162 of the sixth lens element 160, and the image-side surface of the cemented layer 101 is cemented to the object-side surface 171 of the seventh lens element 170.

The equation of the aspheric surface profiles of the aforementioned lens elements of the 1st embodiment is expressed as follows:

$$X(Y) = (Y^2/R)/(1 + \text{sqrt}(1 - (1+k)\times(Y/R)^2)) + \sum_i (Ai)\times(Y^i),$$

where,
X is the relative distance between a point on the aspheric surface spaced at a distance Y from the optical axis and the tangential plane at the aspheric surface vertex on the optical axis;
Y is the vertical distance from the point on the aspheric surface to the optical axis;
R is the curvature radius;
k is the conic coefficient; and
Ai is the i-th aspheric coefficient.

In the photographing optical lens assembly according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=1.09 mm; Fno=2.16; and HFOV=94.2 degrees.

In the photographing optical lens assembly according to the 1st embodiment, when half of a maximum field of view of the photographing optical lens assembly is HFOV, the following condition is satisfied: 1/|tan(HFOV)|=0.07.

In the photographing optical lens assembly according to the 1st embodiment, when an Abbe number of the fourth lens element 140 is V4, an Abbe number of the sixth lens element 160 is V6, and an Abbe number of the seventh lens element 170 is V7, the following conditions are satisfied: V4=23.6; and (V4+V6+V7)=103.0.

In the photographing optical lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a central thickness of the seventh lens element 170 is CT7, a maximum of central thicknesses of the seven lens elements of the photographing optical lens assembly is CTmax (that is, the maximum of CT1, CT2, CT3, CT4, CT5, CT6 and CT7; according to the 1st embodiment, CTmax=CT7), and a minimum of the central thicknesses of the seven lens elements of the photographing optical lens assembly is CTmin (that is, the minimum of CT1, CT2, CT3, CT4, CT5, CT6 and CT7; according to the 1st embodiment, CTmin=CT3), the following condition is satisfied: CTmax/CTmin=4.04.

In the photographing optical lens assembly according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=−0.21.

In the photographing optical lens assembly according to the 1st embodiment, when a curvature radius of the object-side surface 171 of the seventh lens element 170 is R13, a curvature radius of the image-side surface 172 of the seventh lens element 170 is R14, and the focal length of the photographing optical lens assembly is f, the following conditions are satisfied: (R13+R14)/(R13−R14)=−0.63; and R14/f=−2.83.

In the photographing optical lens assembly according to the 1st embodiment, when an axial distance between the object-side surface 111 of the first lens element 110 and the image surface 190 is TL, and a maximum image height of the photographing optical lens assembly is ImgH, the following condition is satisfied: TL/ImgH=6.89.

In the photographing optical lens assembly according to the 1st embodiment, when the focal length of the photographing optical lens assembly is f, and an entrance pupil diameter of the photographing optical lens assembly is EPD, the following condition is satisfied: f/EPD=2.16.

In the photographing optical lens assembly according to the 1st embodiment, when the focal length of the photographing optical lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a focal length of an i-th lens element is fi, and a maximum of |f/fi| is |f/fi|max, the following conditions are satisfied: $f2/f3=0.44$; $\Sigma|f/fi|=2.92$, wherein $i=1, 2, 3, 4, 5, 6, 7$; and $|f/fi|max=0.78$, wherein $i=1, 2, 3, 4, 5, 6, 7$.

FIG. 17B shows a parameter Y11 of the photographing optical lens assembly according to the 1st embodiment of the present disclosure of FIG. 1.

FIG. 17C shows a parameter Y72 of the photographing optical lens assembly according to the 1st embodiment of the present disclosure of FIG. 1. In the photographing optical lens assembly according to the 1st embodiment, when a maximum optical effective radius of the object-side surface 111 of the first lens element 110 is Y11, and a maximum optical effective radius of the image-side surface 172 of the seventh lens element 170 is Y72, the following condition is satisfied: $Y72/Y11=0.28$.

In the photographing optical lens assembly according to the 1st embodiment, when a central thickness of the cemented layer 101 is D, the following condition is satisfied: $D=0.010$ mm.

Figure 18:
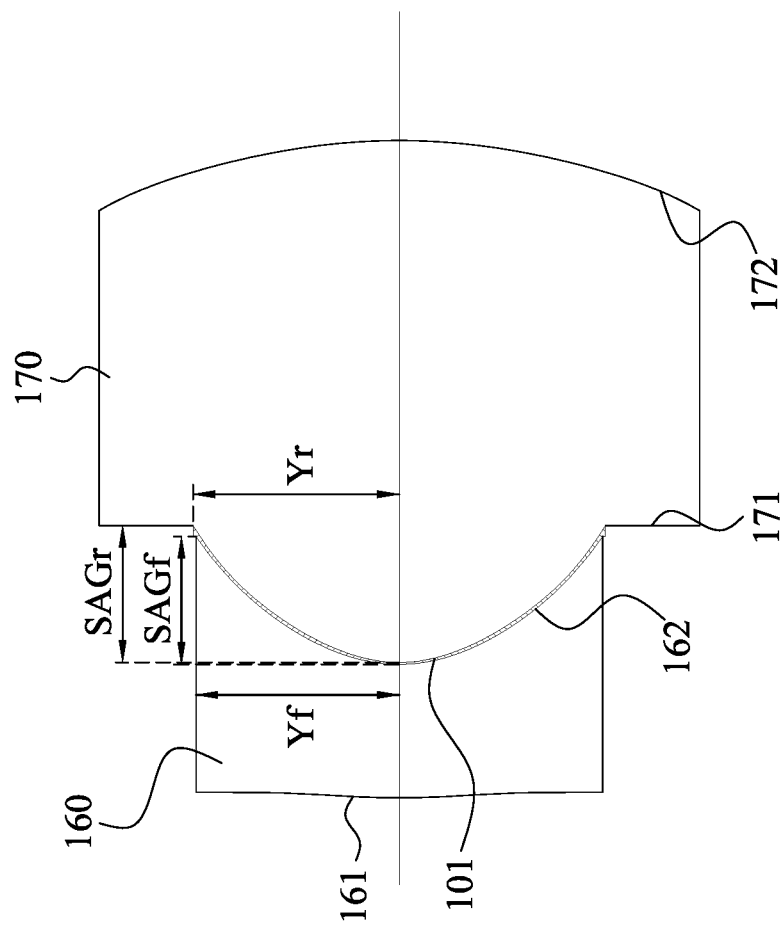
FIG. 18 shows the parameters and the cemented layer of the cemented lens set of the photographing optical lens assembly according to the 1st embodiment of the present disclosure of FIG. 1.

FIG. 18 shows the parameters and the cemented layer of the cemented lens set of the photographing optical lens assembly according to the 1st embodiment of the present disclosure of FIG. 1. In the photographing optical lens assembly according to the 1st embodiment, when a displacement in parallel with the optical axis from an axial vertex on an image-side surface to a maximum optical effective radius position on the image-side surface of the lens element closer to the object side of the cemented lens set (that is, the image-side surface 162 of the sixth lens element 160 in the 1st embodiment) is SAGf, and a displacement in parallel with the optical axis from the axial vertex on an object-side surface to a maximum optical effective radius position on the object-side surface of the lens element closer to the image side of the cemented lens set (that is, the object-side surface 171 of the seventh lens element 170 in the 1st embodiment) is SAGr, the following condition is satisfied: $|SAGf-SAGr|\times100=4.49$ mm.

In the photographing optical lens assembly according to the 1st embodiment, when the focal length of the photographing optical lens assembly is f, a focal length of the lens element closer to the object side of the cemented lens set (which is the sixth lens element 160 according to the 1st embodiment) is ff, and a focal length of the lens element closer to the image side of the cemented lens set (which is the seventh lens element 170 according to the 1st embodiment) is fr, the following condition is satisfied: $|f/ff|+|f/fr|=1.42$.

In the photographing optical lens assembly according to the 1st embodiment, when a refractive index of the lens element closer to the object side of the cemented lens set (which is the sixth lens element 160 according to the 1st embodiment) is Nf, and a refractive index of the lens element closer to the image side of the cemented lens set (which is the seventh lens element 170 according to the 1st embodiment) is Nr, the following condition is satisfied: $Nf+Nr=3.17$.

In the photographing optical lens assembly of FIG. 18, when the displacement in parallel with the optical axis from the axial vertex on the image-side surface to the maximum optical effective radius position on the image-side surface of the lens element closer to the object side of the cemented lens set is SAGf, the displacement in parallel with the optical axis from the axial vertex on the object-side surface to the maximum optical effective radius position on the object-side surface of the lens element closer to the image side of the cemented lens set is SAGr, a curvature radius of the image-side surface of the lens element closer to the object side of the cemented lens set (that is, the image-side surface 162 of the sixth lens element 160 in the 1st embodiment) is Rf, a curvature radius of the object-side surface of the lens element closer to the image side of the cemented lens set (that is, the object-side surface 171 of the seventh lens element 170 in the 1st embodiment) is Rr, a maximum optical effective radius of the image-side surface of the lens element closer to the object side of the cemented lens set (that is, the image-side surface 162 of the sixth lens element 160 in the 1st embodiment) is Yf, and a maximum optical effective radius of the object-side surface of the lens element closer to the image side of the cemented lens set (that is, the object-side surface 171 of the seventh lens element 170 in the 1st embodiment) is Yr, the following conditions are satisfied: $|SAGf/Rf|+|SAGr/Rr|=1.812$; and $|Yf/SAGf|+|Yr/SAGr|=3.093$.

The detailed optical data of the 1st embodiment are shown in Table 1 and the aspheric surface data are shown in Table 2 below.

TABLE 1

1st Embodiment
f = 1.09 mm, Fno = 2.16, HFOV = 94.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.005 | | 0.850 | Glass | 1.589 | 61.3 | −6.56 |
| 2 | | 2.846 | | 1.870 | | | | |
| 3 | Lens 2 | −46.127 | ASP | 0.700 | Plastic | 1.544 | 55.9 | −2.17 |
| 4 | | 1.216 | ASP | 1.167 | | | | |
| 5 | Lens 3 | −4.523 | ASP | 0.650 | Plastic | 1.544 | 56.0 | −4.91 |
| 6 | | 6.856 | ASP | 0.050 | | | | |
| 7 | Lens 4 | 3.373 | ASP | 1.118 | Plastic | 1.632 | 23.6 | 3.77 |
| 8 | | −7.060 | ASP | 0.050 | | | | |
| 9 | Lens 5 | 2.062 | ASP | 0.794 | Plastic | 1.515 | 60.6 | 3.45 |
| 10 | | −11.261 | ASP | −0.041 | | | | |
| 11 | Ape. Stop | Plano | | 0.180 | | | | |
| 12 | Lens 6 | 3.718 | ASP | 0.671 | Plastic | 1.639 | 23.5 | −1.71 |
| 13 | | 0.785 | ASP | 0.010 | Cement | 1.550 | 43.9 | |
| 14 | Lens 7 | 0.693 | ASP | 2.625 | Plastic | 1.534 | 55.9 | 1.40 |
| 15 | | −3.098 | ASP | 0.800 | | | | |

TABLE 1-continued

1st Embodiment
f = 1.09 mm, Fno = 2.16, HFOV = 94.2 deg.

| Surface # | | Curvature Radius | Thickness | Material | Index | Abbe # | Focal Length |
|---|---|---|---|---|---|---|---|
| 16 | Filter | Plano | 0.300 | Glass | 1.517 | 64.2 | — |
| 17 | | Plano | 0.200 | | | | |
| 18 | Cover Glass | Plano | 0.400 | Glass | 1.517 | 64.2 | — |
| 19 | | Plano | 0.104 | | | | |
| 20 | Image | Plano | — | | | | |

Reference wavelength is 587.6 nm (d-line).

TABLE 2

Aspheric Coefficients

| Surface # | 3 | 4 | 5 | 6 | 7 | 8 |
|---|---|---|---|---|---|---|
| k = | 9.0000E+01 | −2.8881E−01 | 9.0777E−01 | 3.2674E+01 | 5.2433E+00 | −9.0000E+01 |
| A4 = | 8.7480E−03 | −4.2587E−02 | −1.8070E−01 | −1.6712E−01 | −2.6939E−02 | 8.5932E−04 |
| A6 = | −3.8317E−03 | −2.7218E−03 | 3.8031E−02 | 7.8629E−02 | −8.3418E−03 | −3.4253E−03 |
| A8 = | 2.0968E−03 | −2.7222E−02 | 4.6708E−02 | −2.0414E−02 | 3.0754E−03 | 1.8548E−02 |
| A10 = | −5.5985E−04 | 4.3407E−02 | 2.6697E−03 | 1.6913E−03 | −6.6300E−03 | −1.6382E−02 |
| A12 = | 7.4883E−05 | −2.9217E−02 | 2.5448E−29 | 2.8855E−29 | 2.5127E−29 | 2.5127E−29 |
| A14 = | −3.9686E−06 | 7.3501E−03 | | | | |

| Surface # | 9 | 10 | 12 | 13 | 14 | 15 |
|---|---|---|---|---|---|---|
| k = | −5.6681E−01 | 9.0000E+01 | −9.0000E+01 | −5.3404E−01 | −8.4822E−01 | −1.2527E+01 |
| A4 = | 9.9483E−03 | −2.2384E−02 | −6.5434E−02 | −2.9739E−01 | −5.4899E−01 | −2.4036E−02 |
| A6 = | −3.9098E−03 | 3.4382E−03 | −1.3481E−01 | 1.5612E−01 | 9.4604E−01 | 6.5300E−03 |
| A8 = | 3.9793E−02 | −2.4682E−01 | 4.4396E−01 | −9.1886E−02 | −1.2498E+00 | 2.7652E−03 |
| A10 = | 4.6365E−03 | 1.4749E−01 | −5.0682E−01 | 5.6614E−02 | 1.0367E+00 | −5.5232E−03 |
| A12 = | 2.5127E−29 | 4.1565E−03 | 2.3668E−01 | −6.3164E−02 | −3.4067E−01 | 2.2901E−03 |
| A14 = | | | | −1.8984E−33 | −1.8984E−33 | −3.4799E−04 |

In Table 1, the curvature radius, the thickness and the focal length are shown in millimeters (mm). Surface numbers 0-20 represent the surfaces sequentially arranged from the object side to the image side along the optical axis. In Table 2, k represents the conic coefficient of the equation of the aspheric surface profiles. A4-A14 represent the aspheric coefficients ranging from the 4th order to the 14th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, in the photographing optical lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and an axial distance between the sixth lens element 160 and the seventh lens element 170 is T67, the following conditions are satisfied: T34<T12; T45<T12; T56<T12; T67<T12; T34<T23; T45<T23; T56<T23; and T67<T23.

In the photographing optical lens assembly according to the 1st embodiment, when the axial distance between the fourth lens element 140 and the fifth lens element 150 is T45, the central thickness of the fourth lens element 140 is CT4, and the central thickness of the fifth lens element 150 is CT5, the following conditions are satisfied: T45<CT4; and T45<CT5.

2nd Embodiment

Figure 3:
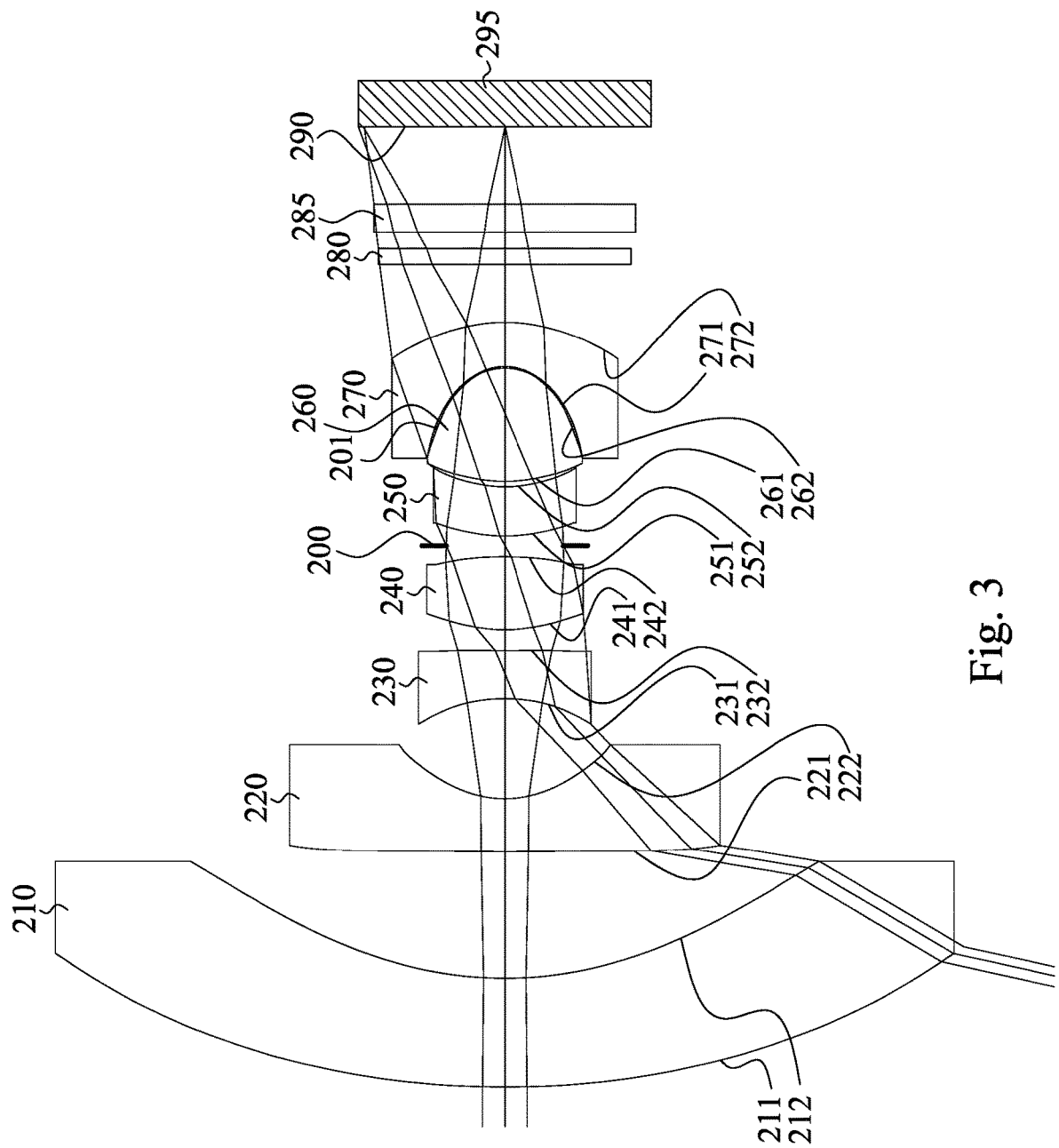
FIG. 3 is a schematic view of an imaging apparatus according to the 2nd embodiment of the present disclosure.
Figure 4:
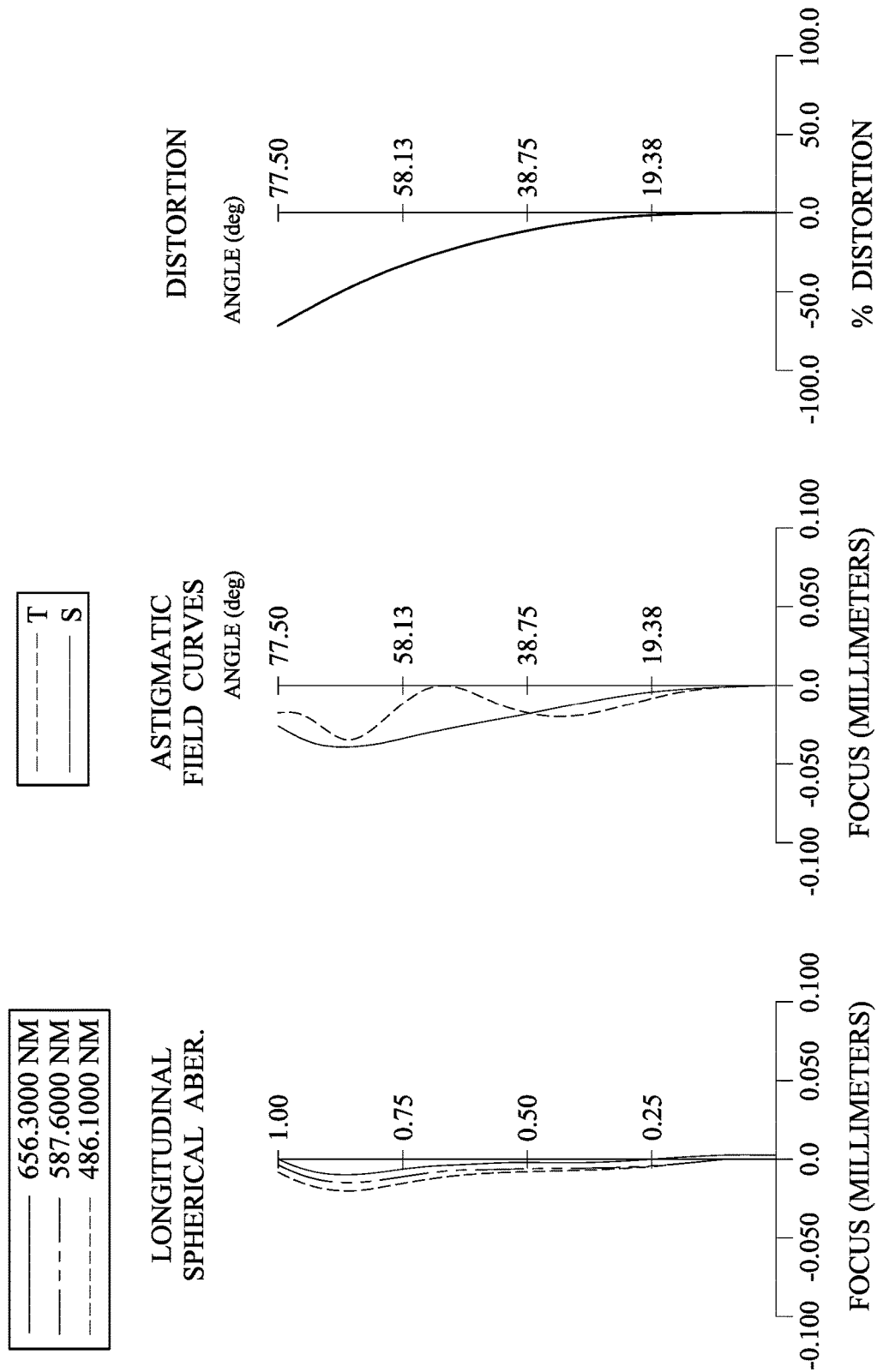
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes a photographing optical lens assembly (its reference numeral is omitted) and an image sensor 295. The photographing optical lens assembly includes, in order from an object side to an image side, a first lens element 210, a second lens element 220, a third lens element 230, a fourth lens element 240, an aperture stop 200, a fifth lens element 250, a sixth lens element 260, a seventh lens element 270, a filter 280, a cover glass 285, and an image surface 290, wherein the image sensor 295 is disposed on the image surface 290 of the photographing optical lens assembly. The photographing optical lens assembly includes seventh lens elements (210, 220, 230, 240, 250, 260, 270) without additional one or more lens elements inserted between the first lens element 210 and the seventh lens element 270.

The first lens element 210 with negative refractive power has an object-side surface 211 being convex in a paraxial region thereof and an image-side surface 212 being concave in a paraxial region thereof. The first lens element 210 is made of a glass material, and has the object-side surface 211 and the image-side surface 212 being both aspheric. Furthermore, each of the object-side surface 211 and the image-side surface 212 of the first lens element 210 includes at least one inflection point.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric. Furthermore, the object-side surface 221 of the second lens element 220 includes at least one inflection point.

The third lens element 230 with negative refractive power has an object-side surface 231 being concave in a paraxial region thereof and an image-side surface 232 being concave in a paraxial region thereof. The third lens element 230 is made of a plastic material, and has the object-side surface 231 and the image-side surface 232 being both aspheric. Furthermore, the image-side surface 232 of the third lens element 230 includes at least one inflection point.

The fourth lens element 240 with positive refractive power has an object-side surface 241 being convex in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of a plastic material, and has the object-side surface 261 and the image-side surface 262 being both aspheric.

The seventh lens element 270 with negative refractive power has an object-side surface 271 being concave in a paraxial region thereof and an image-side surface 272 being convex in a paraxial region thereof. The seventh lens element 270 is made of a plastic material, and has the object-side surface 271 and the image-side surface 272 being both aspheric.

The filter 280 is made of a glass material, wherein the filter 280 and the cover glass 285 are located between the seventh lens element 270 and the image surface 290 in order, and will not affect the focal length of the photographing optical lens assembly.

According to the 2nd embodiment, the photographing optical lens assembly includes at least one cemented lens set (its reference numeral is omitted), which is cemented by the sixth lens element 260 and the seventh lens element 270. Two cemented surfaces (its reference numeral is omitted) of the cemented lens set are the image-side surface 262 of the sixth lens element 260 and the object-side surface 271 of the seventh lens element 270, and are connected by a cemented layer 201. In detail, the cemented lens set includes, in order from an object side to an image side, the sixth lens element 260, the cemented layer 201 and the seventh lens element 270. The cemented layer 201 has an object-side surface (its reference numeral is omitted) thereof and an image-side surface (its reference numeral is omitted) thereof, wherein the object-side surface of the cemented layer 201 is cemented to the image-side surface 262 of the sixth lens element 260, and the image-side surface of the cemented layer 201 is cemented to the object-side surface 271 of the seventh lens element 270.

The detailed optical data of the 2nd embodiment are shown in Table 3 and the aspheric surface data are shown in Table 4 below.

TABLE 3

2nd Embodiment
f = 1.34 mm, Fno = 2.40, HFOV = 77.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.566 | ASP | 1.354 | Glass | 1.603 | 60.7 | −14.79 |
| 2 | | 4.815 | ASP | 1.580 | | | | |
| 3 | Lens 2 | 43.246 | ASP | 0.663 | Plastic | 1.544 | 56.0 | −2.53 |
| 4 | | 1.324 | ASP | 1.249 | | | | |
| 5 | Lens 3 | −2.504 | ASP | 0.600 | Plastic | 1.669 | 19.5 | −2.96 |
| 6 | | 10.391 | ASP | 0.259 | | | | |
| 7 | Lens 4 | 1.852 | ASP | 0.916 | Plastic | 1.614 | 26.0 | 2.39 |
| 8 | | −5.708 | ASP | 0.140 | | | | |
| 9 | Ape. Stop | Plano | | 0.120 | | | | |
| 10 | Lens 5 | 1.984 | ASP | 0.615 | Plastic | 1.669 | 19.5 | −27.40 |
| 11 | | 1.568 | ASP | 0.066 | | | | |
| 12 | Lens 6 | 1.843 | ASP | 1.412 | Plastic | 1.534 | 55.9 | 1.14 |
| 13 | | −0.670 | ASP | 0.020 | Cement | 1.550 | 43.9 | |
| 14 | Lens 7 | −0.693 | ASP | 0.556 | Plastic | 1.639 | 23.5 | −1.90 |
| 15 | | −2.113 | ASP | 0.724 | | | | |
| 16 | Filter | Plano | | 0.200 | Glass | 1.517 | 64.2 | — |
| 17 | | Plano | | 0.200 | | | | |
| 18 | Cover Glass | Plano | | 0.350 | Glass | 1.517 | 64.2 | — |
| 19 | | Plano | | 0.968 | | | | |
| 20 | Image | Plano | | — | | | | |

Reference wavelength is 587.6 nm (d-line).

TABLE 4

Aspheric Coefficients

| Surface # | | | | |
|---|---|---|---|---|
| 1 | 2 | 3 | 4 | 5 |
| k = 1.2108E+00 | −7.5862E−01 | 8.8801E+01 | −1.7516E−01 | −1.4551E+01 |
| A4 = 4.1090E−04 | −1.0023E−04 | −4.6990E−03 | −4.8176E−02 | −2.4352E−01 |
| A6 = −3.6809E−05 | −4.0647E−05 | 4.2953E−04 | −1.3440E−02 | 1.2062E−01 |
| A8 = 1.3639E−06 | −1.8055E−06 | 1.5655E−04 | −1.1023E−02 | 6.8572E−02 |
| A10 = −1.3635E−08 | 7.4153E−08 | −3.2292E−05 | 1.4443E−02 | −1.3335E−01 |
| A12 = −1.1770E−10 | 4.4200E−12 | 2.5589E−06 | −1.0822E−02 | 8.0517E−02 |
| A14 = −1.6687E−14 | 1.5202E−12 | −8.1057E−08 | 2.9562E−03 | −1.9458E−02 |

| Surface # | | | | |
|---|---|---|---|---|
| 6 | 7 | 8 | 10 | 11 |
| k = 8.9766E+01 | −1.1602E+00 | 3.3751E+01 | −1.6149E+00 | −8.0881E−01 |
| A4 = −1.9792E−01 | −1.2022E−01 | −1.0856E−01 | −1.3474E−01 | −2.1647E−01 |
| A6 = 2.0321E−01 | 1.1214E−01 | 2.0715E−01 | 1.9900E−01 | 4.6359E−01 |
| A8 = −7.3640E−02 | −4.6098E−02 | −2.0147E−01 | −7.2687E−02 | −9.8581E−01 |
| A10 = −2.0599E−02 | −2.2120E−02 | 1.4749E−01 | −3.0562E−02 | 2.1931E+00 |
| A12 = 1.2561E−02 | 2.0761E−02 | −2.1974E−02 | 3.5852E−02 | −2.5037E+00 |
| A14 = | | | | 1.0681E+00 |

| Surface # | | | |
|---|---|---|---|
| 12 | 13 | 14 | 15 |
| k = −1.2212E+01 | −8.2198E−01 | −5.8201E−01 | 6.4874E−03 |
| A4 = 4.6813E−02 | 2.2477E+00 | −4.6320E−01 | 3.5635E−02 |
| A6 = 3.4845E−02 | −2.4951E+01 | 4.1988E+00 | −3.4681E−02 |
| A8 = −3.7264E−01 | 9.7016E+01 | −1.6785E+01 | 5.5288E−02 |
| A10 = 1.2980E+00 | −1.7866E+02 | 3.1011E+01 | −4.5793E−02 |
| A12 = −1.5700E+00 | 1.5512E+02 | −2.6740E+01 | 1.8103E−02 |
| A14 = 6.3433E−01 | −5.1266E+01 | 8.5365E+00 | −2.8133E−03 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.34 | f/EPD | 2.40 |
| Fno. | 2.40 | f2/f3 | 0.85 |
| HFOV [deg.] | 77.5 | Σ|f/fi| | 3.56 |
| 1/|tan(HFOV)| | 0.22 | Y72/Y11 | 0.25 |
| V4 | 26.0 | |f/fi|max | 1.17 |
| (V4 + V6 + V7) | 105.4 | D [mm] | 0.020 |
| CTmax/CTmin | 2.54 | |SAGf − SAGr| × 100 [mm] | 1.25 |
| (R5 + R6)/(R5 − R6) | −0.61 | |f/ff| + |f/fr| | 1.88 |
| (R13 + R14)/(R13 − R14) | −1.97 | Nf + Nr | 3.17 |
| R14/f | −1.58 | |SAGf/Rf| + |SAGr/Rr| | 3.336 |
| TL/ImgH | 6.56 | |Yf/SAGf| + |Yr/SAGr| | 1.709 |

Furthermore, in the photographing optical lens assembly according to the 2nd embodiment, when an axial distance between the first lens element 210 and the second lens element 220 is T12, an axial distance between the second lens element 220 and the third lens element 230 is T23, an axial distance between the third lens element 230 and the fourth lens element 240 is T34, an axial distance between the fourth lens element 240 and the fifth lens element 250 is T45, an axial distance between the fifth lens element 250 and the sixth lens element 260 is T56, and an axial distance between the sixth lens element 260 and the seventh lens element 270 is T67, the following conditions are satisfied: T34<T12; T45<T12; T56<T12; T67<T12; T34<T23; T45<T23; T56<T23; and T67<T23.

In the photographing optical lens assembly according to the 2nd embodiment, when the axial distance between the fourth lens element 240 and the fifth lens element 250 is T45, the central thickness of the fourth lens element 240 is CT4, and the central thickness of the fifth lens element 250 is CT5, the following conditions are satisfied: T45<CT4; and T45<CT5.

3rd Embodiment

Figure 5:
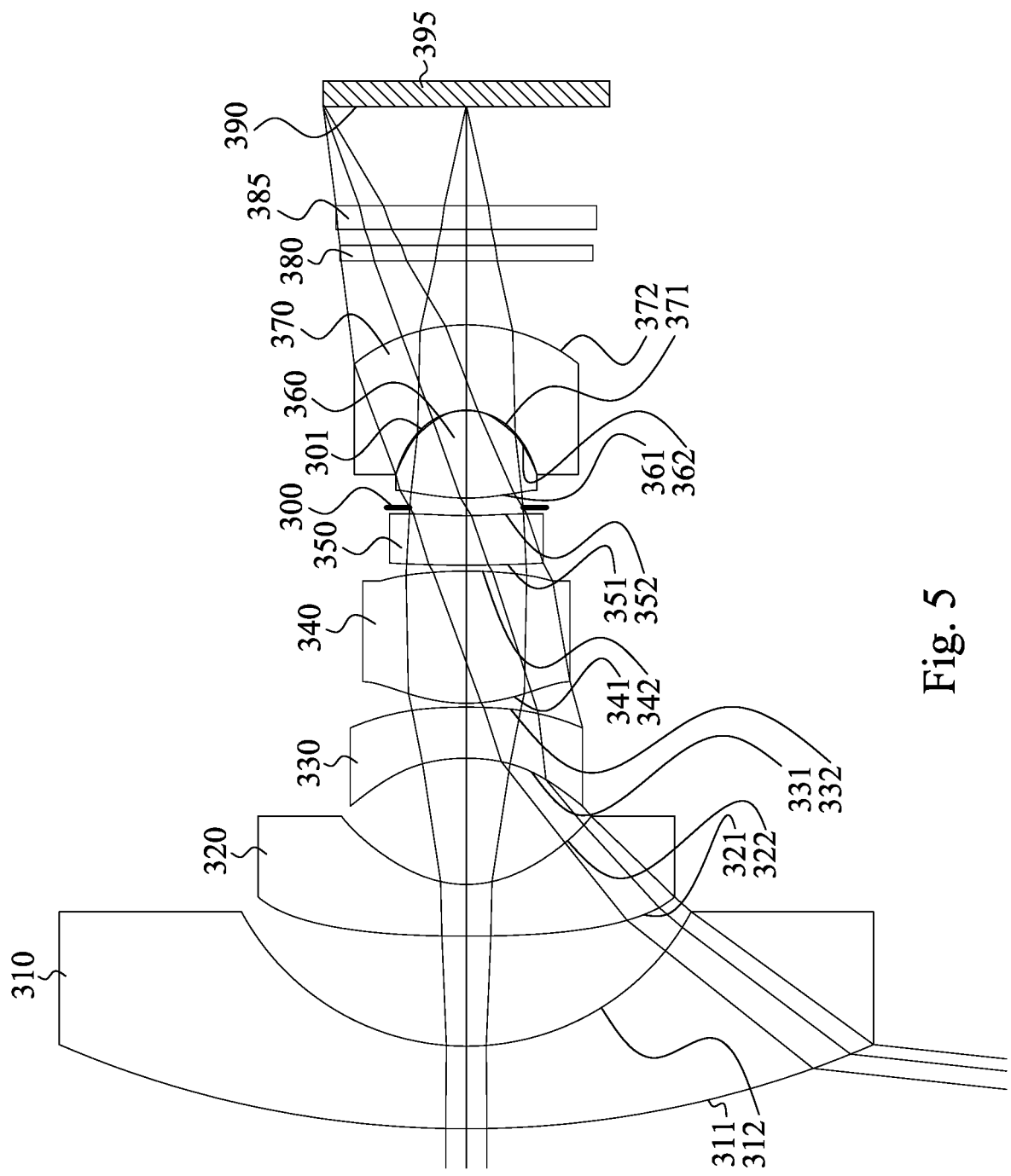
FIG. 5 is a schematic view of an imaging apparatus according to the 3rd embodiment of the present disclosure.
Figure 6:
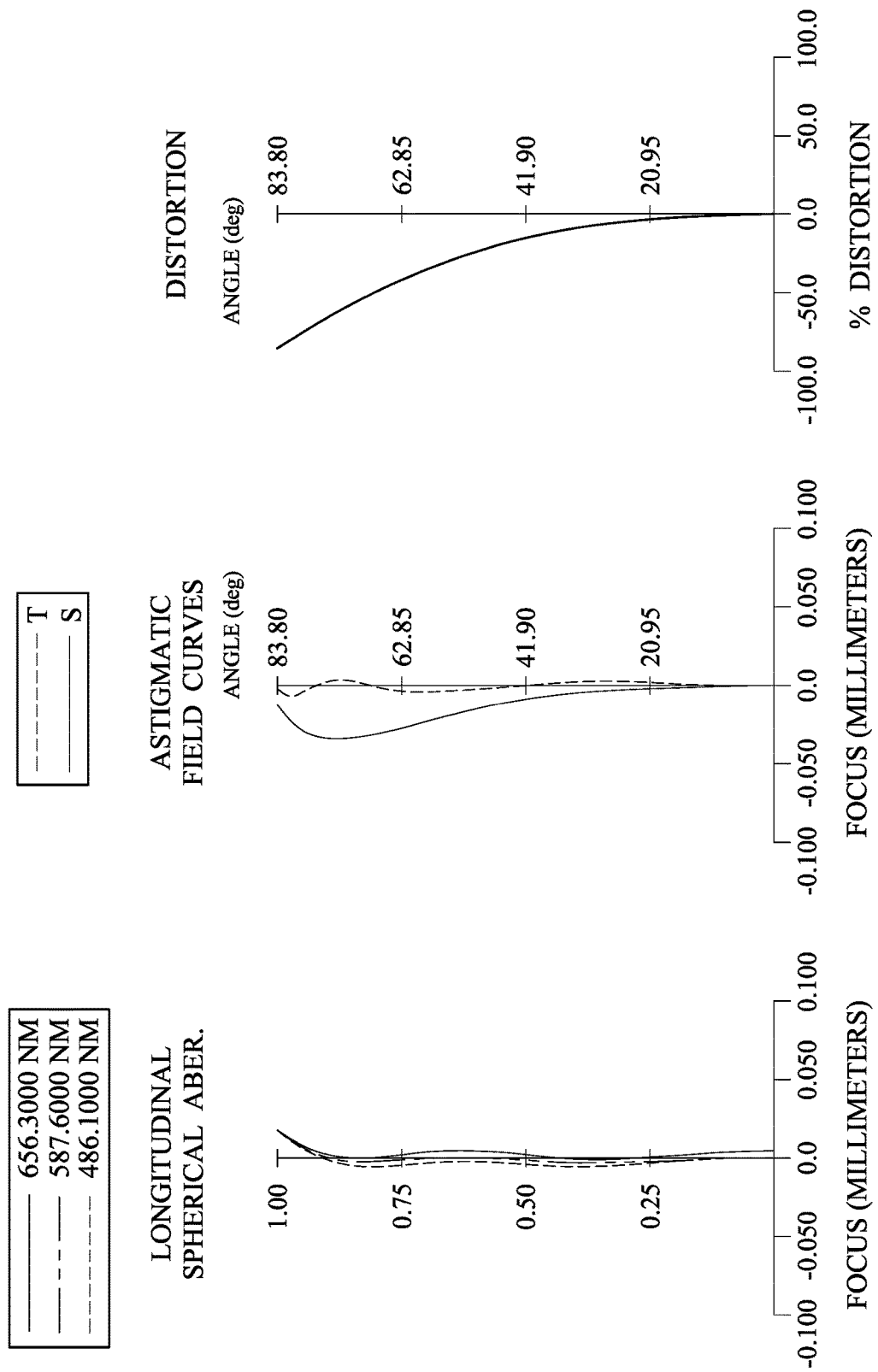
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes a photographing optical lens assembly (its reference numeral is omitted) and an image sensor 395. The photographing optical lens assembly includes, in order from an object side to an image side, a first lens element 310, a second lens element 320, a third lens element 330, a fourth lens element 340, a fifth lens element 350, an aperture stop 300, a sixth lens element 360, a seventh lens element 370, a filter 380, a cover glass 385, and an image surface 390, wherein the image sensor 395 is disposed on the image surface 390 of the photographing optical lens assembly. The photographing optical lens assembly includes seventh lens elements (310, 320, 330, 340, 350, 360, 370) without additional one or more lens elements inserted between the first lens element 310 and the seventh lens element 370.

The first lens element 310 with negative refractive power has an object-side surface 311 being convex in a paraxial region thereof and an image-side surface 312 being concave in a paraxial region thereof. The first lens element 310 is made of a glass material, and has the object-side surface 311 and the image-side surface 312 being both spherical.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with negative refractive power has an object-side surface 331 being concave in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of a plastic material, and has the object-side surface 341 and the image-side surface 342 being both aspheric. Furthermore, the object-side surface 341 of the fourth lens element 340 includes at least one inflection point.

The fifth lens element 350 with negative refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric. Furthermore, the image-side surface 352 of the fifth lens element 350 includes at least one inflection point.

The sixth lens element 360 with positive refractive power has an object-side surface 361 being convex in a paraxial region thereof and an image-side surface 362 being convex in a paraxial region thereof. The sixth lens element 360 is made of a plastic material, and has the object-side surface 361 and the image-side surface 362 being both aspheric. Furthermore, the object-side surface 361 of the sixth lens element 360 includes at least one inflection point.

The seventh lens element 370 with negative refractive power has an object-side surface 371 being concave in a paraxial region thereof and an image-side surface 372 being convex in a paraxial region thereof. The seventh lens element 370 is made of a plastic material, and has the object-side surface 371 and the image-side surface 372 being both aspheric.

The filter 380 is made of a glass material, wherein the filter 380 and the cover glass 385 are located between the seventh lens element 370 and the image surface 390 in order, and will not affect the focal length of the photographing optical lens assembly.

According to the 3rd embodiment, the photographing optical lens assembly includes at least one cemented lens set (its reference numeral is omitted), which is cemented by the sixth lens element 360 and the seventh lens element 370. Two cemented surfaces (its reference numeral is omitted) of the cemented lens set are the image-side surface 362 of the sixth lens element 360 and the object-side surface 371 of the seventh lens element 370, and are connected by a cemented layer 301. In detail, the cemented lens set includes, in order from an object side to an image side, the sixth lens element 360, the cemented layer 301 and the seventh lens element 370. The cemented layer 301 has an object-side surface (its reference numeral is omitted) thereof and an image-side surface (its reference numeral is omitted) thereof, wherein the object-side surface of the cemented layer 301 is cemented to the image-side surface 362 of the sixth lens element 360, and the image-side surface of the cemented layer 301 is cemented to the object-side surface 371 of the seventh lens element 370.

The detailed optical data of the 3rd embodiment are shown in Table 5 and the aspheric surface data are shown in Table 6 below.

TABLE 5

3rd Embodiment
f = 1.23 mm, Fno = 2.34, HFOV= 83.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.030 | | 1.050 | Glass | 1.713 | 53.9 | −6.34 |
| 2 | | 3.243 | | 1.400 | | | | |
| 3 | Lens 2 | 20.177 | ASP | 0.657 | Plastic | 1.511 | 56.8 | −3.07 |
| 4 | | 1.437 | ASP | 1.605 | | | | |
| 5 | Lens 3 | −2.571 | ASP | 0.650 | Plastic | 1.544 | 55.9 | −7.05 |
| 6 | | −8.509 | ASP | 0.050 | | | | |
| 7 | Lens 4 | 2.129 | ASP | 1.681 | Plastic | 1.584 | 28.2 | 2.84 |
| 8 | | −5.304 | ASP | 0.075 | | | | |
| 9 | Lens 5 | 14.856 | ASP | 0.630 | Plastic | 1.660 | 20.4 | −11.70 |
| 10 | | 4.994 | ASP | 0.103 | | | | |
| 11 | Ape. Stop | Plano | | 0.120 | | | | |
| 12 | Lens 6 | 2.372 | ASP | 1.110 | Plastic | 1.534 | 55.9 | 1.96 |
| 13 | | −1.565 | ASP | 0.010 | Cement | 1.550 | 43.9 | |
| 14 | Lens 7 | −0.681 | ASP | 1.084 | Plastic | 1.639 | 23.5 | −2.06 |
| 15 | | −2.284 | ASP | 0.813 | | | | |
| 16 | Filter | Plano | | 0.200 | Glass | 1.517 | 64.2 | — |
| 17 | | Plano | | 0.200 | | | | |
| 18 | Cover Glass | Plano | | 0.300 | Glass | 1.517 | 64.2 | — |
| 19 | | Plano | | 1.262 | | | | |
| 20 | Image | Plano | | — | | | | |

Reference wavelength is 587.6 nm (d-line).

TABLE 6

Aspheric Coefficients

| Surface # | 3 | 4 | 5 | 6 | 7 | 8 |
|---|---|---|---|---|---|---|
| k = | 8.2581E+00 | −3.0907E−01 | −1.2585E+01 | −6.2528E+01 | −1.1363E+00 | −6.1850E+01 |
| A4 = | 9.3308E−03 | −3.5732E−02 | −2.0216E−01 | −9.1090E−02 | −1.1783E−02 | −5.2358E−03 |
| A6 = | −2.4155E−03 | −8.0283E−03 | 1.2077E−01 | 6.4138E−02 | −4.6959E−03 | −4.9445E−02 |
| A8 = | 6.0278E−04 | 1.4711E−03 | −5.0445E−02 | −3.7505E−02 | −1.0395E−02 | 2.6012E−02 |
| A10 = | −7.7591E−05 | −4.7536E−04 | 1.4609E−02 | 1.3628E−02 | 1.6939E−03 | −3.6543E−03 |
| A12 = | 4.6427E−06 | −1.5918E−04 | −2.0081E−03 | −2.0983E−03 | | |

| Surface # | 9 | 10 | 12 | 13 | 14 | 15 |
|---|---|---|---|---|---|---|
| k = | −3.3926E+01 | −7.0026E+01 | −1.1226E+01 | 9.9078E−01 | −5.1352E−01 | 8.1393E−01 |
| A4 = | −1.2952E−02 | −1.0919E−01 | −4.8708E−02 | −6.1501E+00 | 1.0761E+00 | 1.6986E−02 |
| A6 = | 4.0330E−03 | 1.0912E−01 | −5.0832E−02 | 3.0330E+01 | −5.4070E+00 | −1.2723E−03 |
| A8 = | 1.0332E−02 | −5.6146E−02 | 2.7614E−01 | −6.8505E+01 | 1.2094E+01 | −2.1722E−03 |
| A10 = | −2.7799E−03 | −9.4292E−04 | −4.0292E−01 | 7.1030E+01 | −1.2601E+01 | 2.9358E−03 |
| A12 = | | | 2.0311E−01 | −2.7835E+01 | 4.8885E+00 | −1.2470E−03 |
| A14 = | | | | | | 2.8836E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.23 | f/EPD | 2.34 |
| Fno. | 2.34 | f2/f3 | 0.44 |
| HFOV [deg.] | 83.8 | Σ\|f/fi\| | 2.52 |
| 1/\|tan(HFOV)\| | 0.11 | Y72/Y11 | 0.28 |
| V4 | 28.2 | \|f/fi\|max | 0.63 |
| (V4 + V6 + V7) | 107.6 | D [mm] | 0.010 |
| CTmax/CTmin | 2.67 | \|SAGf − SAGr\| × 100 [mm] | 0.61 |
| (R5 + R6)/(R5 − R6) | −1.87 | \|f/ff\| + \|f/fr\| | 1.22 |
| (R13 + R14)/(R13 − R14) | −1.85 | Nf + Nr | 3.17 |
| R14/f | −1.86 | \|SAGf/Rf\| + \|SAGr/Rr\| | 1.723 |
| TL/ImgH | 7.14 | \|Yf/SAGf\| + \|Yr/SAGr\| | 2.195 |

Furthermore, in the photographing optical lens assembly according to the 3rd embodiment, when an axial distance between the first lens element 310 and the second lens element 320 is T12, an axial distance between the second lens element 320 and the third lens element 330 is T23, an axial distance between the third lens element 330 and the fourth lens element 340 is T34, an axial distance between the fourth lens element 340 and the fifth lens element 350 is T45, an axial distance between the fifth lens element 350 and the sixth lens element 360 is T56, and an axial distance between the sixth lens element 360 and the seventh lens element 370 is T67, the following conditions are satisfied: T34<T12; T45<T12; T56<T12; T67<T12; T34<T23; T45<T23; T56<T23; and T67<T23.

In the photographing optical lens assembly according to the 3rd embodiment, when the axial distance between the fourth lens element 340 and the fifth lens element 350 is T45, the central thickness of the fourth lens element 340 is CT4, and the central thickness of the fifth lens element 350 is CT5, the following conditions are satisfied: T45<CT4; and T45<CT5.

4th Embodiment

Figure 7:
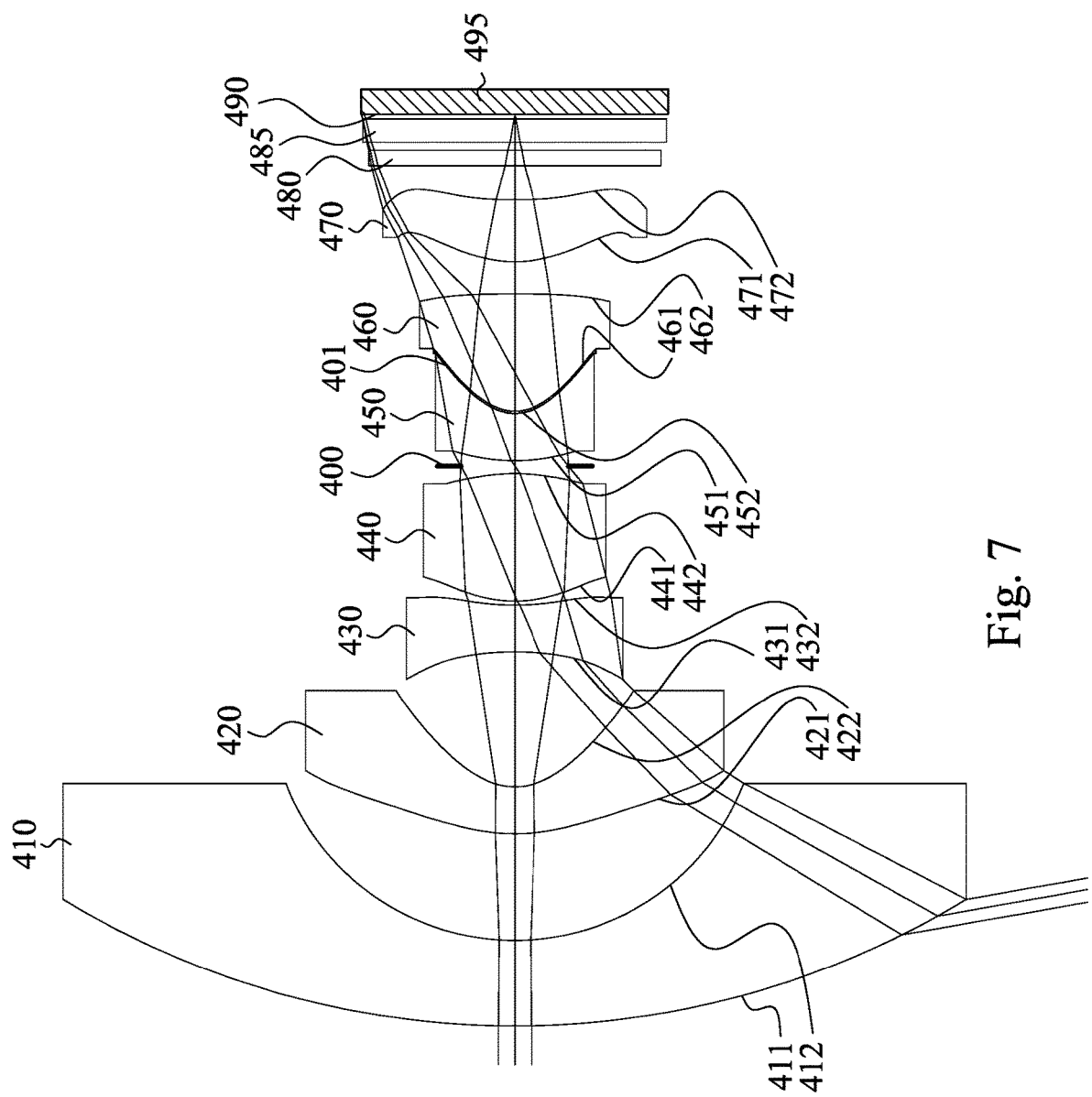
FIG. 7 is a schematic view of an imaging apparatus according to the 4th embodiment of the present disclosure.
Figure 8:
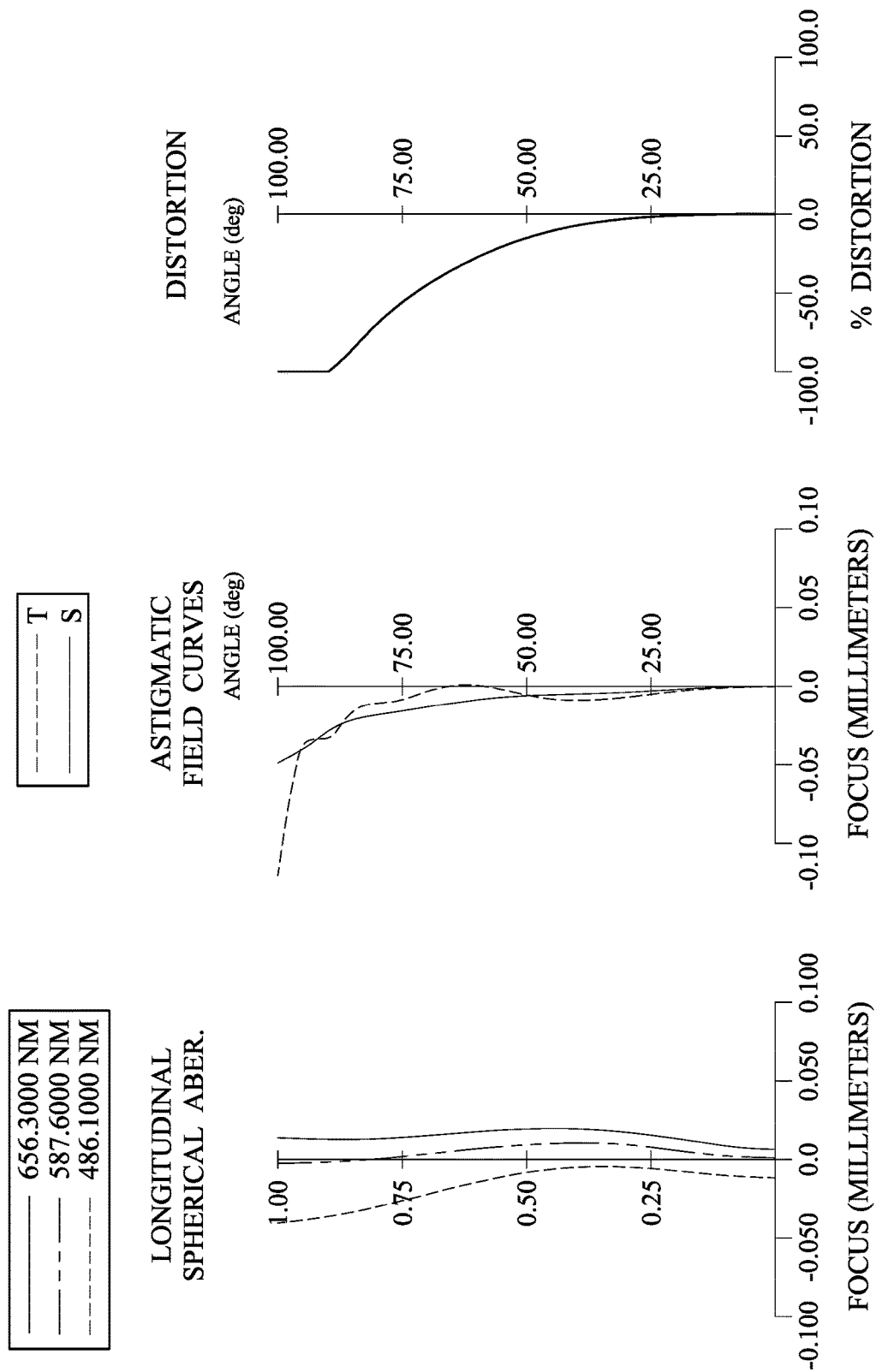
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes a photographing optical lens assembly (its reference numeral is omitted) and an image sensor 495. The photographing optical lens assembly includes, in order from an object side to an image side, a first lens element 410, a second lens element 420, a third lens element 430, a fourth lens element 440, an aperture stop 400, a fifth lens element 450, a sixth lens element 460, a seventh lens element 470, a filter 480, a cover glass 485, and an image surface 490, wherein the image sensor 495 is disposed on the image surface 490 of the photographing optical lens assembly. The photographing optical lens assembly includes seventh lens elements (410, 420, 430, 440, 450, 460, 470) without additional one or more lens elements inserted between the first lens element 410 and the seventh lens element 470.

The first lens element 410 with negative refractive power has an object-side surface 411 being convex in a paraxial region thereof and an image-side surface 412 being concave in a paraxial region thereof. The first lens element 410 is made of a glass material, and has the object-side surface 411 and the image-side surface 412 being both spherical.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of a plastic material, and has the object-side surface 431 and the image-side surface 432 being both aspheric. Furthermore, the image-side surface 432 of the third lens element 430 includes at least one inflection point.

The fourth lens element 440 with positive refractive power has an object-side surface 441 being convex in a paraxial region thereof and an image-side surface 442 being convex in a paraxial region thereof. The fourth lens element 440 is made of a plastic material, and has the object-side surface 441 and the image-side surface 442 being both aspheric. Furthermore, the object-side surface 441 of the fourth lens element 440 includes at least one inflection point.

The fifth lens element 450 with negative refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, each of the object-side surface 451 and the image-side surface 452 of the fifth lens element 450 includes at least one inflection point.

The sixth lens element 460 with positive refractive power has an object-side surface 461 being convex in a paraxial region thereof and an image-side surface 462 being convex in a paraxial region thereof. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point.

The seventh lens element 470 with positive refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Furthermore, each of the object-side surface 471 and the image-side surface 472 of the seventh lens element 470 includes at least one inflection point.

The filter 480 is made of a glass material, wherein the filter 480 and the cover glass 485 are located between the seventh lens element 470 and the image surface 490 in order, and will not affect the focal length of the photographing optical lens assembly.

According to the 4th embodiment, the photographing optical lens assembly includes at least one cemented lens set (its reference numeral is omitted), which is cemented by the fifth lens element 450 and the sixth lens element 460. Two cemented surfaces (its reference numeral is omitted) of the cemented lens set are the image-side surface 452 of the fifth lens element 450 and the object-side surface 461 of the sixth lens element 460, and are connected by a cemented layer 401. In detail, the cemented lens set includes, in order from an object side to an image side, the fifth lens element 450, the cemented layer 401 and the sixth lens element 460. The cemented layer 401 has an object-side surface (its reference numeral is omitted) thereof and an image-side surface (its reference numeral is omitted) thereof, wherein the object-side surface of the cemented layer 401 is cemented to the image-side surface 452 of the fifth lens element 450, and the image-side surface of the cemented layer 401 is cemented to the object-side surface 461 of the sixth lens element 460.

The detailed optical data of the 4th embodiment are shown in Table 7 and the aspheric surface data are shown in Table 8 below.

TABLE 7

4th Embodiment
f = 0.83 mm, Fno = 1.95, HFOV = 100.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.107 | | 1.100 | Glass | 1.804 | 46.6 | −5.81 |
| 2 | | 3.142 | | 1.370 | | | | |
| 3 | Lens 2 | 2.483 | ASP | 0.600 | Plastic | 1.534 | 57.4 | −2.52 |
| 4 | | 0.800 | ASP | 1.737 | | | | |
| 5 | Lens 3 | −4.313 | ASP | 0.600 | Plastic | 1.544 | 55.9 | −3.54 |
| 6 | | 3.647 | ASP | 0.050 | | | | |
| 7 | Lens 4 | 1.780 | ASP | 1.635 | Plastic | 1.614 | 26.0 | 1.96 |
| 8 | | −2.430 | ASP | 0.094 | | | | |
| 9 | Ape. Stop | Plano | | 0.074 | | | | |
| 10 | Lens 5 | 2.738 | ASP | 0.609 | Plastic | 1.639 | 23.5 | −1.29 |
| 11 | | 0.580 | ASP | 0.030 | Cement | 1.485 | 53.2 | |
| 12 | Lens 6 | 0.577 | ASP | 1.501 | Plastic | 1.544 | 55.9 | 1.06 |
| 13 | | −55.308 | ASP | 0.413 | | | | |
| 14 | Lens 7 | 1.584 | ASP | 0.797 | Plastic | 1.515 | 60.6 | 3.71 |
| 15 | | 7.653 | ASP | 0.440 | | | | |
| 16 | Filter | Plano | | 0.200 | Glass | 1.517 | 64.2 | — |
| 17 | | Plano | | 0.100 | | | | |
| 18 | Cover Glass | Plano | | 0.300 | Glass | 1.517 | 64.2 | — |
| 19 | | Plano | | 0.060 | | | | |
| 20 | Image | Plano | | — | | | | |

Reference wavelength is 587.6 nm (d-line).

TABLE 8

Aspheric Coefficients

| Surface # | 3 | 4 | 5 | 6 | 7 | 8 |
|---|---|---|---|---|---|---|
| k = | −2.3057E+00 | −9.7578E−01 | 6.3905E+00 | −4.1019E−01 | −1.3962E+00 | −2.2441E+01 |
| A4 = | −2.1485E−02 | −5.7420E−02 | −4.4483E−02 | 5.1744E−02 | 7.9157E−02 | −3.8255E−02 |
| A6 = | 3.0210E−03 | −2.0176E−03 | 2.3686E−02 | −1.5836E−01 | −1.5170E−01 | 5.2507E−03 |
| A8 = | −1.5062E−04 | 2.2942E−03 | −1.1900E−02 | 7.6241E−02 | 7.0093E−02 | −2.3024E−02 |
| A10 = | 4.2698E−06 | 3.4226E−04 | 3.9966E−03 | −1.0988E−02 | −1.3431E−02 | 1.2930E−02 |

TABLE 8-continued

| Aspheric Coefficients | | | | | |
|---|---|---|---|---|---|
| A12 = | −1.1623E−19 | 3.7659E−19 | −1.1961E−19 | 2.1095E−20 | −1.3166E−20 |

| Surface # | 10 | 11 | 12 | 13 | 14 | 15 |
|---|---|---|---|---|---|---|
| k = | −2.1533E+01 | −7.7329E−01 | −1.8829E+00 | 9.9000E+01 | −3.7968E+00 | 1.7440E+01 |
| A4 = | 2.0996E−01 | −1.6253E−01 | 6.0472E−01 | −7.6850E−02 | 3.3980E−02 | 1.0670E+00 |
| A6 = | −3.5518E−01 | −4.7302E−01 | −1.4250E+00 | 7.1181E−02 | −2.9278E−02 | −3.4845E+00 |
| A8 = | 3.2810E−01 | 8.0551E−01 | 2.1367E+00 | −4.9591E−02 | 3.5374E−03 | 4.9246E+00 |
| A10 = | −1.4334E−01 | −7.0413E−01 | −1.5994E+00 | 1.3401E−02 | 3.3257E−03 | −4.6848E+00 |
| A12 = | 1.9083E−20 | 1.8312E−01 | 4.3960E−01 | 1.4840E−19 | −2.3460E−03 | 1.7049E+00 |
| A14 = | | | | 5.2468E−24 | | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.83 | f/EPD | 1.95 |
| Fno. | 1.95 | f2/f3 | 0.71 |
| HFOV [deg.] | 100.0 | Σ|f/fi| | 2.76 |
| 1/|tan(HFOV)| | 0.18 | Y72/Y11 | 0.29 |
| V4 | 26.0 | |f/fi|max | 0.78 |
| (V4 + V6 + V7) | 142.5 | D [mm] | 0.030 |
| CTmax/CTmin | 2.73 | |SAGf − SAGr| × 100 [mm] | 3.19 |
| (R5 + R6)/(R5 − R6) | 0.08 | |f/ff| + |f/fr| | 1.42 |
| (R13 + R14)/(R13 − R14) | −1.52 | Nf + Nr | 3.18 |
| R14/f | 9.27 | |SAGf/Rf| + |SAGr/Rr| | 2.716 |
| TL/ImgH | 5.95 | |Yf/SAGf| + |Yr/SAGr| | 2.629 |

Furthermore, in the photographing optical lens assembly according to the 4th embodiment, when an axial distance between the first lens element 410 and the second lens element 420 is T12, an axial distance between the second lens element 420 and the third lens element 430 is T23, an axial distance between the third lens element 430 and the fourth lens element 440 is T34, an axial distance between the fourth lens element 440 and the fifth lens element 450 is T45, an axial distance between the fifth lens element 450 and the sixth lens element 460 is T56, and an axial distance between the sixth lens element 460 and the seventh lens element 470 is T67, the following conditions are satisfied: T34<T12; T45<T12; T56<T12; T67<T12; T34<T23; T45<T23; T56<T23; and T67<T23.

In the photographing optical lens assembly according to the 4th embodiment, when the axial distance between the fourth lens element 440 and the fifth lens element 450 is T45, the central thickness of the fourth lens element 440 is CT4, and the central thickness of the fifth lens element 450 is CT5, the following conditions are satisfied: T45<CT4; and T45<CT5.

5th Embodiment

Figure 9:
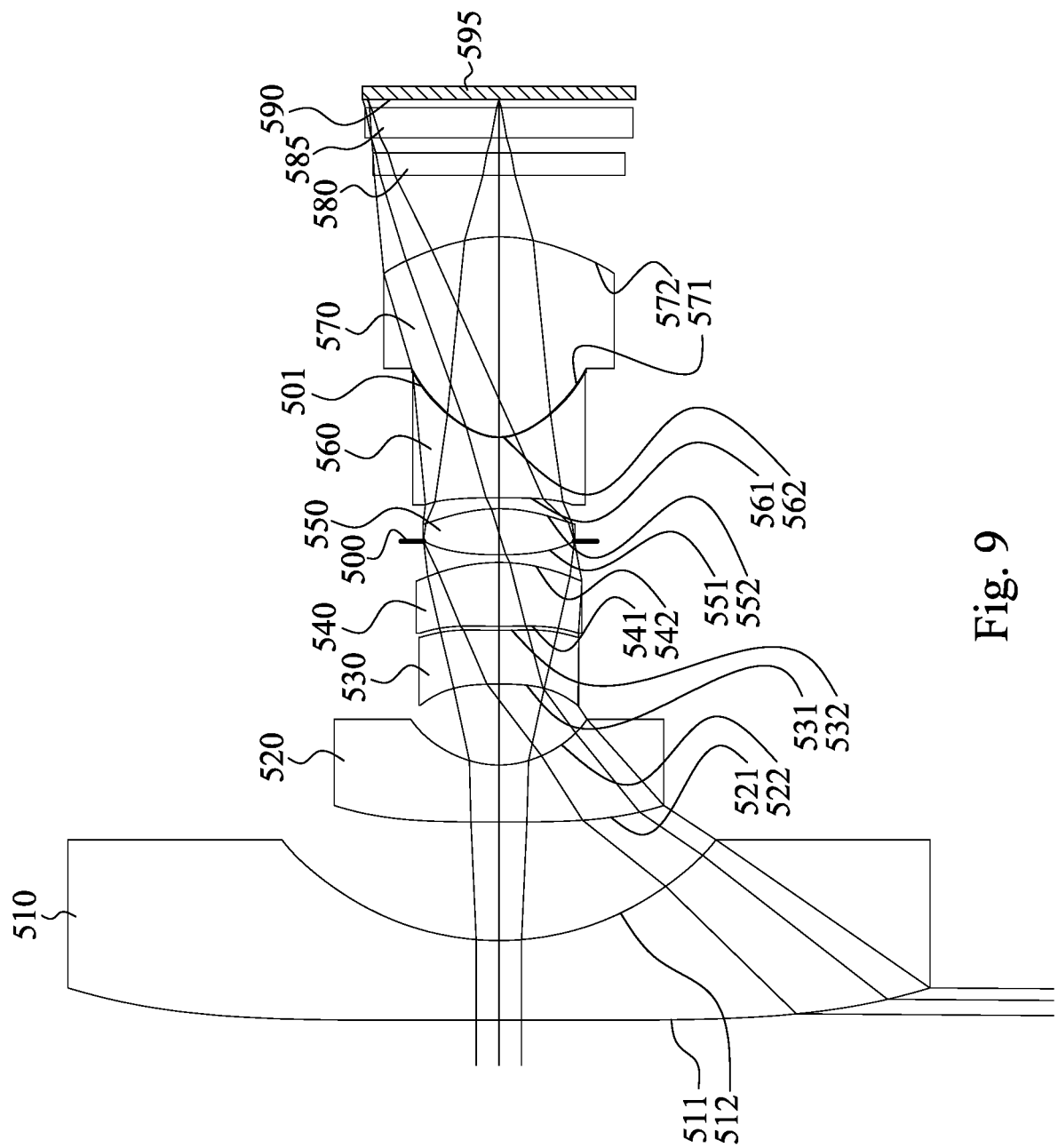
FIG. 9 is a schematic view of an imaging apparatus according to the 5th embodiment of the present disclosure.
Figure 10:
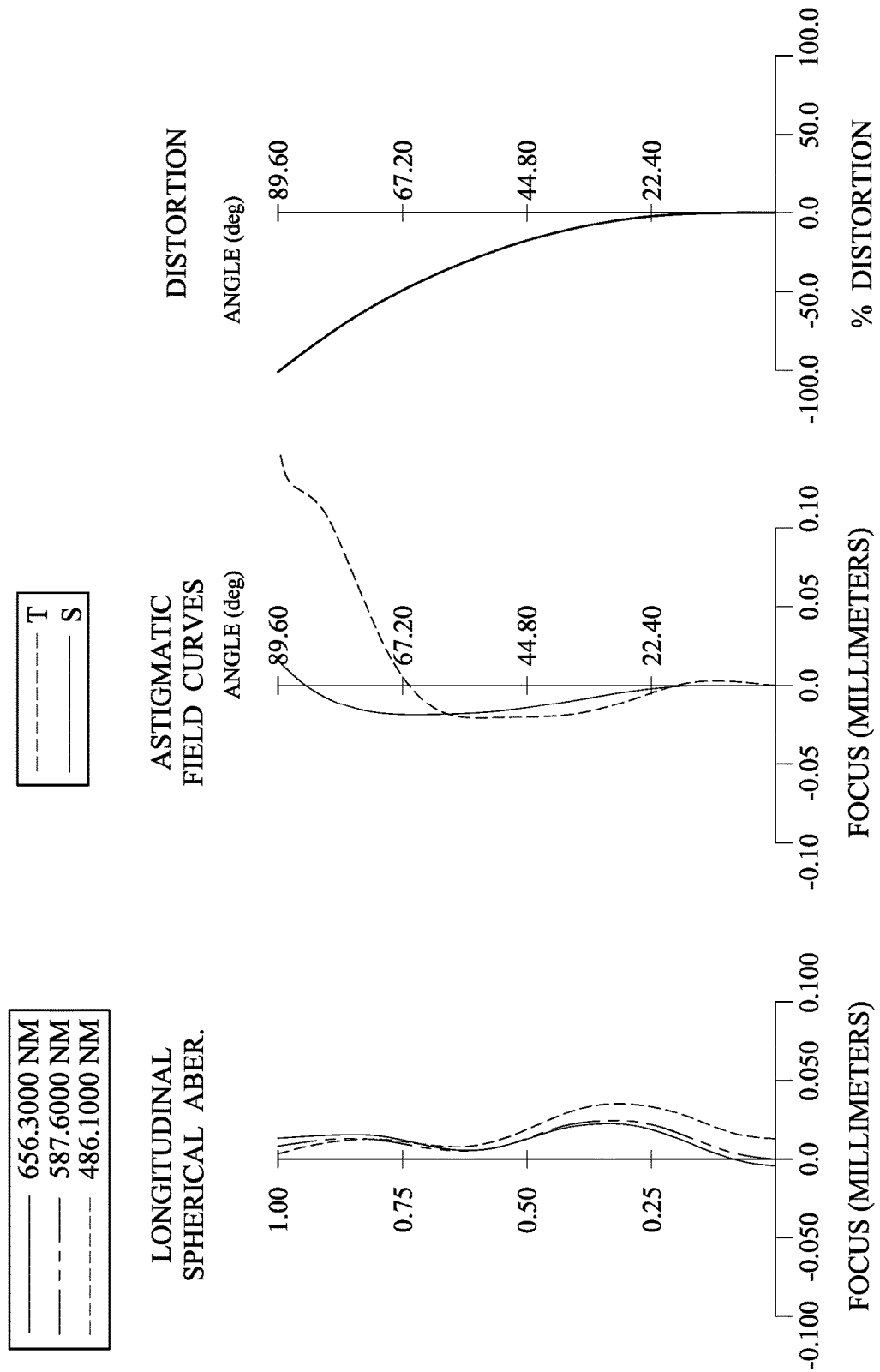
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes a photographing optical lens assembly (its reference numeral is omitted) and an image sensor 595. The photographing optical lens assembly includes, in order from an object side to an image side, a first lens element 510, a second lens element 520, a third lens element 530, a fourth lens element 540, an aperture stop 500, a fifth lens element 550, a sixth lens element 560, a seventh lens element 570, a filter 580, a cover glass 585, and an image surface 590, wherein the image sensor 595 is disposed on the image surface 590 of the photographing optical lens assembly. The photographing optical lens assembly includes seventh lens elements (510, 520, 530, 540, 550, 560, 570) without additional one or more lens elements inserted between the first lens element 510 and the seventh lens element 570.

The first lens element 510 with negative refractive power has an object-side surface 511 being concave in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with negative refractive power has an object-side surface 531 being concave in a paraxial region thereof and an image-side surface 532 being concave in a paraxial region thereof. The third lens element 530 is made of a plastic material, and has the object-side surface 531 and the image-side surface 532 being both aspheric. Furthermore, the image-side surface 532 of the third lens element 530 includes at least one inflection point.

The fourth lens element 540 with positive refractive power has an object-side surface 541 being convex in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of a plastic material, and has the object-side surface 561 and the image-side surface 562 being both aspheric.

The seventh lens element 570 with positive refractive power has an object-side surface 571 being convex in a paraxial region thereof and an image-side surface 572 being convex in a paraxial region thereof. The seventh lens element 570 is made of a plastic material, and has the object-side surface 571 and the image-side surface 572 being both aspheric.

The filter 580 is made of a glass material, wherein the filter 580 and the cover glass 585 are located between the seventh lens element 570 and the image surface 590 in order, and will not affect the focal length of the photographing optical lens assembly.

According to the 5th embodiment, the photographing optical lens assembly includes at least one cemented lens set (its reference numeral is omitted), which is cemented by the sixth lens element 560 and the seventh lens element 570. Two cemented surfaces (its reference numeral is omitted) of the cemented lens set are the image-side surface 562 of the sixth lens element 560 and the object-side surface 571 of the seventh lens element 570, and are connected by a cemented layer 501. In detail, the cemented lens set includes, in order from an object side to an image side, the sixth lens element 560, the cemented layer 501 and the seventh lens element 570. The cemented layer 501 has an object-side surface (its reference numeral is omitted) thereof and an image-side surface (its reference numeral is omitted) thereof, wherein the object-side surface of the cemented layer 501 is cemented to the image-side surface 562 of the sixth lens element 560, and the image-side surface of the cemented layer 501 is cemented to the object-side surface 571 of the seventh lens element 570.

The detailed optical data of the 5th embodiment are shown in Table 9 and the aspheric surface data are shown in Table 10 below.

TABLE 9

5th Embodiment
f = 1.10 mm, Fno = 1.83, HFOV = 89.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −476.190 | ASP | 1.056 | Plastic | 1.545 | 56.0 | −6.74 |
| 2 | | 3.702 | ASP | 1.570 | | | | |
| 3 | Lens 2 | 60.476 | ASP | 0.756 | Plastic | 1.544 | 55.9 | −2.44 |
| 4 | | 1.291 | ASP | 1.074 | | | | |
| 5 | Lens 3 | −5.338 | ASP | 0.710 | Plastic | 1.582 | 30.2 | −5.14 |
| 6 | | 7.148 | ASP | 0.055 | | | | |
| 7 | Lens 4 | 14.148 | ASP | 0.846 | Plastic | 1.669 | 19.5 | 3.01 |
| 8 | | −2.289 | ASP | 0.281 | | | | |
| 9 | Ape. Stop | Plano | | −0.180 | | | | |
| 10 | Lens 5 | 4.840 | ASP | 0.611 | Plastic | 1.544 | 55.9 | 2.73 |
| 11 | | −2.043 | ASP | 0.146 | | | | |
| 12 | Lens 6 | −17.410 | ASP | 0.796 | Plastic | 1.639 | 23.5 | −0.96 |
| 13 | | 0.649 | ASP | 0.010 | Cement | 1.550 | 43.9 | |
| 14 | Lens 7 | 0.617 | ASP | 2.652 | Plastic | 1.534 | 55.9 | 1.37 |
| 15 | | −1.989 | ASP | 0.812 | | | | |
| 16 | Filter | Plano | | 0.300 | Glass | 1.517 | 64.2 | — |
| 17 | | Plano | | 0.200 | | | | |
| 18 | Cover Glass | Plano | | 0.400 | Glass | 1.517 | 64.2 | — |
| 19 | | Plano | | 0.110 | | | | |
| 20 | Image | Plano | | — | | | | |

Reference wavelength is 587.6 nm (d-line).

TABLE 10

Aspheric Coefficients

| | Surface # | | | | |
|---|---|---|---|---|---|
| | 1 | 2 | 3 | 4 | 5 |
| k = | −9.0000E+01 | −2.8441E−01 | −9.0000E+01 | −8.1977E−02 | −2.7165E+00 |
| A4 = | 2.8700E−01 | −2.5659E−03 | 9.1722E−03 | −6.4538E−02 | −1.9747E−01 |
| A6 = | 1.0662E−01 | 1.8878E−03 | 7.4828E−05 | 7.3871E−03 | 3.4005E−02 |
| A8 = | −3.6346E−02 | −4.1980E−04 | 3.3027E−04 | 3.2560E−03 | −2.2788E−04 |
| A10 = | −1.9814E−02 | 4.2601E−05 | −2.8777E−04 | −1.4819E−03 | 4.9169E−03 |
| A12 = | 1.5586E−02 | −2.4716E−06 | 6.8083E−05 | | 1.9075E−20 |
| A14 = | | 1.0412E−07 | −5.2757E−06 | | |

| | Surface # | | | | |
|---|---|---|---|---|---|
| | 6 | 7 | 8 | 10 | 11 |
| k = | 2.8596E+01 | −2.9179E+01 | −1.9220E+00 | 1.4137E+01 | −2.0492E+00 |
| A4 = | −2.4978E−01 | −1.1747E−01 | 1.7517E−02 | 5.9968E−02 | 3.3825E−03 |
| A6 = | 8.0543E−02 | −1.0210E−01 | −2.9788E−02 | 3.4023E−02 | 1.3797E−01 |

TABLE 10-continued

| Aspheric Coefficients | | | | | |
|---|---|---|---|---|---|
| A8 = | −6.6633E−04 | 2.6929E−01 | −1.2705E−02 | −1.4996E−01 | −3.3978E−01 |
| A10 = | 5.0546E−03 | −3.1095E−01 | 4.2805E−02 | 1.6658E−01 | 3.3238E−01 |
| A12 = | 1.9075E−20 | 2.0896E−01 | −1.7856E−02 | −5.4006E−02 | −1.0854E−01 |
| A14 = | −5.0332E−03 | −5.8784E−02 | | | |

| | Surface # | | | |
|---|---|---|---|---|
| | 12 | 13 | 14 | 15 |
| k = | 5.0034E+01 | −7.5286E−01 | −1.0956E+00 | −1.1891E+01 |
| A4 = | −1.2516E−01 | −4.5392E−01 | −7.4233E−01 | −1.1065E−01 |
| A6 = | 3.9396E−01 | 2.6951E−01 | 1.9287E+00 | 1.1118E−01 |
| A8 = | −1.0118E+00 | −1.8692E−01 | −2.4449E+00 | −7.2711E−02 |
| A10 = | 1.2696E+00 | 1.4188E−01 | 1.4935E+00 | 2.9446E−02 |
| A12 = | −7.6746E−01 | −6.3164E−02 | −3.4067E−01 | −6.9849E−03 |
| A14 = | 1.6252E−01 | | | 6.9678E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.10 | f/EPD | 1.83 |
| Fno. | 1.83 | f2/f3 | 0.47 |
| HFOV [deg.] | 89.6 | Σ|f/fi| | 3.55 |
| 1/|tan(HFOV)| | 0.01 | Y72/Y11 | 0.27 |
| V4 | 19.5 | |f/fi|max | 0.81 |
| (V4 + V6 + V7) | 98.9 | D [mm] | 0.010 |
| CTmax/CTmin | 4.34 | |SAGf − SAGr| × 100 [mm] | 4.50 |
| (R5 + R6)/(R5 − R6) | −0.14 | |f/ff| + |f/fr| | 1.95 |
| (R13 + R14)/(R13 − R14) | −0.53 | Nf + Nr | 3.17 |
| R14/f | −1.81 | |SAGf/Rf| + |SAGr/Rr| | 2.799 |
| TL/ImgH | 6.77 | |Yf/SAGf| + |Yr/SAGr| | 2.596 |

Furthermore, in the photographing optical lens assembly according to the 5th embodiment, when an axial distance between the first lens element 510 and the second lens element 520 is T12, an axial distance between the second lens element 520 and the third lens element 530 is T23, an axial distance between the third lens element 530 and the fourth lens element 540 is T34, an axial distance between the fourth lens element 540 and the fifth lens element 550 is T45, an axial distance between the fifth lens element 550 and the sixth lens element 560 is T56, and an axial distance between the sixth lens element 560 and the seventh lens element 570 is T67, the following conditions are satisfied: T34<T12; T45<T12; T56<T12; T67<T12; T34<T23; T45<T23; T56<T23; and T67<T23.

In the photographing optical lens assembly according to the 5th embodiment, when the axial distance between the fourth lens element 540 and the fifth lens element 550 is T45, the central thickness of the fourth lens element 540 is CT4, and the central thickness of the fifth lens element 550 is CT5, the following conditions are satisfied: T45<CT4; and T45<CT5.

6th Embodiment

Figure 11:
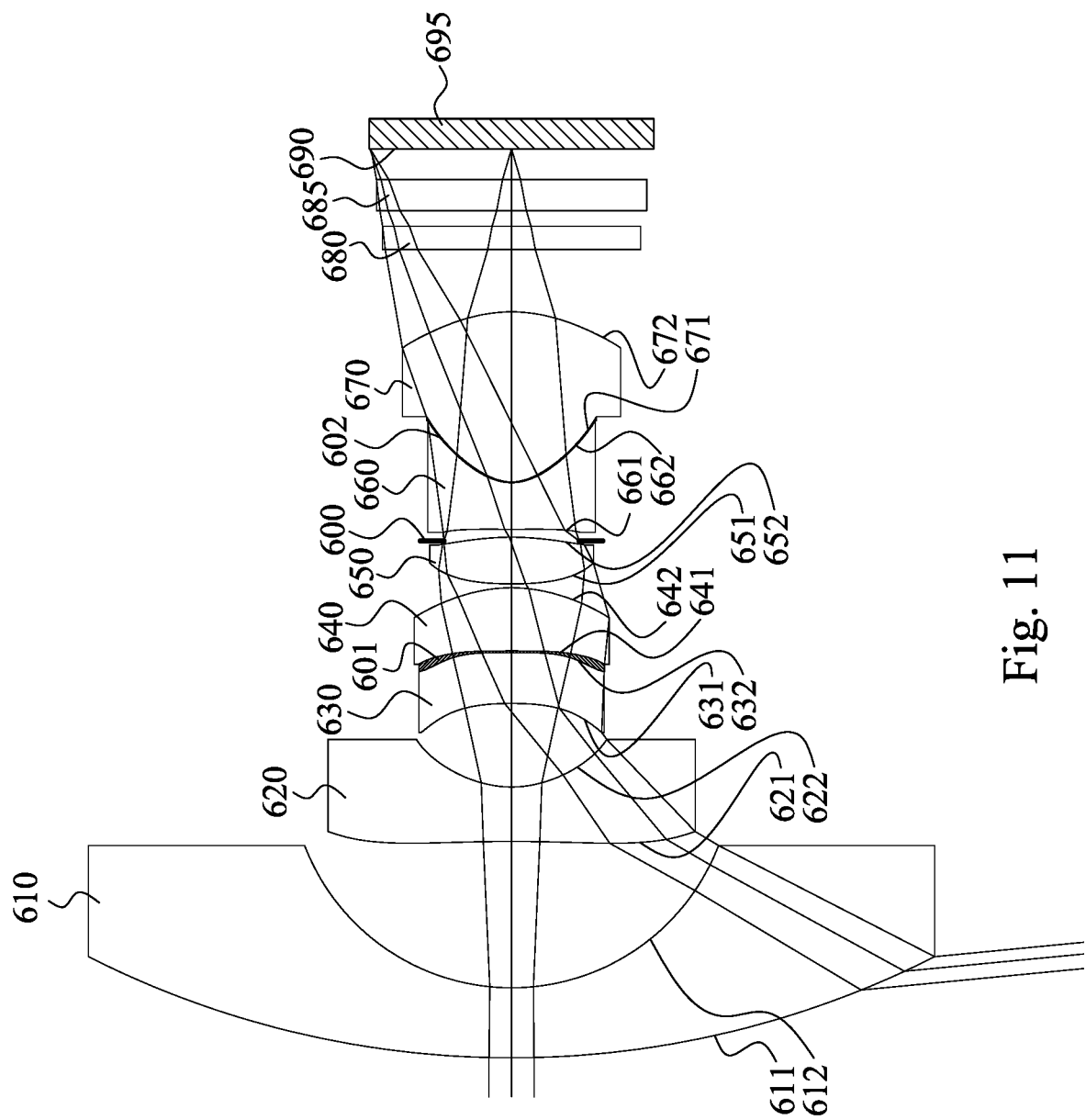
FIG. 11 is a schematic view of an imaging apparatus according to the 6th embodiment of the present disclosure.
Figure 12:
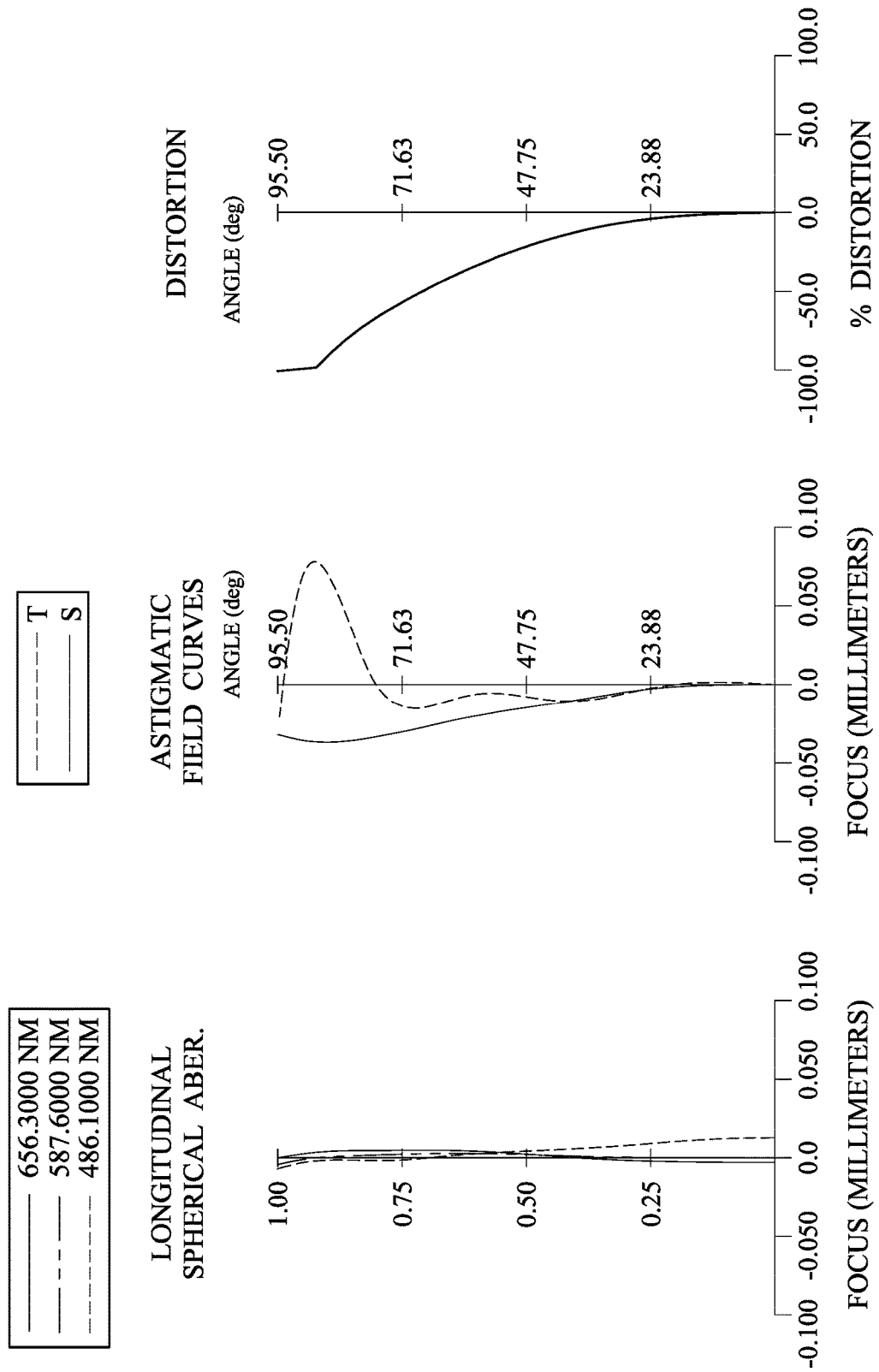
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes a photographing optical lens assembly (its reference numeral is omitted) and an image sensor 695. The photographing optical lens assembly includes, in order from an object side to an image side, a first lens element 610, a second lens element 620, a third lens element 630, a fourth lens element 640, a fifth lens element 650, an aperture stop 600, a sixth lens element 660, a seventh lens element 670, a filter 680, a cover glass 685, and an image surface 690, wherein the image sensor 695 is disposed on the image surface 690 of the photographing optical lens assembly. The photographing optical lens assembly includes seventh lens elements (610, 620, 630, 640, 650, 660, 670) without additional one or more lens elements inserted between the first lens element 610 and the seventh lens element 670.

The first lens element 610 with negative refractive power has an object-side surface 611 being convex in a paraxial region thereof and an image-side surface 612 being concave in a paraxial region thereof. The first lens element 610 is made of a glass material, and has the object-side surface 611 and the image-side surface 612 being both spherical.

The second lens element 620 with negative refractive power has an object-side surface 621 being concave in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes at least one inflection point.

The third lens element 630 with negative refractive power has an object-side surface 631 being concave in a paraxial region thereof and an image-side surface 632 being concave in a paraxial region thereof. The third lens element 630 is made of a plastic material, and has the object-side surface 631 and the image-side surface 632 being both aspheric. Furthermore, the image-side surface 632 of the third lens element 630 includes at least one inflection point.

The fourth lens element 640 with positive refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric. Furthermore, the image-side surface 652 of the fifth lens element 650 includes at least one inflection point.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the object-side surface 661 of the sixth lens element 660 includes at least one inflection point.

The seventh lens element 670 with positive refractive power has an object-side surface 671 being convex in a paraxial region thereof and an image-side surface 672 being convex in a paraxial region thereof. The seventh lens element 670 is made of a plastic material, and has the object-side surface 671 and the image-side surface 672 being both aspheric.

The filter 680 is made of a glass material, wherein the filter 680 and the cover glass 685 are located between the seventh lens element 670 and the image surface 690 in order, and will not affect the focal length of the photographing optical lens assembly.

According to the 6th embodiment, the photographing optical lens assembly includes two cemented lens sets (its reference numeral is omitted), which are cemented by the third lens element 630 and the fourth lens element 640; and by the sixth lens element 660 and the seventh lens element 670, respectively. Two cemented surfaces (its reference numeral is omitted) of one of the cemented lens sets are the image-side surface 632 of the third lens element 630 and the object-side surface 641 of the fourth lens element 640, and are connected by a cemented layer 601. Two cemented surfaces (its reference numeral is omitted) of the other of the cemented lens sets are the image-side surface 662 of the sixth lens element 660 and the object-side surface 671 of the seventh lens element 670, and are connected by a cemented layer 602. In detail, one of the cemented lens sets includes, in order from an object side to an image side, the third lens element 630, the cemented layer 601 and the fourth lens element 640; and the other one of the cemented lens sets includes, in order from an object side to an image side, the sixth lens element 660, the cemented layer 602 and the seventh lens element 670. The cemented layer 601 has an object-side surface (its reference numeral is omitted) thereof and an image-side surface (its reference numeral is omitted) thereof, wherein the object-side surface of the cemented layer 601 is cemented to the image-side surface 632 of the third lens element 630, and the image-side surface of the cemented layer 601 is cemented to the object-side surface 641 of the fourth lens element 640. The cemented layer 602 has an object-side surface (its reference numeral is omitted) thereof and an image-side surface (its reference numeral is omitted) thereof, wherein the object-side surface of the cemented layer 602 is cemented to the image-side surface 662 of the sixth lens element 660, and the image-side surface of the cemented layer 602 is cemented to the object-side surface 671 of the seventh lens element 670.

The detailed optical data of the 6th embodiment are shown in Table 11 and the aspheric surface data are shown in Table 12 below.

TABLE 11

6th Embodiment
f = 1.03 mm, Fno = 1.78, HFOV = 95.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.005 | | 0.900 | Glass | 1.589 | 61.3 | −6.57 |
| 2 | | 2.846 | | 1.881 | | | | |
| 3 | Lens 2 | −20.606 | ASP | 0.700 | Plastic | 1.544 | 55.9 | −2.36 |
| 4 | | 1.384 | ASP | 1.074 | | | | |
| 5 | Lens 3 | −4.258 | ASP | 0.650 | Plastic | 1.582 | 30.2 | −6.02 |
| 6 | | 20.964 | ASP | 0.025 | Cement | 1.485 | 53.2 | |
| 7 | Lens 4 | −66.812 | ASP | 0.812 | Plastic | 1.669 | 19.5 | 2.97 |
| 8 | | −1.937 | ASP | 0.050 | | | | |
| 9 | Lens 5 | 4.564 | ASP | 0.600 | Plastic | 1.544 | 55.9 | 3.73 |
| 10 | | −3.483 | ASP | −0.049 | | | | |
| 11 | Ape. Stop | Plano | | 0.150 | | | | |
| 12 | Lens 6 | 36.318 | ASP | 0.600 | Plastic | 1.639 | 23.5 | −0.99 |
| 13 | | 0.618 | ASP | 0.010 | Cement | 1.550 | 43.9 | |
| 14 | Lens 7 | 0.554 | ASP | 2.186 | Plastic | 1.534 | 55.9 | 1.17 |
| 15 | | −1.887 | ASP | 0.800 | | | | |
| 16 | Filter | Plano | | 0.300 | Glass | 1.517 | 64.2 | — |
| 17 | | Plano | | 0.200 | | | | |
| 18 | Cover Glass | Plano | | 0.400 | Glass | 1.517 | 64.2 | — |
| 19 | | Plano | | 0.396 | | | | |
| 20 | Image | Plano | | — | | | | |

Reference wavelength is 587.6 nm (d-line).

TABLE 12

Aspheric Coefficients

| Surface # | 3 | 4 | 5 | 6 | 7 | 8 |
|---|---|---|---|---|---|---|
| k = | −8.7496E+01 | 3.6801E−02 | −2.7510E+01 | 6.7324E+01 | −7.9706E+01 | −1.7479E+00 |
| A4 = | 4.1316E−03 | −6.4710E−02 | −1.9105E−01 | −2.8043E−01 | −9.7472E−02 | 8.6658E−03 |
| A6 = | −9.8884E−04 | 1.5653E−03 | 2.9897E−02 | 8.5100E−02 | −4.0835E−03 | −7.3984E−03 |
| A8 = | 1.7710E−03 | | −7.8353E−04 | −1.3526E−02 | 4.5362E−02 | |
| A10 = | −6.4669E−04 | | 3.8697E−03 | 1.7331E−02 | −2.4022E−02 | |
| A12 = | 1.0138E−04 | | −1.0039E−22 | −1.0039E−22 | −1.0039E−22 | |
| A14 = | −5.9120E−06 | | | | | |

| Surface # | 9 | 10 | 12 | 13 | 14 | 15 |
|---|---|---|---|---|---|---|
| k = | 1.4988E+01 | −3.6771E+00 | 6.6624E+01 | −7.5304E−01 | −1.0329E+00 | −8.9705E+00 |
| A4 = | 7.6739E−02 | 2.4241E−02 | −7.4939E−02 | −4.4412E−01 | −7.1905E−01 | −1.1487E−01 |
| A6 = | 6.4635E−04 | 3.7251E−03 | 2.8045E−02 | 2.6518E−01 | 1.3838E+00 | 1.0714E−01 |
| A8 = | | | −4.5272E−02 | −2.4945E−01 | −1.7165E+00 | −6.9071E−02 |
| A10 = | | | −2.1442E−03 | 1.5972E−01 | 1.2108E+00 | 2.6133E−02 |
| A12 = | | | −6.7516E−18 | −6.3164E−02 | −3.4067E−01 | −4.4781E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| | 6th Embodiment | | |
|---|---|---|---|
| f [mm] | 1.03 | f/EPD | 1.78 |
| Fno. | 1.78 | f2/f3 | 0.39 |
| HFOV [deg.] | 95.5 | Σ|f/fi| | 3.30 |
| 1/|tan(HFOV)| | 0.10 | Y72/Y11 | 0.26 |
| V4 | 19.5 | |f/fi|max | 0.88 |
| (V4 + V6 + V7) | 98.9 | D [mm] | 0.025/0.01 |
| CTmax/CTmin | 3.64 | |SAGf − SAGr| × 100 [mm] | 5.019/3.947 |
| (R5 + R6)/ (R5 − R6) | −0.66 | |f/ff| + |f/fr| | 0.517/1.920 |
| (R13 + R14)/ (R13 − R14) | −0.55 | Nf + Nr | 3.251/3.173 |
| R14/f | −1.84 | |SAGf/Rf| + |SAGr/Rr| | 0.006/2.808 |
| TL/ImgH | 6.42 | |Yf/SAGf| + |Yr/SAGr| | 23.88/2.651 |

Furthermore, in the photographing optical lens assembly according to the 6th embodiment, when an axial distance between the first lens element 610 and the second lens element 620 is T12, an axial distance between the second lens element 620 and the third lens element 630 is T23, an axial distance between the third lens element 630 and the fourth lens element 640 is T34, an axial distance between the fourth lens element 640 and the fifth lens element 650 is T45, an axial distance between the fifth lens element 650 and the sixth lens element 660 is T56, and an axial distance between the sixth lens element 660 and the seventh lens element 670 is T67, the following conditions are satisfied: T34<T12; T45<T12; T56<T12; T67<T12; T34<T23; T45<T23; T56<T23; and T67<T23.

In the photographing optical lens assembly according to the 6th embodiment, when the axial distance between the fourth lens element 640 and the fifth lens element 650 is T45, the central thickness of the fourth lens element 640 is CT4, and the central thickness of the fifth lens element 650 is CT5, the following conditions are satisfied: T45<CT4; and T45<CT5.

7th Embodiment

Figure 13:
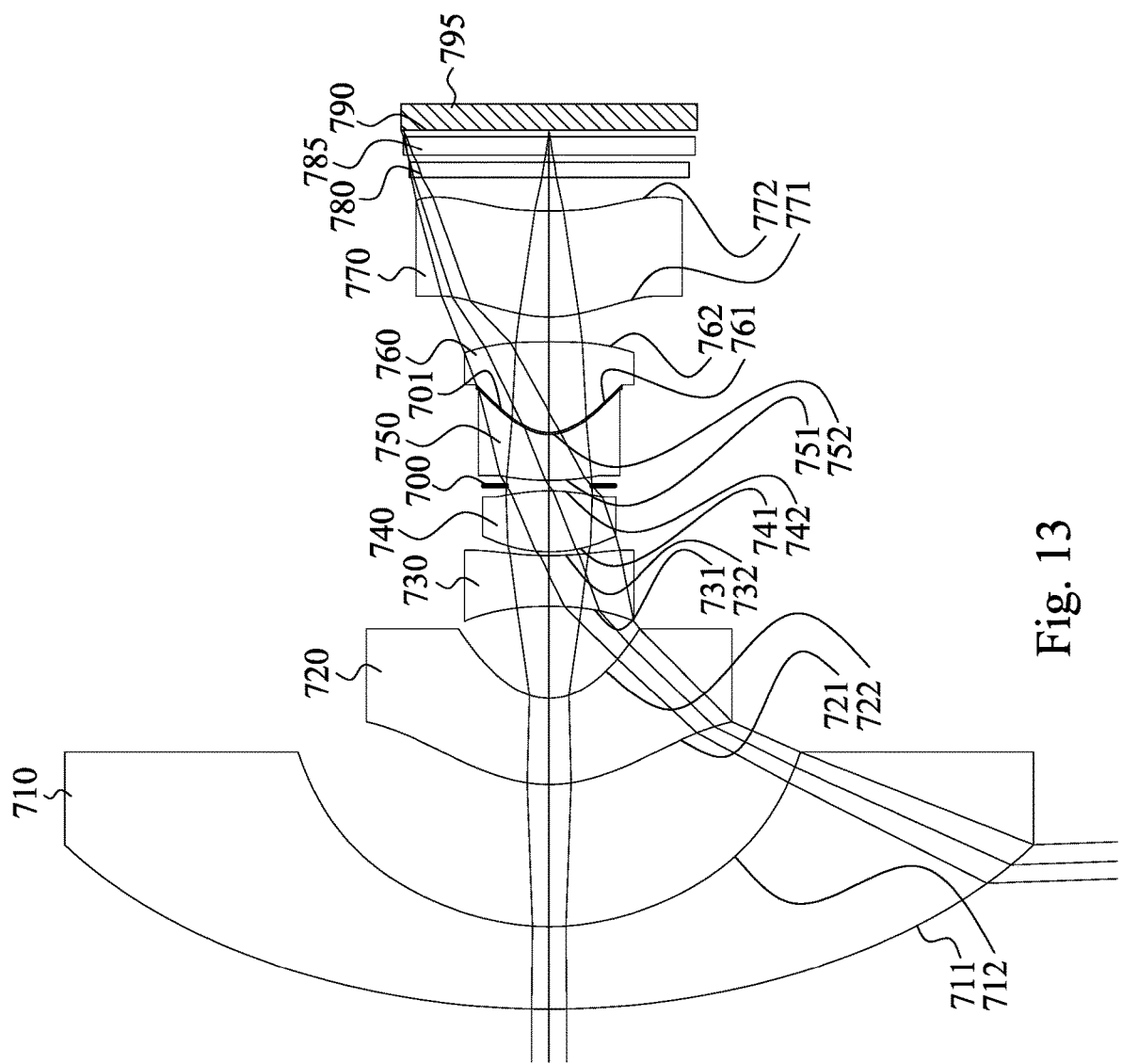
FIG. 13 is a schematic view of an imaging apparatus according to the 7th embodiment of the present disclosure.
Figure 14:
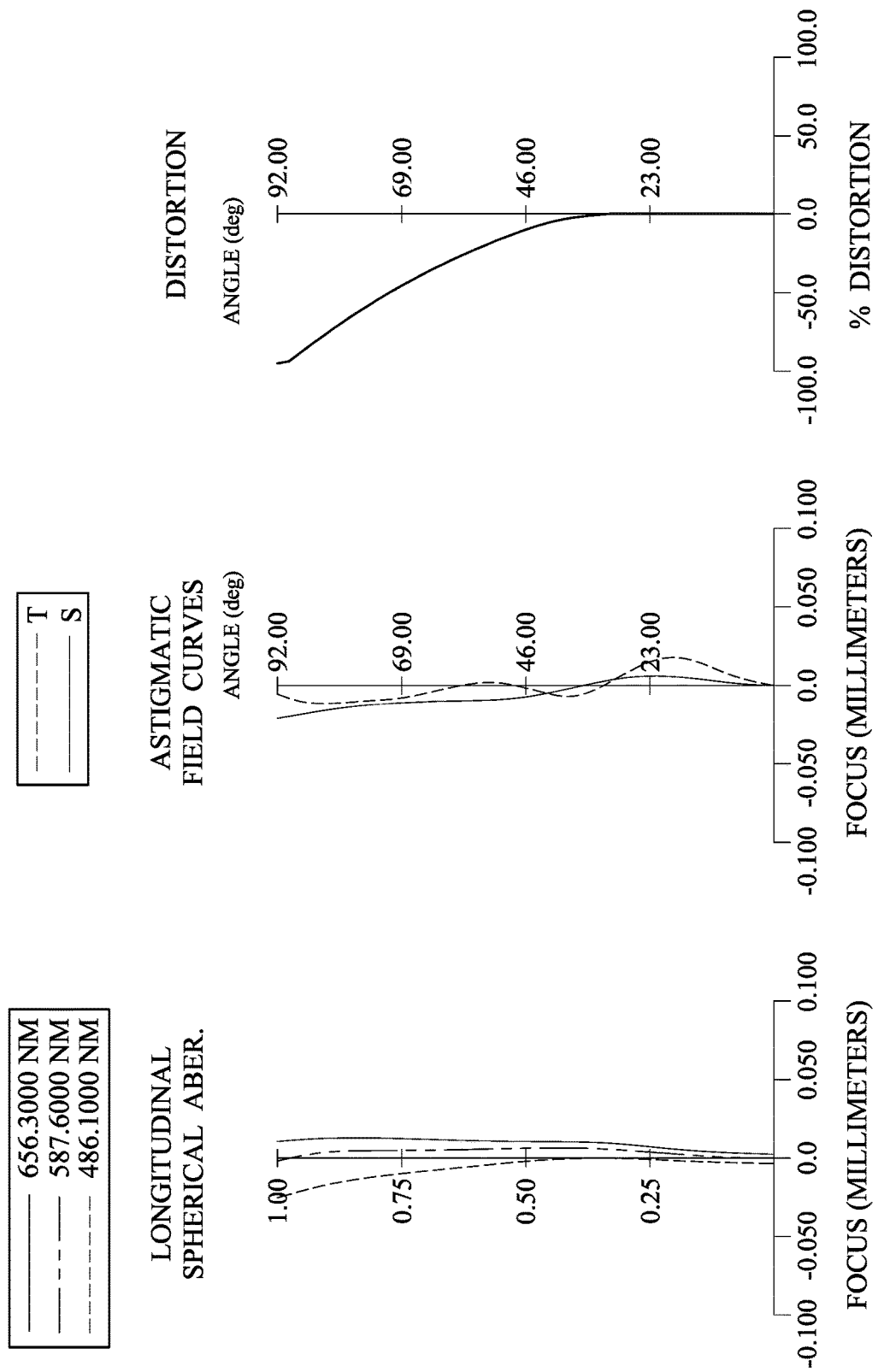
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes a photographing optical lens assembly (its reference numeral is omitted) and an image sensor 795. The photographing optical lens assembly includes, in order from an object side to an image side, a first lens element 710, a second lens element 720, a third lens element 730, a fourth lens element 740, an aperture stop 700, a fifth lens element 750, a sixth lens element 760, a seventh lens element 770, a filter 780, a cover glass 785, and an image surface 790, wherein the image sensor 795 is disposed on the image surface 790 of the photographing optical lens assembly. The photographing optical lens assembly includes seventh lens elements (710, 720, 730, 740, 750, 760, 770) without additional one or more lens elements inserted between the first lens element 710 and the seventh lens element 770.

The first lens element 710 with negative refractive power has an object-side surface 711 being convex in a paraxial region thereof and an image-side surface 712 being concave in a paraxial region thereof. The first lens element 710 is made of a glass material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric. Furthermore, the object-side surface 721 of the second lens element 720 includes at least one inflection point.

The third lens element 730 with negative refractive power has an object-side surface 731 being concave in a paraxial region thereof and an image-side surface 732 being concave in a paraxial region thereof. The third lens element 730 is made of a plastic material, and has the object-side surface 731 and the image-side surface 732 being both aspheric. Furthermore, the image-side surface 732 of the third lens element 730 includes at least one inflection point.

The fourth lens element 740 with positive refractive power has an object-side surface 741 being convex in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric.

The sixth lens element 760 with positive refractive power has an object-side surface 761 being convex in a paraxial region thereof and an image-side surface 762 being convex in a paraxial region thereof. The sixth lens element 760 is made of a plastic material, and has the object-side surface 761 and the image-side surface 762 being both aspheric.

The seventh lens element 770 with positive refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Furthermore, each of the object-side surface 771 and the image-side surface 772 of the seventh lens element 770 includes at least one inflection point.

The filter 780 is made of a glass material, wherein the filter 780 and the cover glass 785 are located between the seventh lens element 770 and the image surface 790 in order, and will not affect the focal length of the photographing optical lens assembly.

According to the 7th embodiment, the photographing optical lens assembly includes at least one cemented lens set (its reference numeral is omitted), which is cemented by the fifth lens element 750 and the sixth lens element 760. Two cemented surfaces (its reference numeral is omitted) of the cemented lens set are the image-side surface 752 of the fifth lens element 750 and the object-side surface 761 of the sixth lens element 760, and are connected by a cemented layer 701. In detail, the cemented lens set includes, in order from an object side to an image side, the fifth lens element 750, the cemented layer 701 and the sixth lens element 760. The cemented layer 701 has an object-side surface (its reference numeral is omitted) thereof and an image-side surface (its reference numeral is omitted) thereof, wherein the object-side surface of the cemented layer 701 is cemented to the image-side surface 752 of the fifth lens element 750, and the image-side surface of the cemented layer 701 is cemented to the object-side surface 761 of the sixth lens element 760.

The detailed optical data of the 7th embodiment are shown in Table 13 and the aspheric surface data are shown in Table 14 below.

TABLE 13

7th Embodiment
f = 1.13 mm, Fno = 2.40, HFOV = 92.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.705 | ASP | 1.100 | Glass | 1.804 | 46.6 | −6.28 |
| 2 | | 3.381 | ASP | 1.888 | | | | |
| 3 | Lens 2 | 1.973 | ASP | 1.141 | Plastic | 1.522 | 59.3 | −3.78 |
| 4 | | 0.791 | ASP | 1.226 | | | | |
| 5 | Lens 3 | −4.589 | ASP | 0.673 | Plastic | 1.544 | 55.9 | −4.27 |
| 6 | | 4.947 | ASP | 0.050 | | | | |
| 7 | Lens 4 | 2.042 | ASP | 0.810 | Plastic | 1.614 | 26.0 | 1.88 |
| 8 | | −2.259 | ASP | 0.068 | | | | |
| 9 | Ape. Stop | Plano | | 0.069 | | | | |
| 10 | Lens 5 | 3.753 | ASP | 0.609 | Plastic | 1.639 | 23.5 | −1.19 |
| 11 | | 0.591 | ASP | 0.030 | Cement | 1.485 | 53.2 | |
| 12 | Lens 6 | 0.602 | ASP | 1.210 | Plastic | 1.544 | 55.9 | 1.09 |
| 13 | | −13.267 | ASP | 0.327 | | | | |
| 14 | Lens 7 | 1.713 | ASP | 1.409 | Plastic | 1.515 | 60.6 | 3.90 |
| 15 | | 8.341 | ASP | 0.440 | | | | |
| 16 | Filter | Plano | | 0.200 | Glass | 1.517 | 64.2 | — |
| 17 | | Plano | | 0.100 | | | | |
| 18 | Cover Glass | Plano | | 0.250 | Glass | 1.517 | 64.2 | — |
| 19 | | Plano | | 0.085 | | | | |
| 20 | Image | Plano | | — | | | | |

Reference wavelength is 587.6 nm (d-line).

TABLE 14

Aspheric Coefficients

| | Surface # | | | | |
|---|---|---|---|---|---|
| | 1 | 2 | 3 | 4 | 5 |
| k = | 1.4062E+00 | −1.2439E−01 | −1.8056E+00 | −9.0956E−01 | 9.8522E+00 |
| A4 = | −7.7729E−05 | −5.3068E−03 | −7.0360E−03 | 6.1987E−03 | −4.0955E−02 |
| A6 = | | 3.3875E−04 | −1.1346E−03 | −2.7334E−02 | 2.9406E−02 |

TABLE 14-continued

| Aspheric Coefficients | | | | |
|---|---|---|---|---|
| A8 = | 8.7040E−06 | 6.1726E−05 | −1.1619E−03 | −8.5384E−03 |
| A10 = | | 4.5481E−06 | 5.5878E−03 | 1.9631E−03 |
| A12 = | | | −2.2573E−19 | 5.6604E−19 |

| Surface # | | | | | |
|---|---|---|---|---|---|
| | 6 | 7 | 8 | 10 | 11 |
| k = | 5.8536E−01 | −1.7982E−01 | −2.3896E+01 | −1.9521E+01 | −7.8372E−01 |
| A4 = | 5.3427E−02 | 1.0427E−01 | −8.0204E−03 | 1.7940E−01 | −2.0978E−01 |
| A6 = | −1.5368E−01 | −1.5526E−01 | −1.9497E−01 | −4.4694E−01 | −4.9159E−01 |
| A8 = | 7.9239E−02 | 5.3804E−02 | −6.5456E−02 | 4.7643E−01 | 7.8873E−01 |
| A10 = | −1.2489E−02 | −4.9094E−03 | 7.5002E−02 | −1.6612E−01 | −6.4651E−01 |
| A12 = | −1.2735E−19 | 4.0634E−20 | −7.4375E−21 | 1.6429E−20 | 1.8312E−01 |

| Surface # | | | | |
|---|---|---|---|---|
| | 12 | 13 | 14 | 15 |
| k = | −1.8733E+00 | 8.4781E+01 | −8.9094E+00 | 1.5056E+01 |
| A4 = | 5.7822E−01 | −1.2996E−01 | 6.2214E−02 | 1.6081E−01 |
| A6 = | −1.5126E+00 | 1.0138E−01 | −1.3774E−01 | −1.8116E−01 |
| A8 = | 2.1178E+00 | −4.6299E−02 | 1.2359E−01 | 9.4146E−02 |
| A10 = | −1.5372E+00 | 1.0424E−02 | −6.5695E−02 | −2.8570E−02 |
| A12 = | 4.3960E−01 | 1.4900E−19 | 1.8825E−02 | 4.6007E−03 |
| A14 = | | 5.9583E−24 | −2.3336E−03 | −3.0925E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.13 | f/EPD | 2.40 |
| Fno. | 2.40 | f2/f3 | 0.88 |
| HFOV [deg.] | 92.0 | Σ|f/fi| | 3.62 |
| 1/|tan(HFOV)| | 0.03 | Y72/Y11 | 0.27 |
| V4 | 26.0 | |f/fi|max | 1.03 |
| (V4 + V6 + V7) | 142.5 | D [mm] | 0.030 |
| CTmax/CTmin | 2.31 | |SAGf − SAGr| × 100 [mm] | 2.84 |
| (R5 + R6)/(R5 − R6) | −0.04 | |f/ff| + f/fr| | 1.99 |
| (R13 + R14)/(R13 − R14) | −1.52 | Nf + Nr | 3.18 |
| R14/f | 7.38 | |SAGf/Rf| + |SAGr/Rr| | 2.086 |
| TL/ImgH | 5.95 | |Yf/SAGf| + |Yr/SAGr| | 3.061 |

Furthermore, in the photographing optical lens assembly according to the 7th embodiment, when an axial distance between the first lens element 710 and the second lens element 720 is T12, an axial distance between the second lens element 720 and the third lens element 730 is T23, an axial distance between the third lens element 730 and the fourth lens element 740 is T34, an axial distance between the fourth lens element 740 and the fifth lens element 750 is T45, an axial distance between the fifth lens element 750 and the sixth lens element 760 is T56, and an axial distance between the sixth lens element 760 and the seventh lens element 770 is T67, the following conditions are satisfied: T34<T12; T45<T12; T56<T12; T67<T12; T34<T23; T45<T23; T56<T23; and T67<T23.

In the photographing optical lens assembly according to the 7th embodiment, when the axial distance between the fourth lens element 740 and the fifth lens element 750 is T45, the central thickness of the fourth lens element 740 is CT4, and the central thickness of the fifth lens element 750 is CT5, the following conditions are satisfied: T45<CT4; and T45<CT5.

8th Embodiment

Figure 15:
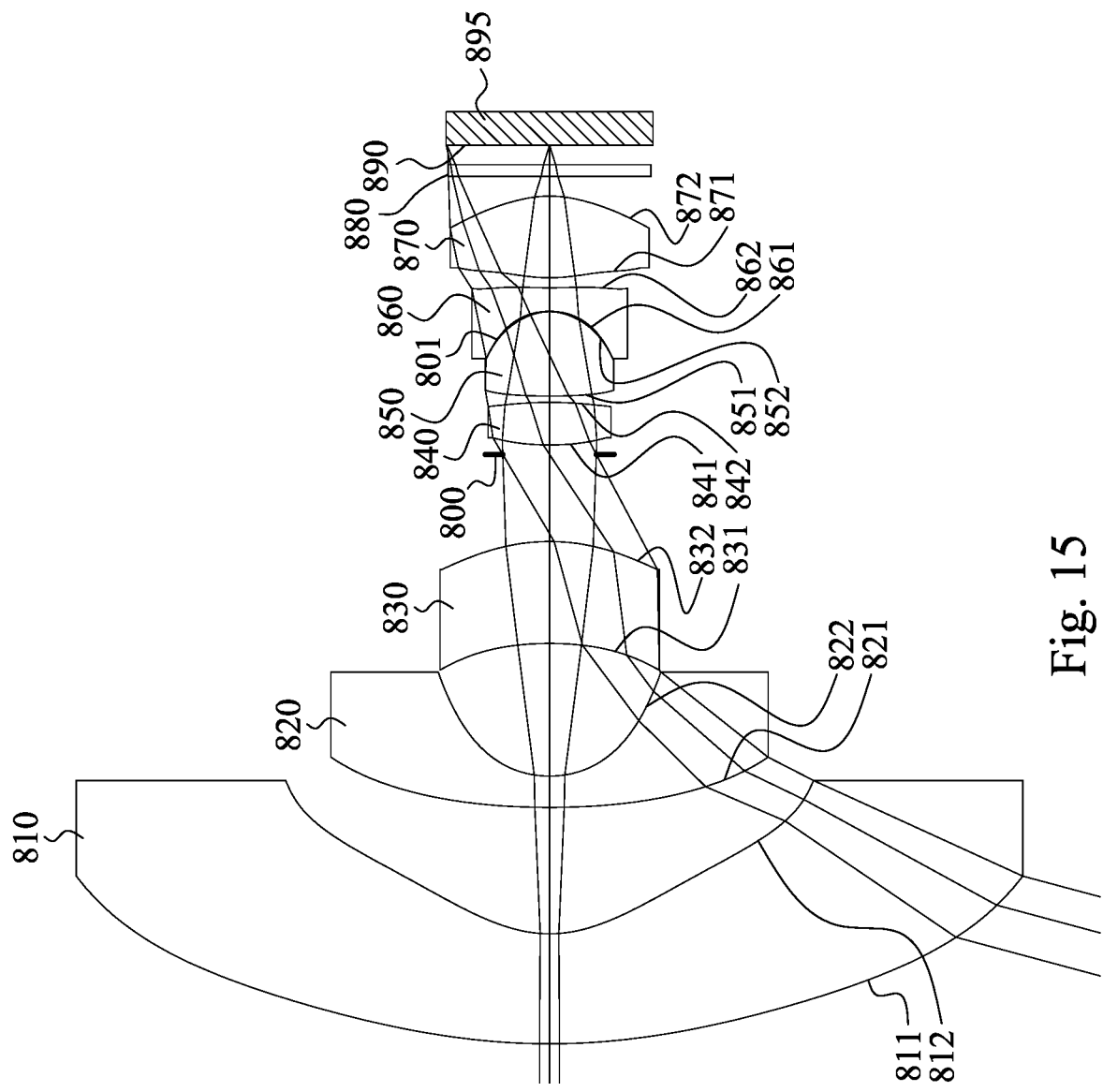
FIG. 15 is a schematic view of an imaging apparatus according to the 8th embodiment of the present disclosure.
Figure 16:
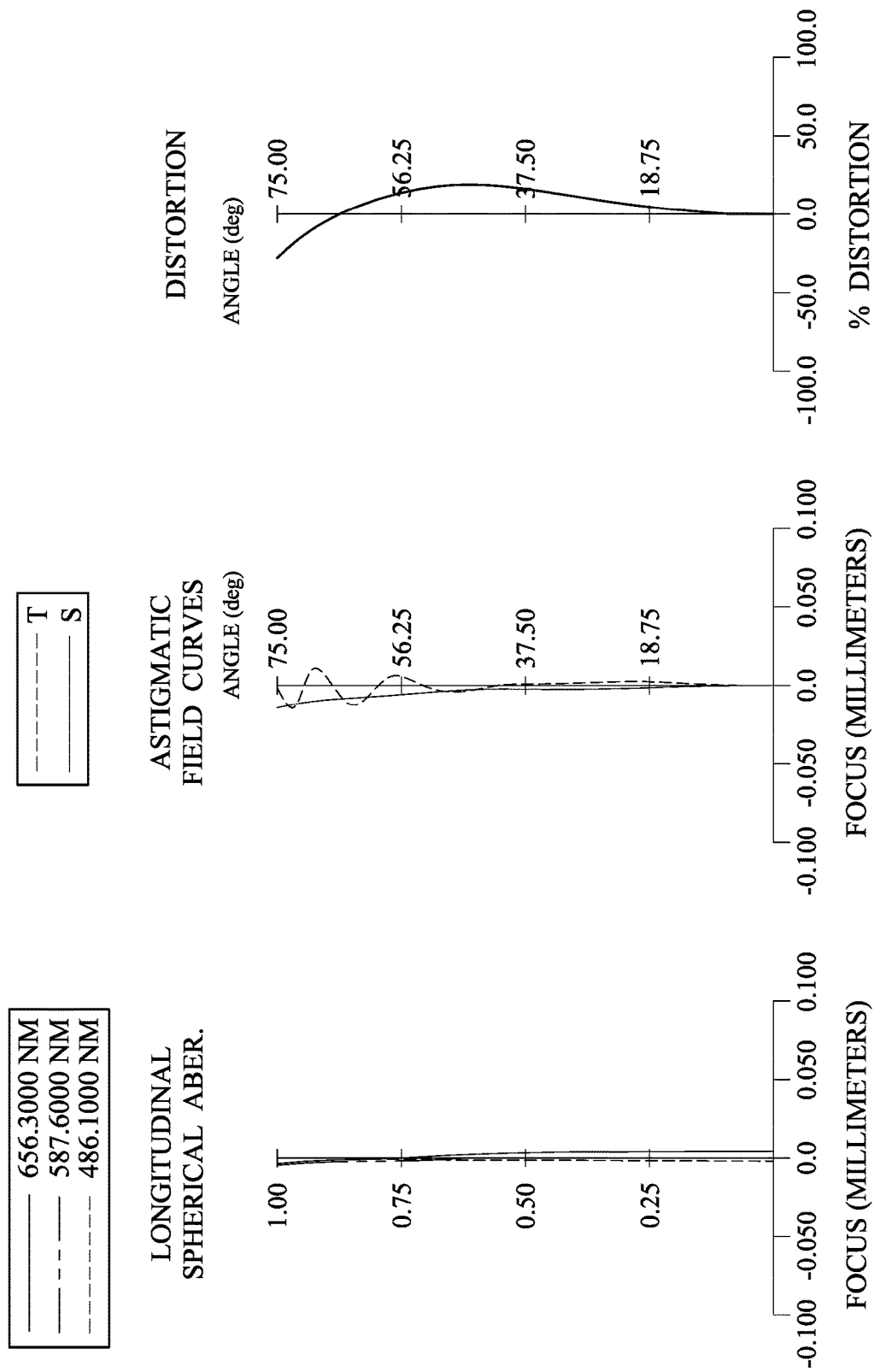
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes a photographing optical lens assembly (its reference numeral is omitted) and an image sensor 895. The photographing optical lens assembly includes, in order from an object side to an image side, a first lens element 810, a second lens element 820, a third lens element 830, an aperture stop 800, a fourth lens element 840, a fifth lens element 850, a sixth lens element 860, a seventh lens element 870, a filter 880 and an image surface 890, wherein the image sensor 895 is disposed on the image surface 890 of the photographing optical lens assembly. The photographing optical lens assembly includes seventh lens elements (810, 820, 830, 840, 850, 860, 870) without additional one or more lens elements inserted between the first lens element 810 and the seventh lens element 870.

The first lens element 810 with negative refractive power has an object-side surface 811 being convex in a paraxial region thereof and an image-side surface 812 being concave in a paraxial region thereof. The first lens element 810 is made of a glass material, and has the object-side surface 811 and the image-side surface 812 being both aspheric. Furthermore, the image-side surface 812 of the first lens element 820 includes at least one inflection point.

The second lens element 820 with negative refractive power has an object-side surface 821 being convex in a paraxial region thereof and an image-side surface 822 being concave in a paraxial region thereof. The second lens element 820 is made of a glass material, and has the object-side surface 821 and the image-side surface 822 being both aspheric.

The third lens element 830 with positive refractive power has an object-side surface 831 being concave in a paraxial region thereof and an image-side surface 832 being convex in a paraxial region thereof. The third lens element 830 is made of a glass material, and has the object-side surface 831 and the image-side surface 832 being both aspheric. Furthermore, the image-side surface 832 of the third lens element 830 includes at least one inflection point.

The fourth lens element 840 with positive refractive power has an object-side surface 841 being convex in a paraxial region thereof and an image-side surface 842 being convex in a paraxial region thereof. The fourth lens element 840 is made of a glass material, and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of a glass material, and has the object-side surface 851 and the image-side surface 852 being both aspheric.

The sixth lens element 860 with negative refractive power has an object-side surface 861 being concave in a paraxial region thereof and an image-side surface 862 being concave in a paraxial region thereof. The sixth lens element 860 is made of a glass material, and has the object-side surface 861 and the image-side surface 862 being both aspheric. Furthermore, the image-side surface 862 of the sixth lens element 860 includes at least one inflection point.

The seventh lens element 870 with positive refractive power has an object-side surface 871 being convex in a paraxial region thereof and an image-side surface 872 being convex in a paraxial region thereof. The seventh lens element 870 is made of a glass material, and has the object-side surface 871 and the image-side surface 872 being both aspheric. Furthermore, each of the object-side surface 871 and the image-side surface 872 of the seventh lens element 870 includes at least one inflection point.

The filter 880 is made of a glass material, which is located between the seventh lens element 870 and the image surface 890, and will not affect the focal length of the photographing optical lens assembly.

According to the 8th embodiment, the photographing optical lens assembly includes at least one cemented lens set (its reference numeral is omitted), which is cemented by the fifth lens element 850 and the sixth lens element 860. Two cemented surfaces (its reference numeral is omitted) of the cemented lens set are the image-side surface 852 of the fifth lens element 850 and the object-side surface 861 of the sixth lens element 860, and are connected by a cemented layer 801. In detail, the cemented lens set includes, in order from an object side to an image side, the fifth lens element 850, the cemented layer 801 and the sixth lens element 860. The cemented layer 801 has an object-side surface (its reference numeral is omitted) thereof and an image-side surface (its reference numeral is omitted) thereof, wherein the object-side surface of the cemented layer 801 is cemented to the image-side surface 852 of the fifth lens element 850, and the image-side surface of the cemented layer 801 is cemented to the object-side surface 861 of the sixth lens element 860.

The detailed optical data of the 8th embodiment are shown in Table 15 and the aspheric surface data are shown in Table 16 below.

TABLE 15

8th Embodiment
f = 0.86 mm, Fno = 1.68, HFOV = 75.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 16.866 ASP | 2.812 | Glass | 1.729 | 54.5 | −6.03 |
| 2 | | 3.243 ASP | 3.226 | | | | |
| 3 | Lens 2 | 18.358 ASP | 0.800 | Glass | 1.620 | 60.3 | −4.92 |
| 4 | | 2.572 ASP | 3.388 | | | | |
| 5 | Lens 3 | −8.089 ASP | 2.604 | Glass | 1.847 | 23.8 | 11.05 |
| 6 | | −4.979 ASP | 2.223 | | | | |
| 7 | Ape. Stop | Plano | 0.242 | | | | |
| 8 | Lens 4 | 6.444 ASP | 1.090 | Glass | 1.754 | 52.3 | 5.17 |
| 9 | | −9.133 ASP | 0.160 | | | | |
| 10 | Lens 5 | 15.480 ASP | 2.156 | Glass | 1.620 | 60.3 | 1.99 |
| 11 | | −1.273 ASP | 0.010 | Cement | 1.514 | 38.8 | |
| 12 | Lens 6 | −1.780 ASP | 0.600 | Glass | 1.847 | 23.8 | −1.76 |
| 13 | | 10.558 ASP | 0.255 | | | | |
| 14 | Lens 7 | 3.972 ASP | 2.087 | Glass | 1.62 | 60.3 | 2.98 |
| 15 | | −2.756 ASP | 0.500 | | | | |
| 16 | Filter | Plano | 0.300 | Glass | 1.517 | 64.2 | — |
| 17 | | Plano | 0.499 | | | | |
| 18 | Image | Plano | — | | | | |

Reference wavelength is 587.6 nm (d-line).

TABLE 16

Aspheric Coefficients

| Surface # | | | | |
|---|---|---|---|---|
| 1 | 2 | 3 | 4 | 5 |
| k = 5.4368E−01 | −7.9231E−01 | 3.9338E+00 | −8.0240E−01 | 4.8345E+00 |
| A4 = −1.6479E−04 | −5.5163E−03 | 3.2578E−04 | 1.2054E−02 | −2.4990E−03 |
| A6 = 6.1460E−07 | 1.0066E−04 | −5.9296E−06 | 2.3085E−04 | −2.8682E−05 |
| A8 = −1.2605E−10 | −1.1981E−06 | 2.0501E−07 | 1.2621E−05 | 3.0112E−05 |
| A10 = | 1.8950E−09 | −6.7748E−10 | 5.4905E−07 | |

| Surface # | | | | |
|---|---|---|---|---|
| 6 | 8 | 9 | 10 | 11 |
| k = −1.9522E+00 | 3.7867E+00 | −2.2538E+01 | 6.9432E+01 | −2.0155E+00 |
| A4 = −5.3885E−04 | 2.9325E−03 | 4.1167E−04 | 1.1392E−03 | −1.6600E−02 |
| A6 = 4.6533E−06 | 1.7996E−04 | 1.5688E−03 | 1.6026E−03 | −2.0068E−02 |
| A8 = 7.7893E−06 | −1.8793E−04 | −4.7173E−04 | −1.9230E−04 | 8.9476E−04 |

| Surface # | | | |
|---|---|---|---|
| 12 | 13 | 14 | 15 |
| k = −2.8380E−01 | −2.0000E+01 | −1.5773E+01 | −1.7601E+00 |
| A4 = −4.8647E−02 | −3.9261E−02 | −3.0605E−03 | 2.6529E−02 |
| A6 = 1.8265E−03 | 8.5766E−03 | −7.1276E−03 | −8.9852E−03 |
| A8 = −2.7716E−04 | −5.5124E−04 | 2.4394E−03 | 1.5030E−03 |
| A10 = | 4.0701E−05 | −2.7732E−04 | −1.2342E−04 |
| A12 = | | 1.1074E−05 | 4.0567E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 0.86 | f/EPD | 1.68 |
| Fno. | 1.68 | f2/f3 | −0.44 |
| HFOV [deg.] | 75.0 | Σ|f/fi| | 1.77 |
| 1/|tan(HFOV)| | 0.27 | Y72/Y11 | 0.21 |
| V4 | 52.3 | |f/fi|max | 0.49 |
| (V4 + V6 + V7) | 136.4 | D [mm] | 0.010 |
| CTmax/CTmin | 4.69 | |SAGf − SAGr| × 100 [mm] | 2.04 |
| (R5 + R6)/(R5 − R6) | 4.20 | |f/ff| + |f/fr| | 0.92 |
| (R13 + R14)/(R13 − R14) | 0.18 | Nf + Nr | 3.47 |
| R14/f | −3.20 | |SAGf/Rf| + |SAGr/Rr| | 1.642 |
| TL/ImgH | 8.70 | |Yf/SAGf| + |Yr/SAGr| | 2.662 |

Furthermore, in the photographing optical lens assembly according to the 8th embodiment, when an axial distance between the first lens element 810 and the second lens element 820 is T12, an axial distance between the second lens element 820 and the third lens element 830 is T23, an axial distance between the third lens element 830 and the fourth lens element 840 is T34, an axial distance between the fourth lens element 840 and the fifth lens element 850 is T45, an axial distance between the fifth lens element 850 and the sixth lens element 860 is T56, and an axial distance between the sixth lens element 860 and the seventh lens element 870 is T67, the following conditions are satisfied: T34<T12; T45<T12; T56<T12; T67<T12; T34<T23; T45<T23; T56<T23; and T67<T23.

In the photographing optical lens assembly according to the 8th embodiment, when the axial distance between the fourth lens element 840 and the fifth lens element 850 is T45, the central thickness of the fourth lens element 840 is CT4, and the central thickness of the fifth lens element 850 is CT5, the following conditions are satisfied: T45<CT4; and T45<CT5.

9th Embodiment

Figure 19:
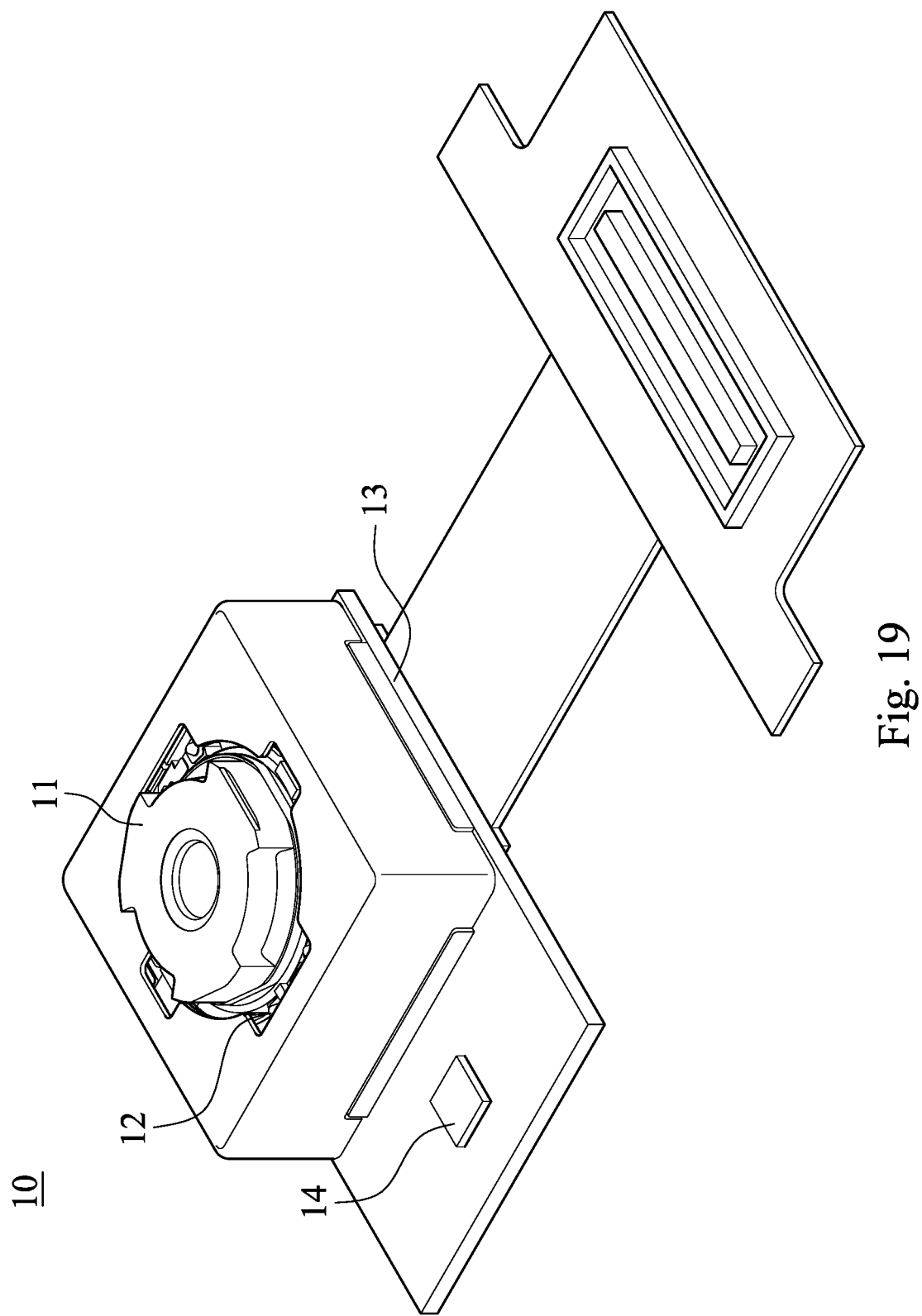
FIG. 19 is a three-dimensional schematic view of an imaging apparatus according to the 9th embodiment of the present disclosure.

FIG. 19 is a three-dimensional schematic view of an imaging apparatus 10 according to the 9th embodiment of the present disclosure. In FIG. 19, the imaging apparatus 10 of the 9th embodiment is a camera module, the imaging apparatus 10 includes an imaging lens assembly 11, a driving apparatus 12 and an image sensor 13, wherein the imaging lens assembly 11 includes the photographing optical lens assembly of the 1st embodiment and a lens barrel (not shown in drawings) for carrying the photographing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The photographing optical lens assembly can obtain a favorable imaging position by the driving apparatus 12 so as to capture clear images when the imaged object is disposed at different object distances.

The imaging apparatus 10 can include the image sensor 13 located on the image surface of the photographing optical lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 9th embodiment, the image stabilization module 14 is a gyro sensor, but is not limited thereto. Therefore, the variation of different axial directions of the photographing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

10th Embodiment

Figure 20A:
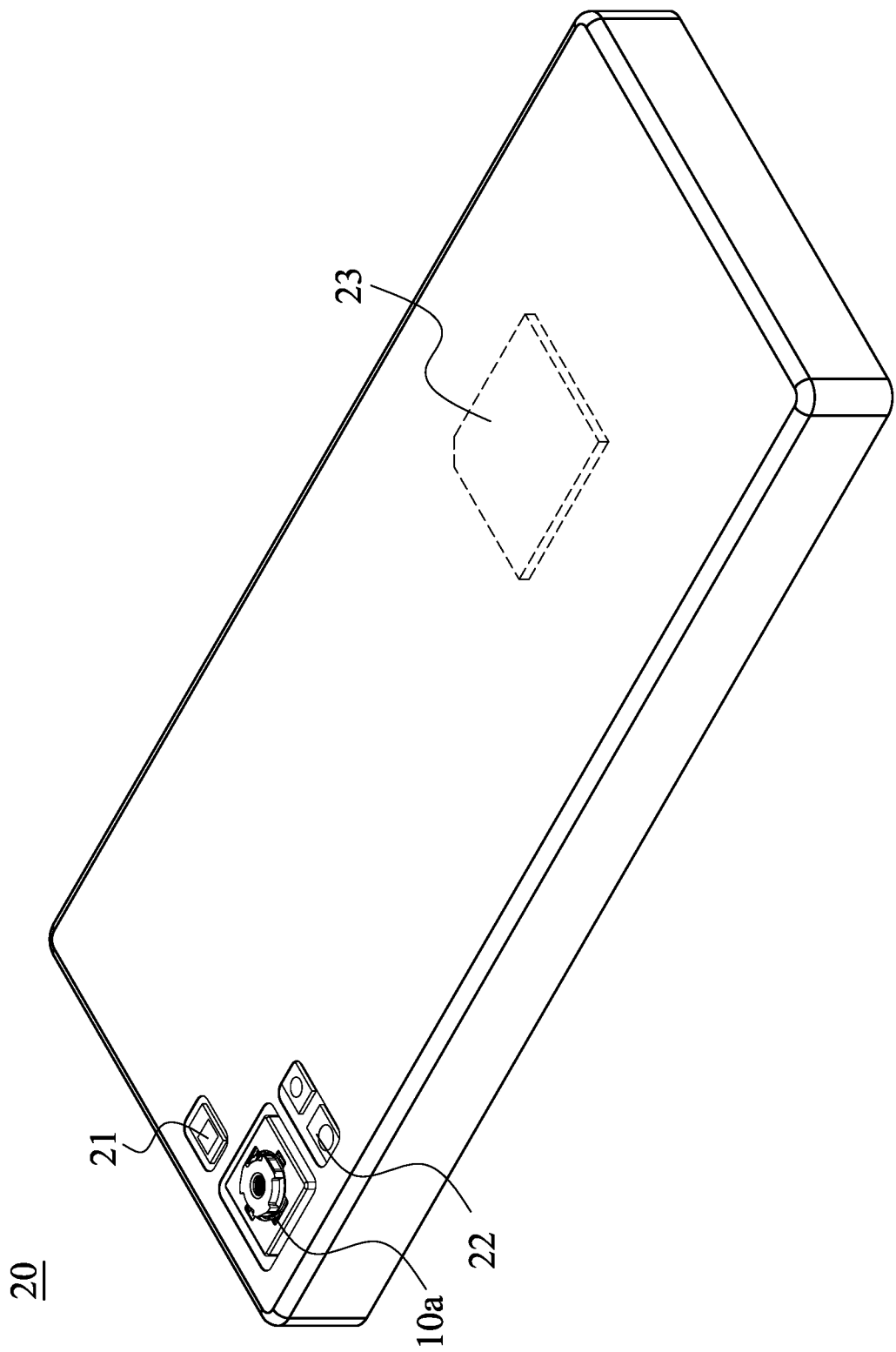
FIG. 20A is a schematic view of one side of an electronic device according to the 10th embodiment of the present disclosure.
Figure 20B:
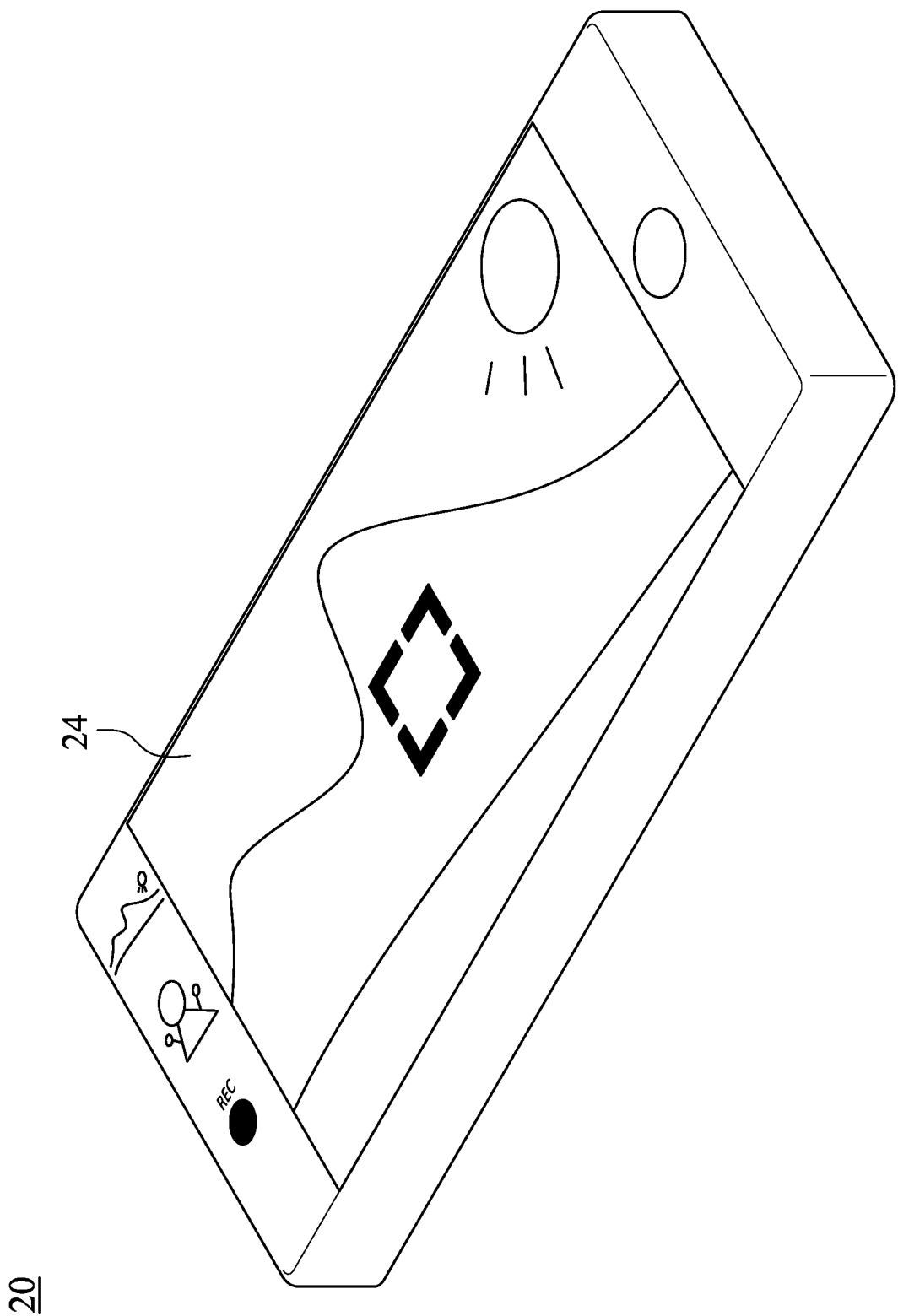
FIG. 20B is a schematic view of another side of the electronic device of FIG. 20A.
Figure 20C:
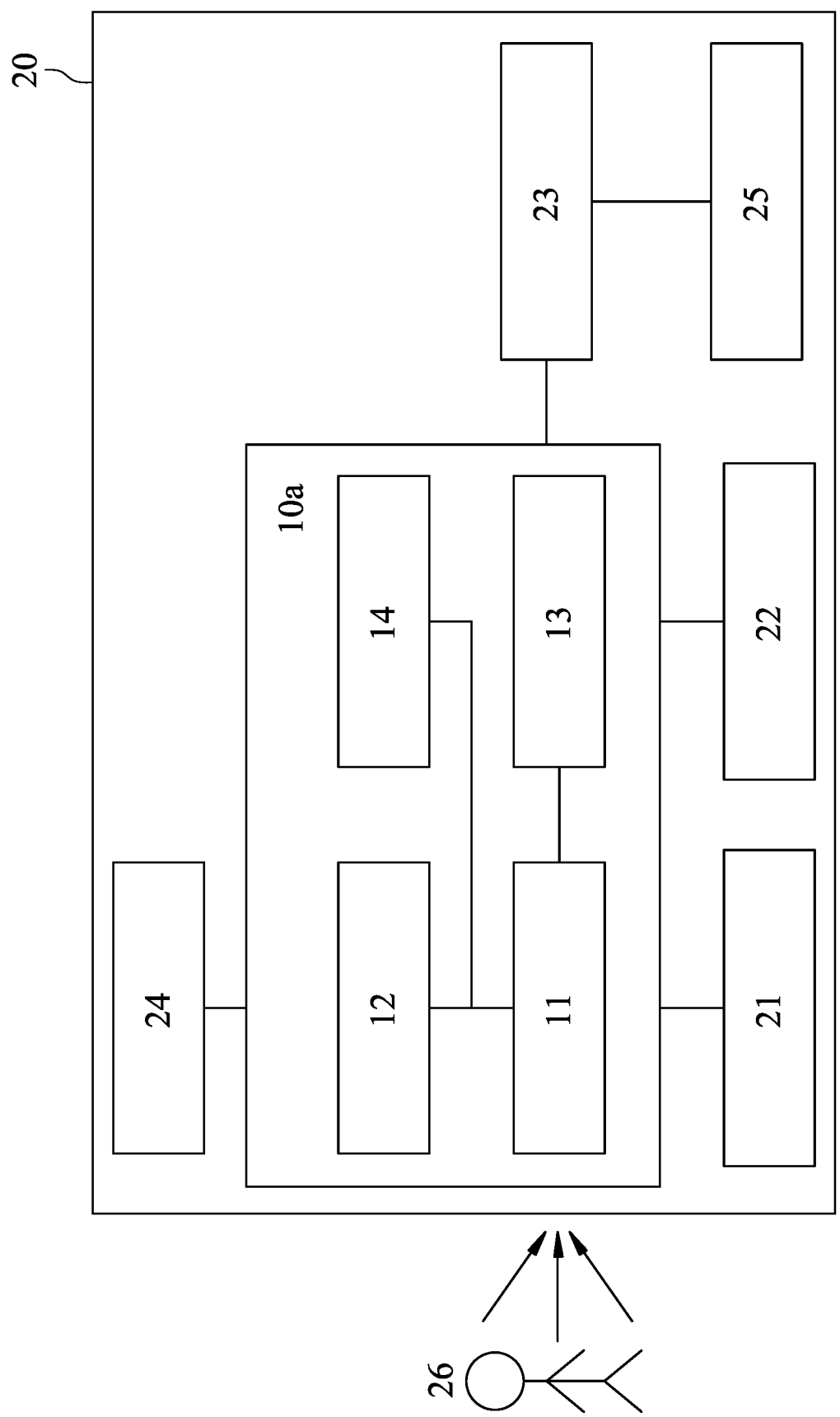
FIG. 20C is a system schematic view of the electronic device of FIG. 20A.

FIG. 20A is a schematic view of one side of an electronic device 20 according to the 10th embodiment of the present disclosure. FIG. 20B is a schematic view of another side of the electronic device 20 of FIG. 20A. FIG. 20C is a system schematic view of the electronic device 20 of FIG. 20A. In FIGS. 20A, 20B and 20C, the electronic device 20 according to the 10th embodiment is a smartphone, wherein the electronic device 20 includes an imaging apparatus 10a, a flash module 21, a focusing assisting module 22, an image signal processor (ISP) 23, a user interface 24 and an image software processor 25. When the user captures images of an imaged object 26 via the user interface 24, the electronic device 20 focuses and generates an image via the imaging apparatus 10a while compensating for low illumination via the flash module 21 when necessary. Then, the electronic device 20 quickly focuses on the imaged object according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

According to the 10th embodiment, the imaging apparatus 10a can be the same with the imaging apparatus 10 according to the 9th embodiment (in FIG. 20C, the reference numeral of each element of the imaging apparatus 10a is the same with the reference numeral of the corresponding element in FIG. 19), or the imaging apparatus 10a also can include a lens assembly which can be the same or different with the photographing optical lens assembly of the present disclosure, and will not describe again herein. Moreover, the imaging apparatus 10a can include an image sensor, which can be disposed on the image surface of the lens assembly thereof or the image surface of the photographing optical lens assembly, wherein the arrangement of the image sensor of the imaging apparatus 10a is the same with the image sensor 13 of the imaging apparatus 10 in the 9th embodiment, hence, the reference numeral of the image sensor in the 10th embodiment is labeled corresponding to the image sensor 13 in the 9th embodiment.

11th Embodiment

Figure 21:
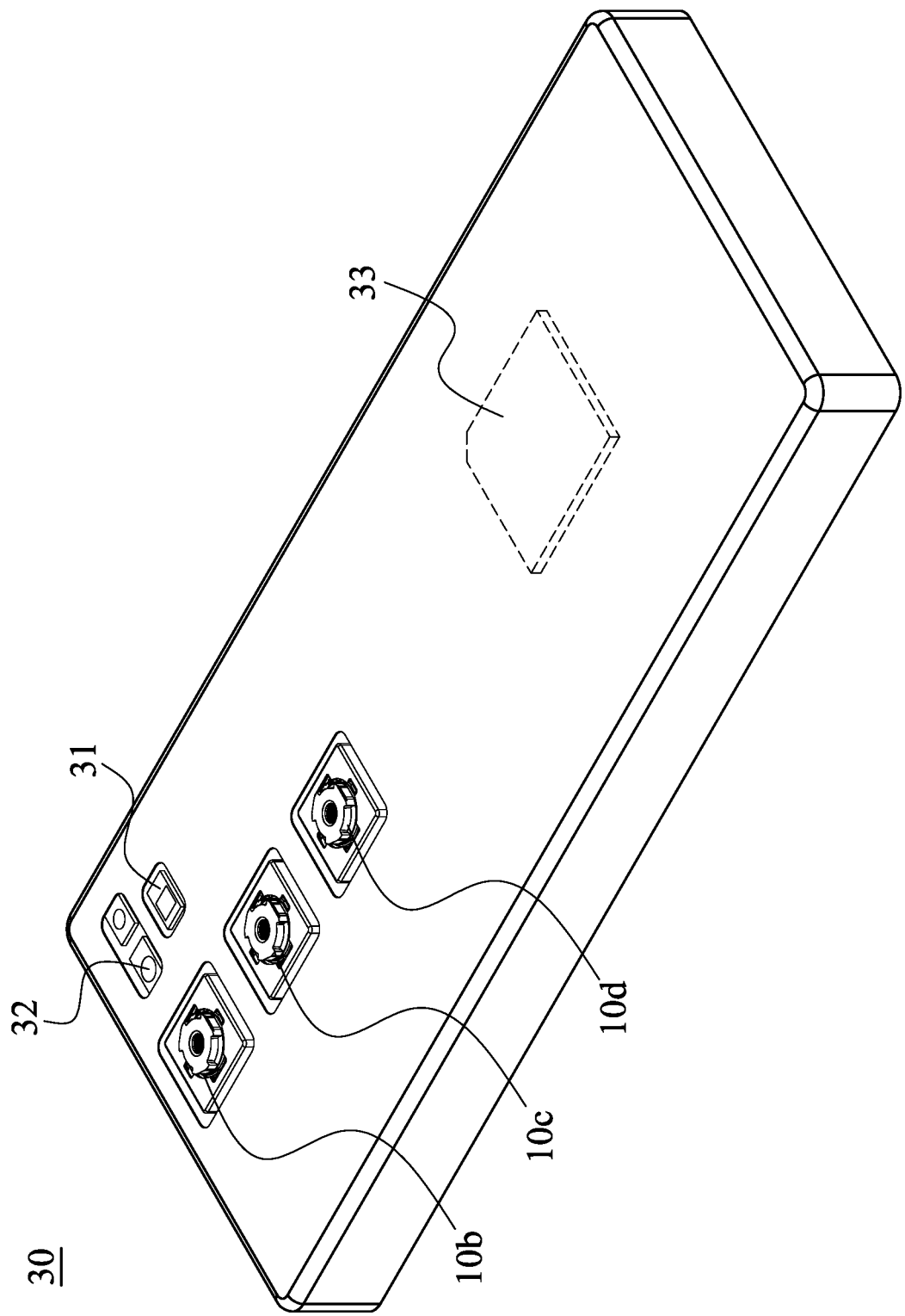
FIG. 21 is a schematic view of one side of an electronic device according to the 11th embodiment of the present disclosure.

FIG. 21 is a schematic view of one side of an electronic device 30 according to the 11th embodiment of the present disclosure. In FIG. 21, the electronic device 30 according to the 11th embodiment is a smartphone, wherein the electronic device 30 includes three imaging apparatuses 10b, 10c, 10d, a flash module 31, a focusing assisting module 32, an image signal processor 33, a user interface (not shown in drawings) and an image software processor (not shown in drawings). As the description according to the 10th embodiment, when the user captures images of an imaged object (not shown in drawings) via the user interface, the electronic device 30 focuses and generates an image via the imaging apparatuses 10b, 10c, 10d while compensating for low illumination via the flash module 31 when necessary. Then, the electronic device 30 quickly focuses on the imaged object according to its object distance information provided by the focusing assisting module 32, and optimizes the image via the image signal processor 33 and the image software processor. Thus, the image quality can be further enhanced. The focusing assisting module 32 can adopt conventional infrared or laser for obtaining quick focusing, and the user interface can utilize a touch screen or a physical button for capturing and processing the image with various functions of the image processing software.

According to the 11th embodiment, the three imaging apparatuses 10b, 10c, 10d can be the same with the imaging apparatus 10 according to the 9th embodiment, and will not described again herein. In detail, the three imaging apparatuses 10b, 10c, 10d according to the 11th embodiment can be a super wide angle imaging apparatus, a telephoto imaging apparatus and an imaging apparatus with wide field of view (that is, between the super wide angle and the telephoto), or can be other kind of imaging apparatus, which would not be limited thereof.

12th Embodiment

Figure 22:
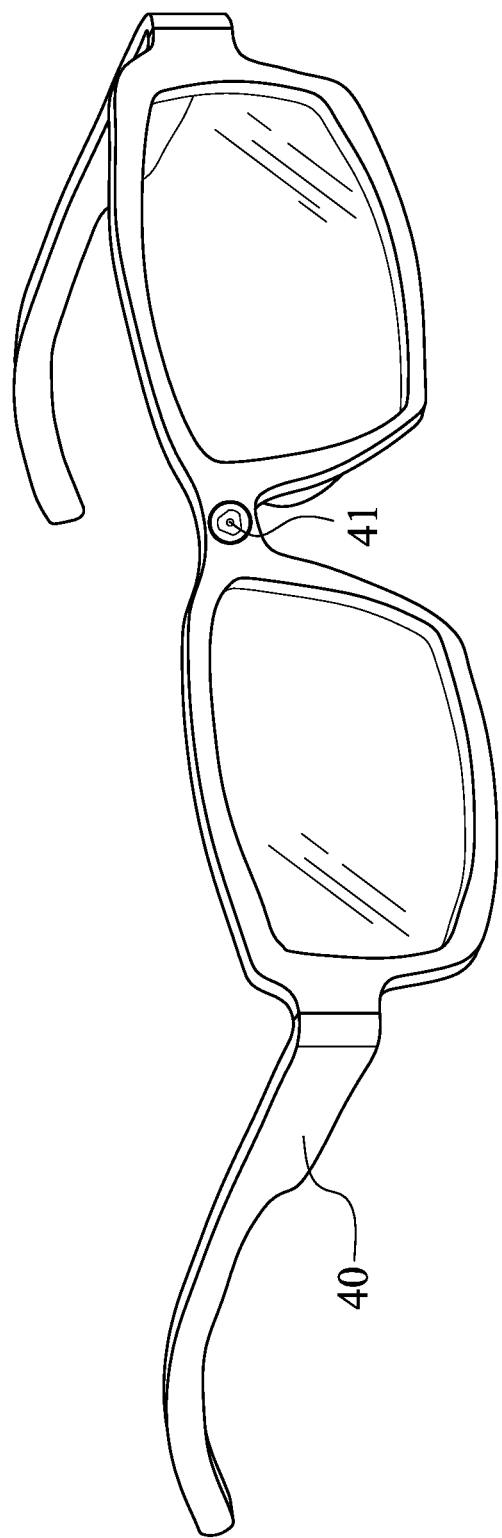
FIG. 22 is a schematic view of an electronic device according to the 12th embodiment of the present disclosure.

FIG. 22 is a schematic view of an electronic device 40 according to the 12th embodiment of the present disclosure. The electronic device 40 of the 12th embodiment is a wearable device. The electronic device 40 includes an imaging apparatus 41. The imaging apparatus 41 can be the same as that of the 9th embodiment, and will not be repeated herein.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side: a first lens element, a second lens element, a third lens element, a fourth lens element, a fifth lens element, a sixth lens element and a seventh lens element;
   wherein the first lens element has negative refractive power, the second lens element has negative refractive power, the third lens element has an object-side surface being concave in a paraxial region thereof, and the fourth lens element has an image-side surface being convex in a paraxial region thereof;

wherein a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of an i-th lens element is fi, an entrance pupil diameter of the photographing optical lens assembly is EPD, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, and the following conditions are satisfied:

$2.35 < \Sigma |f/fi| < 10.0$, wherein $i=1,2,3,4,5,6,7$;

$1.0 < f/\text{EPD} < 2.60$;

$T34 < T12$;

$T45 < T12$;

$T56 < T12$;

$T67 < T12$;

$T34 < T23$;

$T45 < T23$;

$T56 < T23$; and $T67 < T23$.

2. The photographing optical lens assembly of claim 1, wherein the focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of the i-th lens element is fi, and the following condition is satisfied:

$2.50 < \Sigma |f/fi| < 5.0$, wherein $i=1,2,3,4,5,6,7$.

3. The photographing optical lens assembly of claim 1, wherein the focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of the i-th lens element is fi, a maximum of |f/fi| is |f/fi|max, and the following condition is satisfied:

$0.60 < |f/fi|\text{max} < 2.0$, wherein $i=1,2,3,4,5,6,7$.

4. The photographing optical lens assembly of claim 1, wherein a curvature radius of an object-side surface of the seventh lens element is R13, a curvature radius of an image-side surface of the seventh lens element is R14, an Abbe number of the fourth lens element is V4, an Abbe number of the sixth lens element is V6, an Abbe number of the seventh lens element is V7, and the following conditions are satisfied:

$-6.0 < (R13+R14)/(R13-R14) < 0$; and $30.0 < (V4+V6+V7) < 125.0$.

5. The photographing optical lens assembly of claim 1, wherein the third lens element has an image-side surface comprising at least one inflection point, a curvature radius of the object-side surface of the third lens element is R5, a curvature radius of an image-side surface of the third lens element is R6, and the following condition is satisfied:

$(R5+R6)/(R5-R6) < 0.80$.

6. The photographing optical lens assembly of claim 1, wherein a maximum of central thicknesses of the seven lens elements of the photographing optical lens assembly is CTmax, a minimum of the central thicknesses of the seven lens elements of the photographing optical lens assembly is CTmin, and the following condition is satisfied:

$1.0 < \text{CTmax}/\text{CTmin} < 5.50$.

7. The photographing optical lens assembly of claim 1, wherein the Abbe number of the fourth lens element is V4, and the following condition is satisfied:

$10.0 < V4 < 35.0$.

8. The photographing optical lens assembly of claim 1, wherein an axial distance between an object-side surface of the first lens element and an image surface is TL, a maximum image height of the photographing optical lens assembly is ImgH, a half of a maximum field of view of the photographing optical lens assembly is HFOV, and the following conditions are satisfied:

$3.0 < TL/\text{ImgH} < 7.20$; and $1/|\tan(\text{HFOV})| < 0.55$.

9. The photographing optical lens assembly of claim 1, further comprising:

an aperture stop located on the image side of the fourth lens element;

wherein at least four of the first lens element, the second lens element, the third lens element, the fourth lens element, the fifth lens element, the sixth lens element and the seventh lens element are made of plastic materials and have an object-side surface and an image-side surface thereof being both aspheric, the focal length of the photographing optical lens assembly is f, the entrance pupil diameter of the photographing optical lens assembly is EPD, and the following condition is satisfied:

$1.0 < f/\text{EPD} \leq 2.40$.

10. The photographing optical lens assembly of claim 1, wherein the photographing optical lens assembly comprises at least one cemented lens set, the cemented lens set is cemented by two adjacent lens elements of the seven lens elements, two cemented surfaces of the cemented lens set are both aspheric, the cemented lens set comprises a cemented layer connecting the cemented surfaces of the two adjacent lens elements, a central thickness of the cemented layer is D, and the following condition is satisfied:

$0.01 \text{ mm} \leq D < 0.04 \text{ mm}$.

11. The photographing optical lens assembly of claim 10, wherein an absolute value of a curvature radius of an object-side surface of the cemented layer and an absolute value of a curvature radius of an image-side surface of the cemented layer are minimum absolute values of curvature radii of object-side surfaces and image-side surfaces of the lens elements of the photographing optical lens assembly.

12. An imaging apparatus, comprising:
the photographing optical lens assembly of claim 1; and
an image sensor disposed on an image surface of the photographing optical lens assembly.

13. An electronic device, comprising:
the imaging apparatus of claim 12.

14. A photographing optical lens assembly comprising seven lens elements, the seven lens elements being, in order from an object side to an image side: a first lens element, a second lens element, a third lens element, a fourth lens element, a fifth lens element, a sixth lens element and a seventh lens element;
wherein the first lens element has negative refractive power, the second lens element has negative refractive power, and the third lens element has negative refractive power;
wherein a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of an i-th lens element is fi, an entrance pupil diameter of the photographing optical lens assembly is EPD, a curvature radius of an image-side surface of the seventh lens element is R14, a maximum optical effective radius of an object-side surface of the first lens element is Y11, a maximum optical effective radius of the image-side surface of the seventh lens element is Y72, an axial distance between the fourth lens element and the fifth lens element is T45, a central thickness of the fourth lens element is CT4, and the following conditions are satisfied:

$2.35<\Sigma|f/fi|<10.0$, wherein $i=1,2,3,4,5,6,7$;

$1.0<f/EPD<2.80$;

$-3.20<R14/f<16.0$;

$0.10<Y72/Y11<0.65$; and $T45<CT4$.

15. The photographing optical lens assembly of claim 14, wherein the focal length of the photographing optical lens assembly is f, the curvature radius of the image-side surface of the seventh lens element is R14, the maximum optical effective radius of the object-side surface of the first lens element is Y11, the maximum optical effective radius of the image-side surface of the seventh lens element is Y72, and the following conditions are satisfied:

$-3.0<R14/f<12.0$; and $0.10<Y72/Y11<0.50$.

16. The photographing optical lens assembly of claim 14, wherein the focal length of the second lens element is f2, the focal length of the third lens element is f3, and the following condition is satisfied:

$f2/f3<0.95$.

17. The photographing optical lens assembly of claim 14, wherein an axial distance between an object-side surface of the first lens element and an image surface is TL, a maximum image height of the photographing optical lens assembly is ImgH, a half of a maximum field of view of the photographing optical lens assembly is HFOV, an axial distance between the fourth lens element and the fifth lens element is T45, a central thickness of the fifth lens element is CT5, and the following conditions are satisfied:

$1.0<TL/ImgH<8.0$;

$1/|\tan(HFOV)|<0.30$; and $T45<CT5$.

18. The photographing optical lens assembly of claim 14, wherein the photographing optical lens assembly comprises at least one cemented lens set, the cemented lens set is cemented by two adjacent lens elements of the seven lens elements, two cemented surfaces of the cemented lens set are both aspheric, a refractive index of the lens element closer to the object side of the cemented lens set is Nf, a refractive index of the lens element closer to the image side of the cemented lens set is Nr, and the following condition is satisfied:

$3.0<Nf+Nr<3.30$.

19. The photographing optical lens assembly of claim 18, wherein a displacement in parallel with an optical axis from an axial vertex on an image-side surface to a maximum optical effective radius position on the image-side surface of the lens element closer to the object side of the cemented lens set is SAGf, a displacement in parallel with the optical axis from an axial vertex on an object-side surface to a maximum optical effective radius position on the object-side surface of the lens element closer to the image side of the cemented lens set is SAGr, and the following condition is satisfied:

$0.05 \text{ mm}<|SAGf-SAGr|\times 100<9.0 \text{ mm}$.

20. A photographing optical lens assembly comprising seven, lens elements, the seven lens elements being, in order from an object side to an image side: a first lens element, a second lens element, a third lens element, a fourth lens element, a fifth lens element, a sixth lens element and a seventh lens element;
wherein the photographing optical lens assembly comprises at least one cemented lens set, the cemented lens set is cemented by two adjacent lens elements of the seven lens elements, two cemented surfaces of the cemented lens set are both aspheric, the cemented lens set comprises a cemented layer connecting the cemented surfaces of the two adjacent lens elements;
wherein a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of an i-th lens element is fi, an entrance pupil diameter of the photographing optical lens assembly is EPD, a displacement in parallel with an optical axis from an axial vertex on an image-side surface to a maximum optical effective radius position on the image-side surface of the lens element closer to the object side of the cemented lens set is SAGf, a displacement in parallel with the optical axis from an axial vertex on an object-side surface to a maximum optical effective radius position on the object-side surface of the lens element closer to the image side of the cemented lens set is SAGr, and the following conditions are satisfied:

$1.0 < \Sigma |f/fi| < 15.0$, wherein $i=1,2,3,4,5,6,7$;

$1.0 < f/EPD < 5.0$; and $0.03$ mm $< |SAGf-SAGr| \times 100 < 20.0$ mm.

21. The photographing optical lens assembly of claim 20, wherein at least one of object-side surfaces and image-side surfaces of at least one lens element of the seven lens elements comprises at least one inflection point, the focal length of the photographing optical lens assembly is f, a focal length of the lens element closer to the object side of the cemented lens set is ff, a focal length of the lens element closer to the image side of the cemented lens set is fr, and the following condition is satisfied:

$1.0 < |f/ff| + |f/fr| < 7.0$.

22. The photographing optical lens assembly of claim 20, wherein the displacement in parallel with the optical axis from the axial vertex on the image-side surface to the maximum optical effective radius position on the image-side surface of the lens element closer to the object side of the cemented lens set is SAGf, the displacement in parallel with the optical axis from the axial vertex on the object-side surface to the maximum optical effective radius position on the object-side surface of the lens element closer to the image side of the cemented lens set is SAGr, and the following condition is satisfied:

$0.20$ mm $< |SAGf-SAGr| \times 100 < 6.0$ mm.

23. The photographing optical lens assembly of claim 20, wherein the first lens element has negative refractive power, the first lens element comprises an image-side surface being concave in a paraxial region thereof, a central thickness of the cemented layer is D, and the following condition is satisfied:

$0.01$ mm $\leq D < 0.06$ mm.

24. The photographing optical lens assembly of claim 20, wherein a refractive index of the lens element closer to the object side of the cemented lens set is Nf, a refractive index of the lens element closer to the image side of the cemented lens set is Nr, and the following condition is satisfied:

$3.0 < Nf+Nr < 3.30$.

25. The photographing optical lens assembly of claim 20, wherein the fourth lens element has positive refractive power, the focal length of the photographing optical lens assembly is f, an entrance pupil diameter of the photographing optical lens assembly is EPD, a half of a maximum field of view of the photographing optical lens assembly is HFOV, and the following conditions are satisfied:

$1.0 < f/EPD \leq 2.40$; and $1/|\tan(HFOV)| < 0.55$.

26. The photographing optical lens assembly of claim 20, wherein a maximum optical effective radius of the image-side surface of the lens element closer to the object side of the cemented lens set is Yf, a maximum optical effective radius of the object-side surface of the lens element closer to the image side of the cemented lens set is Yr, the displacement in parallel with the optical axis from the axial vertex on the image-side surface to the maximum optical effective radius position on the image-side surface of the lens element closer to the object side of the cemented lens set is SAGf, the displacement in parallel with the optical axis from the axial vertex on the object-side surface to the maximum optical effective radius position on the object-side surface of the lens element closer to the image side of the cemented lens set is SAGr, and the following condition is satisfied:

$0.50 < |Yf/SAGf| + |Yr/SAGr| < 3.50$.

27. The photographing optical lens assembly of claim 20, wherein a curvature radius of the image-side surface of the lens element closer to the object side of the cemented lens set is Rf, a curvature radius of the object-side surface of the lens element closer to the image side of the cemented lens set is Rr, the displacement in parallel with the optical axis from the axial vertex on the image-side surface to the maximum optical effective radius position on the image-side surface of the lens element closer to the object side of the cemented lens set is SAGf, the displacement in parallel with the optical axis from the axial vertex on the object-side surface to the maximum optical effective radius position on the object-side surface of the lens element closer to the image side of the cemented lens set is SAGr, and the following condition is satisfied:

$1.50 < |SAGf/Rf| + |SAGr/Rr| < 8.0$.

28. The photographing optical lens assembly of claim 20, wherein an absolute value of a curvature radius of an object-side surface of the cemented layer and an absolute value of a curvature radius of an image-side surface of the cemented layer are minimum absolute values of curvature radii of object-side surfaces and image-side surfaces of the lens elements of the photographing optical lens assembly.

29. An imaging apparatus, comprising:
the photographing optical lens assembly of claim 20; and
an image sensor disposed on an image surface of the photographing optical lens assembly.

30. An electronic device, comprising:
the imaging apparatus of claim 29.

* * * * *

UNITED STATES PATENT AND TRADEMARK OFFICE
CERTIFICATE OF CORRECTION

Page 1 of 2

PATENT NO. : 10,996,444 B2
APPLICATION NO. : 16/275639
DATED : May 4, 2021
INVENTOR(S) : Yang et al.

It is certified that error appears in the above-identified patent and that said Letters Patent is hereby corrected as shown below:

In the Claims (1) In Column 48, Lines 66 to 67 (in Claim 1), please delete "he third lens element has an object-side surface being concave in a paraxial region thereof," and insert therefor --the third lens element has an object-side surface being concave in a paraxial region thereof and an image-side surface being concave in a paraxial region thereof,--.

(2) In Column 49, Lines 1 to 2 (in Claim 1), please delete "fourth lens element has an image-side surface being convex in a paraxial region thereof," and insert therefor --fourth lens element has an image-side surface being convex in a paraxial region thereof, and the seventh lens element has an image-side surface being convex in a paraxial region thereof,--.

(3) In Column 49, Lines 20 to 22 (in Claim 1), please delete ",an axial distance between the sixth lens element and the seventh lens element is T67, and the following conditions are satisfied", and insert therefor --,an axial distance between the sixth lens element and the seventh lens element is T67, an axial distance between an object-side surface of the first lens element and an image surface is TL, a maximum image height of the photographing optical lens assembly is ImgH, and the following conditions are satisfied--.

(4) In Column 49, Lines 39 to 40 (in Claim 1), please delete "T56<T23; and T67<T23.", and insert therefor --T56<T23; T67<T23; and 3.0<TL/ImgH<7.20.--.

(5) In Column 49, Line 67 to Column 50, Line 1, (in Claim 4), please delete "a curvature radius of an image-side surface of the seventh lens element", and insert therefor --a curvature radius of the image-side surface of the seventh lens element--.

(6) In Column 50, Line 11, (in Claim 5), please delete "wherein the third lens element has an image-side surface", and insert therefore --wherein the third lens element has the image-side surface--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,996,444 B2

(7) In Column 50, Line 14, (in Claim 5), please delete "curvature radius of an image-side surface of the third lens", and insert therefor --curvature radius of the image-side surface of the third lens--.

(8) In Column 50, Lines 32 to 36 (in Claim 8), please delete "wherein an axial distance between an object-side surface of the first lens element and an image surface is TL, a maximum image height of the photographing optical lens assembly is ImgH, a half of a maximum field of view of the photographing optical lens assembly is HFOV," and insert therefor --wherein a half of a maximum field of view of the photographing optical lens assembly is HFOV,--.

(9) In Column 50, Lines 37 to 40, (in Claim 8), please delete "following conditions are satisfied: $3.0<TL/ImgH<7.20$; and $1/|\tan(HFOV)|<0.55$.", and insert therefor --following condition is satisfied: $1/|\tan(HFOV)|<0.55$.--.

(10) In Column 51, Line 10, (in Claim 12), please delete "an image sensor disposed on an image surface", and insert therefor --an image sensor disposed on the image surface--.

(11) In Column 51, Lines 22 to 23, (in Claim 14), please delete "and the third lens element has negative refractive power;" and insert therefor --the third lens with negative refractive power has an image-side surface being concave in a paraxial region thereof, and the seventh lens element has positive refractive power;--.

(12) In Column 51, Lines 40 to 41, (in Claim 14), please delete ", a central thickness of the fourth lens element is CT4, and the following conditions are satisfied", and insert therefor --, a central thickness of the fourth lens element is CT4, an axial distance between an object-side surface of the first lens element and an image surface is TL, a maximum image height of the photographing optical lens assembly is ImgH, and the following conditions are satisfied--.

(13) In Column 51, Lines 48 to 50, (in Claim 14), please delete "$0.10<Y72/Y11<0.65$; and $T45<CT4$.", and insert therefor --$0.10<Y72/Y11<0.65$; $T45<CT4$; and $1.0<TL/ImgH<8.0$.--.

(14) In Column 52, Lines 2 to 6, (in Claim 17), please delete "wherein an axial distance between an object-side surface of the first lens element and an image surface is TL, a maximum image height of the photographing optical lens assembly is ImgH, a half of a maximum field of view of the photographing optical lens assembly is HFOV," and insert therefor --wherein a half of a maximum field of view of the photographing optical lens assembly is HFOV,--.

(15) In Column 52, Lines 10 to 14, (in Claim 17), please delete "$1.0<TL/ImgH<8.0$; $1/|\tan(HFOV)|<0.30$; and $T45<CT5$.", and insert therefor --$1/|\tan(HFOV)|<0.30$; and $T45<CT5$--.

(16) In Column 52, Line 46, (in Claim 20), please delete "wherein the photographing optical lens assembly", and insert therefor --wherein the seventh lens element has positive refractive power; an axial distance between the first lens element and the second lens element is greater than an axial distance between the second lens element and the third lens element, the photographing optical lens assembly--.